United States Patent
Oommen

(10) Patent No.: US 7,287,026 B2
(45) Date of Patent: *Oct. 23, 2007

(54) METHOD OF COMPARING THE CLOSENESS OF A TARGET TREE TO OTHER TREES USING NOISY SUB-SEQUENCE TREE PROCESSING

(76) Inventor: John B. Oommen, 5942, 3rd Line Road, North Gower, Ontario (CA) K0A 2T0

( * ) Notice: Subject to any disclaimer, the term of this patent is extended or adjusted under 35 U.S.C. 154(b) by 204 days.

This patent is subject to a terminal disclaimer.

(21) Appl. No.: 10/116,970

(22) Filed: Apr. 5, 2002

(65) Prior Publication Data

US 2003/0195890 A1 Oct. 16, 2003

(51) Int. Cl.
*G06F 17/30* (2006.01)
(52) U.S. Cl. .......................... 707/6; 707/100; 707/101
(58) Field of Classification Search .............. 707/1–10, 707/100–104.1; 709/225, 227; 725/107
See application file for complete search history.

(56) References Cited

U.S. PATENT DOCUMENTS

| | | | | |
|---|---|---|---|---|
| 5,761,538 | A * | 6/1998 | Hull ........................... | 712/300 |
| 5,836,003 | A * | 11/1998 | Sadeh ......................... | 341/51 |
| 6,219,833 | B1 * | 4/2001 | Solomon et al. ............. | 717/149 |
| 6,260,042 | B1 * | 7/2001 | Curbera et al. ............. | 707/101 |
| 6,289,354 | B1 * | 9/2001 | Aggarwal et al. ........ | 707/104.1 |
| 6,377,945 | B1 * | 4/2002 | Risvik ........................... | 707/3 |
| 6,446,068 | B1 * | 9/2002 | Kortge ......................... | 707/6 |
| 6,647,141 | B1 * | 11/2003 | Li ................................ | 382/162 |
| 6,662,180 | B1 * | 12/2003 | Aref et al. ..................... | 707/6 |
| 6,742,003 | B2 * | 5/2004 | Heckerman et al. ..... | 707/104.1 |
| 6,778,970 | B2 * | 8/2004 | Au ............................... | 706/55 |
| 2002/0193981 | A1 * | 12/2002 | Keung et al. ................ | 704/1 |
| 2003/0061213 | A1 * | 3/2003 | Yu et al. ........................ | 707/7 |
| 2003/0144994 | A1 * | 7/2003 | Wen et al. ..................... | 707/3 |
| 2003/0163437 | A1 * | 8/2003 | Lee ............................ | 706/47 |
| 2005/0027681 | A1 * | 2/2005 | Bernstein et al. .............. | 707/1 |

FOREIGN PATENT DOCUMENTS

CA 2279678 * 2/2001

OTHER PUBLICATIONS

B. John Oommen, and Richar Loke. On the Pattern Recognition of Noisy Subsequence Trees. IEEE 2001.*
B. John Oommen and R. L. Kashyap. A Formal Theory For Optimal and Information Theoretic Syntactic Pattern Recognition. Pergamon. Pattern Recognition, vol. 31, No. 8, pp. 1159-1177, 1998.*

(Continued)

*Primary Examiner*—Jeffrey Gaffin
*Assistant Examiner*—Neveen Abel-Jalil
(74) *Attorney, Agent, or Firm*—Schmeiser, Olsen & Watts

(57) ABSTRACT

A method of comparing the closeness of a target tree to other trees located in a database of trees, said method comprising the steps of: (a) calculating a constraint in respect of each tree in the database based on an estimated number of edit operations and a characteristic of the target tree; (b) calculating a constrained tree edit distance between the target tree and each tree in the database using the constraint obtained in step (a); and (c) comparing the calculated constrained tree edit distances. The method can also be applied to matching a target tree representable structure to its closest tree representable structure.

41 Claims, 31 Drawing Sheets

OTHER PUBLICATIONS

B. John Oommen, K. Zhang, W. Lee. Numerical Similarity and Dissimilarity Measures Between Two Trees. IEEE 1996.*

Kaizhong Zhang. Algorithms for The Constrained Editing Distance Between Ordered Labeled Trees and Related Problem. Dept. of Computer Science, The University of Western Ontario, London, Ontario, Canada. Received Dec. 29, 1993.*

DasGupta B., He X., Jiang, T., Li M., Tromp J., & Zhang, L. On Distances Between Phylogenetic Trees (Extended Abstract). Society for Industrial & Applied Mathematics, Philadelphia, PA. 1997.*

B.J. Oommen and R.L. Kashyap, "A Formal Theory for Optimal and Information Theoretic Syntactic Pattern Recognition" (Pattern Recognition) 1998, 1159-1177; 31(8).

B. J. Oommen and R.K.S. Loke, "The Noisy Subsequences Tree Recognition Problem", (Proc. of SSPR-98, International Symposium on Syntactic Statistical Pattern Recognition) 1998, 169-180 Sydney, Australia.

B.J. Oommen and R.K.S. Loke, "On Using Parametric String Distances and Vector Quantization in Designing Syntactic Pattern Recognition Systems", (Proc. of the 1997 IEEE Intl Conf. on Sys., Man and Cybernetics) Oct. 1997, 511-517 Orlando, Florida.

B.J. Oommen et al., "Numerical Similarity and Dissimilarity Measures Between Two Trees" (IEEE Transactions on Computers) Dec. 1996, 1426-1434; 45.

K. Zhang, "Algorithms For The Constrained Editing Distance Between Ordered Labeled Trees and Related Problems" (Pattern Recognition) 1995, 463-474; 28(3).

B.J. Oommen and W. Lee, "Constrained Tree Editing" (Information Sciences) 1994, 253-273; 77(3-4).

K. Zhang and T. Jiang, "Some MAX SNP-Hard Results Concerning Unordered Labeled Trees", (Information Processing Letters) 1994, 249-254; 49.

K. Zhang et al. "On the Editing Distance Between Unordered Labeled Trees" (Information Processing Letters) May 25, 1992, 133-139; 42.

K. Zhang et al., "Fast Serial and Paralled Algorithms for Approximate Tree Matching with VLDC's", (Proc. of the 1992 Symp. on Combinatorial Pattern Matching) 1992, 148-161; 92.

R.M. Haralick and L.G. Shapiro, "Binary Machine Vision" (Addison Wesley) 1992, 13-40 Reading, Mass.

B. Shapiro and K. Zhang, "Compairing Multiple RNA Secondary Structures Using Tree Comparisions", (Comp Appl Biosci) 1990, 309-318; 6(4).

K. Zhang, "Constrained String and Tree Editing Distance", (Proceedings of the IASTED International Symposium) 1990, 92-95 New York.

K. Zhang and D. Shasha, "Simple Fast Algorithms For The Editing Distance Between Trees and Related Problems", (SIAM J. Comput.) Dec. 1989, 1245-1262 18(6).

B. Shapiro, "An Algorithm for Comparing Mutiple RNA Secondary Structures" (Comput. Appl. Biosci.) 1988, 387-393; 4(3).

B.J. Oommen, "Recognition of Noisy Subsequences Using Constrained Edit Distances" (IEEE Trans. Pattern Anal. and Mach. Intell.) Sep. 1987, 676-685; 9(5).

B.J. Oommen, "Constrained String Editing" (Information Sciences) 1986, 40: 267-284.

YC. Chen and SY. Lu, "Waveform Correlation by Tree Matching", (IEEE Trans. Pattern Anal. and Mach. Intell.) May 1985, 299-305; 7(3).

A. Noetzel and S. Selkow, "An Overview of Sequence Comparison" Sankoff and Kruskal (Eds.) Time Warps, String Edits, and Macromolecules: Theory and Practice of Sequence Comparison, Addison Wesley 1983, 1-43 Chapter 1.

A. Noetzel and S. Selkow, "An Analysis of the General Tree-Editing Problem" Sankoff and Kruskal (Eds.) Time Warps, String Edits, and Macromolecules: Theory and Practice of Sequence Comparison, Addison Wesley 1983, 237-252, Chapter 8.

P.A.V. Hall and G.R. Dowling, "Approximate String Matching" (Comput Sur) Dec. 1980, 381-402; 12(4).

SY. Lu, "A Tree-to-Tree Distance and Its Application to Cluter Analysis", (IEEE Trans. Pattern Anal. and Mach. Intell.) Apr. 1979, 219-224; 1(2).

KC. Tai, "The Tree-to-Tree Correction Problem", (J Assoc. for Computing Machinery) Jul. 1979, 422-433; 26(3).

S.M. Selkow, "The Tree-to-Tree Editing Problem", (Info. Proc. Letters) Dec. 1977, 184-186; 6(6).

R. Lowrance and R.A. Wagner, "An Extension of the String-to-String Correction Problem", (J. ACM) Apr. 1995, 177-183; 22.

R.A. Wagner and M.J. Fischer, The String-to-String Correction Problem (J. Assoc. Comput. Mach.) Jan. 1974, 168-173; 21.

A.V. Aho et al., The Design and Analysis of Computer Algorithms, (Addison Wesley) 1974, 171-189; 5.

R.O. Duda and P.E. Hart Pattern Classification and Scene Analysis, (John Wiley and Sons) 1973, 1-76; 1.

* cited by examiner

△ Oxygen
□ Hydrogen
○ Carbon

Nonactin

☐ Bifurcation, crossings or trifurcation minutia
△ Endpoint minutia

▲ Traffic lights
■ Four way stop sign
∗ Two way stop sign or dead end

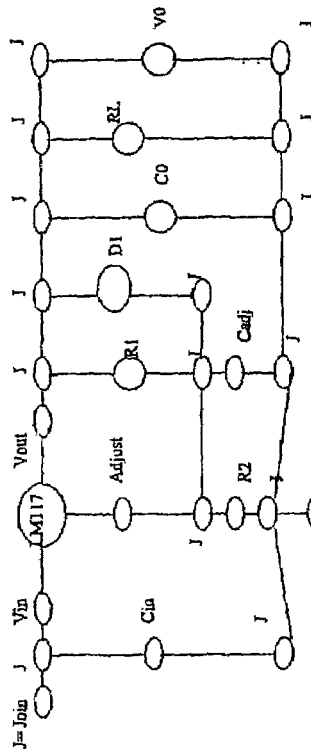
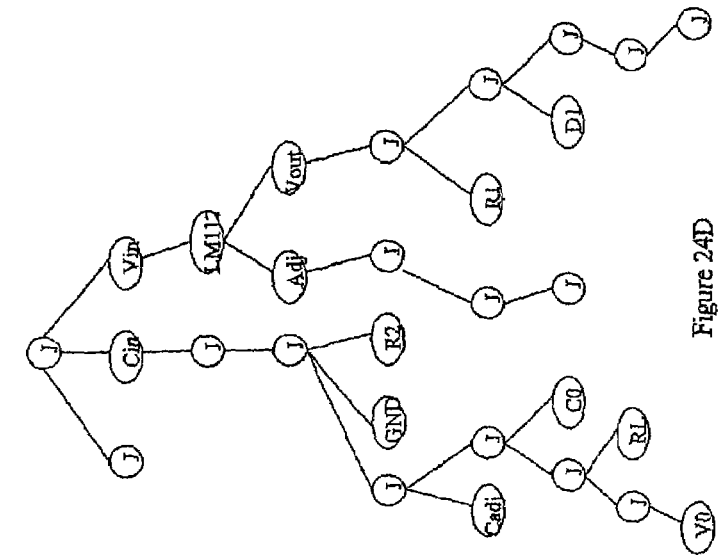
Figure 24C Underlying Graph (above) with Corresponding Tree (below)
Figure 24D
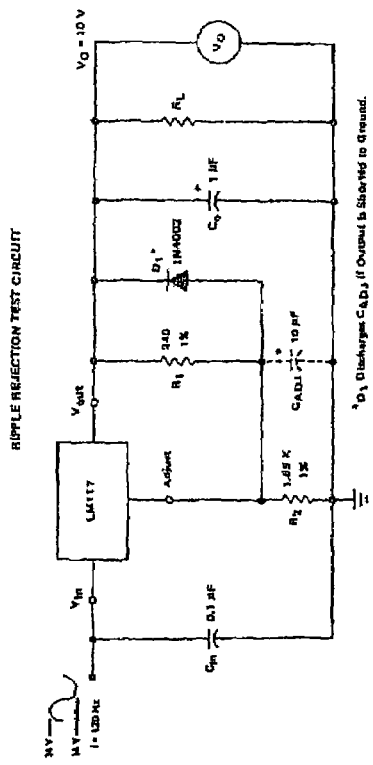
Figure 24A Original Diagram
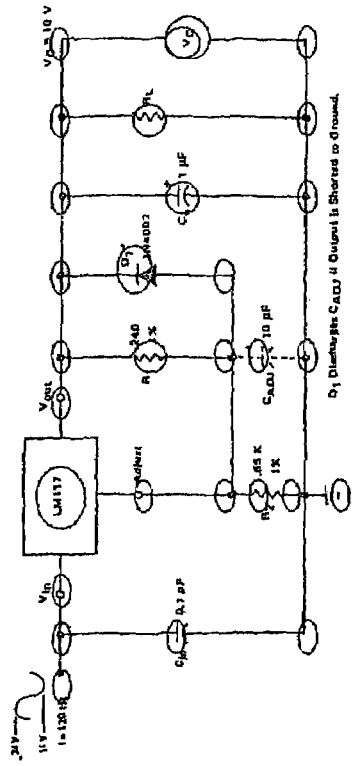
Figure 24B Diagram with Nodes Drawn

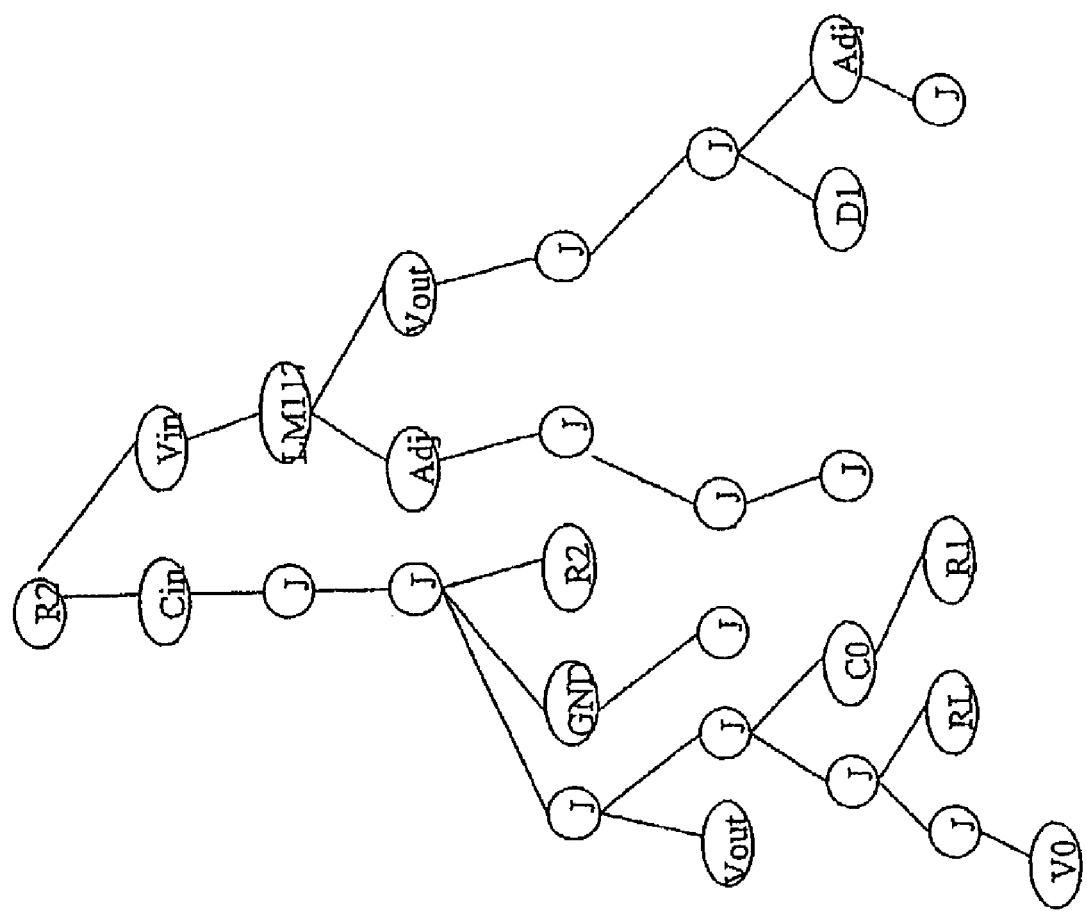
Figure 24E   Noisy Subsequence Tree

| | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| a | 867 | 1 | 1 | 1 | 1 | 1 | 1 | 1 | 1 | 1 | 1 | 1 | 1 | 1 | 1 | 1 | 14 | 1 | 20 | 1 | 1 | 1 | 10 | 5 | 1 | 14 |
| b | 1 | 861 | 1 | 1 | 1 | 1 | 1 | 14 | 1 | 1 | 1 | 1 | 1 | 20 | 1 | 1 | 1 | 1 | 1 | 1 | 1 | 20 | 1 | 1 | 1 | 1 |
| c | 1 | 1 | 861 | 14 | 1 | 14 | 14 | 1 | 1 | 1 | 1 | 1 | 1 | 1 | 1 | 1 | 1 | 1 | 1 | 1 | 1 | 20 | 1 | 20 | 1 | 1 |
| d | 1 | 1 | 14 | 835 | 14 | 20 | 1 | 1 | 1 | 1 | 1 | 1 | 1 | 1 | 1 | 1 | 1 | 10 | 20 | 1 | 1 | 1 | 5 | 14 | 1 | 1 |
| e | 1 | 1 | 1 | 14 | 857 | 5 | 1 | 1 | 1 | 1 | 1 | 1 | 1 | 1 | 1 | 1 | 1 | 20 | 1 | 10 | 1 | 14 | 20 | 1 | 10 | 1 |
| f | 1 | 1 | 14 | 20 | 10 | 824 | 20 | 1 | 1 | 20 | 14 | 1 | 1 | 1 | 1 | 1 | 1 | 5 | 1 | 14 | 1 | 1 | 1 | 1 | 14 | 1 |
| g | 1 | 1 | 14 | 1 | 1 | 20 | 835 | 20 | 1 | 10 | 20 | 5 | 1 | 14 | 20 | 1 | 1 | 1 | 1 | 1 | 1 | 1 | 1 | 1 | 1 | 1 |
| h | 1 | 14 | 1 | 1 | 1 | 1 | 20 | 835 | 1 | 10 | 14 | 1 | 1 | 14 | 1 | 1 | 1 | 1 | 1 | 1 | 1 | 1 | 1 | 1 | 1 | 1 |
| i | 1 | 1 | 1 | 1 | 1 | 1 | 1 | 1 | 861 | 10 | 20 | 20 | 14 | 1 | 1 | 1 | 1 | 1 | 1 | 1 | 1 | 14 | 1 | 1 | 10 | 1 |
| j | 1 | 1 | 1 | 1 | 1 | 1 | 1 | 20 | 10 | 835 | 20 | 1 | 14 | 14 | 1 | 14 | 1 | 5 | 1 | 14 | 20 | 1 | 1 | 1 | 14 | 1 |
| k | 1 | 1 | 1 | 1 | 1 | 1 | 5 | 14 | 14 | 1 | 848 | 20 | 14 | 14 | 10 | 1 | 1 | 1 | 1 | 5 | 14 | 1 | 1 | 1 | 1 | 1 |
| l | 1 | 1 | 1 | 1 | 1 | 1 | 1 | 1 | 20 | 14 | 20 | 876 | 1 | 1 | 14 | 1 | 1 | 1 | 1 | 1 | 5 | 1 | 1 | 1 | 1 | 1 |
| m | 1 | 1 | 1 | 1 | 1 | 1 | 1 | 1 | 14 | 14 | 14 | 14 | 876 | 20 | 1 | 1 | 1 | 1 | 1 | 1 | 1 | 1 | 1 | 1 | 1 | 1 |
| n | 1 | 20 | 1 | 1 | 1 | 1 | 1 | 5 | 1 | 1 | 14 | 14 | 14 | 857 | 14 | 1 | 1 | 14 | 1 | 1 | 14 | 1 | 1 | 1 | 1 | 1 |
| o | 1 | 1 | 1 | 1 | 1 | 1 | 1 | 1 | 1 | 1 | 1 | 1 | 1 | 20 | 861 | 20 | 1 | 1 | 1 | 1 | 1 | 1 | 1 | 1 | 1 | 1 |
| p | 1 | 1 | 1 | 1 | 1 | 1 | 1 | 1 | 1 | 14 | 1 | 1 | 1 | 1 | 20 | 893 | 1 | 1 | 1 | 1 | 1 | 1 | 1 | 1 | 1 | 1 |
| q | 1 | 1 | 1 | 1 | 1 | 1 | 5 | 1 | 1 | 1 | 1 | 1 | 1 | 1 | 1 | 1 | 892 | 1 | 1 | 1 | 1 | 1 | 1 | 1 | 1 | 1 |
| r | 1 | 1 | 1 | 14 | 17 | 14 | 1 | 14 | 17 | 1 | 1 | 1 | 1 | 1 | 1 | 1 | 5 | 863 | 1 | 17 | 1 | 1 | 17 | 1 | 1 | 1 |
| s | 1 | 1 | 17 | 5 | 1 | 1 | 1 | 1 | 5 | 14 | 1 | 1 | 1 | 1 | 1 | 1 | 1 | 1 | 841 | 1 | 1 | 1 | 1 | 1 | 1 | 1 |
| t | 1 | 1 | 1 | 1 | 1 | 1 | 1 | 10 | 1 | 1 | 1 | 1 | 1 | 1 | 1 | 1 | 1 | 17 | 1 | 858 | 1 | 1 | 17 | 1 | 17 | 1 |
| u | 10 | 1 | 1 | 1 | 1 | 14 | 14 | 1 | 1 | 14 | 1 | 14 | 1 | 1 | 1 | 1 | 1 | 1 | 1 | 1 | 858 | 1 | 1 | 1 | 1 | 1 |
| v | 5 | 1 | 1 | 5 | 1 | 1 | 1 | 1 | 1 | 1 | 1 | 1 | 1 | 1 | 1 | 1 | 1 | 1 | 1 | 1 | 1 | 863 | 1 | 1 | 1 | 1 |
| w | 1 | 1 | 1 | 1 | 1 | 1 | 1 | 1 | 1 | 1 | 1 | 1 | 1 | 1 | 1 | 1 | 1 | 1 | 14 | 1 | 1 | 1 | 867 | 1 | 1 | 1 |
| x | 14 | 17 | 17 | 14 | 1 | 1 | 14 | 1 | 1 | 1 | 1 | 1 | 1 | 1 | 1 | 1 | 1 | 1 | 14 | 17 | 1 | 1 | 1 | 863 | 17 | 17 |
| y | 1 | 1 | 1 | 5 | 1 | 1 | 1 | 1 | 1 | 5 | 1 | 1 | 1 | 1 | 1 | 1 | 1 | 1 | 14 | 1 | 17 | 1 | 1 | 1 | 863 | 1 |
| z | 14 | 1 | 1 | 1 | 1 | 1 | 1 | 14 | 1 | 1 | 1 | 1 | 1 | 1 | 1 | 1 | 1 | 1 | 14 | 1 | 1 | 1 | 1 | 17 | 1 | 883 |

Figure 26

| | |
|---|---|
| Original tree: | ((((t)z)(((j)s)(t)(u)(v)x)a)((f)(((u)(v)a)(b)((p)c)g)c)(((i)(((q)(r)g)j)k)s)((x)(y)(z)e)d) |
| Noisy tree: | ((y)(v)((((t)p)g)c)(i)((q)(r)j)(x)d) |
| Original tree: | ((((x)(((e)j)((p)c)(y)k)a)s)((g)t)(u)p)((j)((((b)f)(g)c)(a)(((s)((l)(n)k)(u)z)d)v)(e)q)r) |
| Noisy tree: | (((x)((e)j)((p)c)(g)p)(f)(g)(a)(s)(l)(u)(e)r) |
| Original tree: | (((i)((m)(s)e)f)((p)(a)c)(((k)(q)o)((f)b)d)((z)((i)(b)x)t)((f)((e)(h)v)r)(((n)k)((y)u)g)j) |
| Noisy tree: | ((k)((k)t)(((n)v)(y)g)j) |
| Original tree: | (((((t)(s)(b)c)((x)(p)(q)f)((b)(e)(d)j)r)((((h)m)(l)(e)k)((u)(w)((f)x)d)((v)(y)(z)u)q)e)p) |
| Noisy tree: | ((((((t)y)(b)c)(((t)x)(q)r)(j)m)e)((e)(s)(x)((((c)(s)(r)(y)c)e)(z)u)q)p) |
| Original tree: | (((((u)d)e)j)((((w)t)b)(((v)(f)s)((j)(d)(r)p)c)f)(((p)l)r)((x)(k)h)(z)y)((a)(m)(s)u)k)o) |
| Noisy tree: | ((d)(w)(((j)(s)p)c)(y)(m)o) |
| Original tree: | (((((r)(m)(h)t)((l)(n)c)e)s)((f)((w)(((x)p)(d)q)v)(g)b)(((o)r)((a)i)j)((((s)z)((b)p)u)c)k) |
| Noisy tree: | (((x)(m)(h)e)(q)((r)j)k) |
| Original tree: | ((((w)(a)b)((d)(x)r)((n)(l)t)j)(((e)(z)m)((g)(m)q)((u)(o)b)o)(((r)(p)v)((f)(j)s)((y)k)h)c) |
| Noisy tree: | ((((w)d)(x)r)(n)(e)(z)((k)m)(b)c) |
| Original tree: | (((s)(v)(t)(u)(a)b)((d)(b)(e)(r)n)((l)(k)(s)h)(((t)(p)(q)(j)p)(a)i)(((c)(t)(o)(h)(j)e)r)g) |
| Noisy tree: | ((s)(u)((d)(d)(r)n)((k)(s)h)(p)(h)g) |
| Original tree: | (((((a)(w)m)((v)(l)y)k)(((j)(n)f)((u)(g)t)c)u)((((b)(m)p)((d)(i)h)m)(((s)(c)y)((p)q)s)f)s) |
| Noisy tree: | ((((v)k)((x)n)u)(b)(m)(d)(q)a) |
| Original tree: | ((c)((((d)((l)(f)t)(o)a)((v)((k)e)k)s)((u)(s)(t)q)((m)n)(((i)(r)(h)l)(c)(w)((j)y)p)b)(l)i) |
| Noisy tree: | ((d)(l)(k)(y)(s)(l)(c)(w)(j)(l)i) |
| Original tree: | ((((j)(o)a)(n)((w)f)k)(s)d)((((e)u)((h)(l)b)m)v)((g)(j)(((z)(p)(x)t)c)i)t) |
| Noisy tree: | ((((f)m)d)((b)m)(j)((u)(z)(x)t)t) |
| Original tree: | (((m)((d)(y)(q)j)t)(((i)o)e)s)(((x)p)((f)u)(v)n)(c)(((w)b)((e)z)r)((g)k)p)a) |
| Noisy tree: | ((m)((y)(c)j)((o)s)((b)(p)r)((g)k)a) |
| Original tree: | ((((g)((d)((m)o)n)(u)p)(i)(((x)b)(t)f)(s)((((l)(a)e)c)k)((d)((((w)(y)z)(n)r)p)m)w) |
| Noisy tree: | ((((o)p)g)(((((e)z)h)c)f)((((y)l)(a)g)c)((y)p)w) |
| Original tree: | (((s)(((t)(k)x)(e)((v)(y)r)i)(m)a)(((w)((j)(u)k)(g)p)(d)(o)r)(((c)(l)((i)(z)q)n)t)b) |
| Noisy tree: | (((t)x)(s)((v)r)(u)(n)b) |
| Original tree: | (((t)(((e)j)(d)c)w)(y)((g)((t)(v)(b)n)u)b)((s)((f)((g)(n)(a)x)(h)i)r)((p)(a)(m)o)b)z) |
| Noisy tree: | ((y)(y)(g)(g)(a)(h)((p)(a)(m)o)z) |
| Original tree: | (((k)(d)q)((j)s)(h)p)(((t)r)(i)o)(((g)(b)c)((w)(x)n)k)((a)((v)d)e)(((p)m)((s)n)((k)(r)f)y)l) |
| Noisy tree: | ((x)(((s)p)(t)(i)(((g)c)((w)n)k)(a)((m)((r)y)y)i)l) |
| Original tree: | (((n)(((y)((w)i)(p)e)(u)((z)d)(o)(((i)((z)(l)c)f)(k)r)h)(l)v)((((j)(r)k)c)(a)((b)(t)((s)g)d)p)m) |
| Noisy tree: | ((n)((o)(p)e)(d)(((s)z)(o)c)(((j)(r)k)c)(a)(b)m) |
| Original tree: | (((((o)(g)b)(u)((y)r)(s)(q)v)(p)(x)(((j)c)(f)(h)(y)t)(m)l)((a)(((k)(w)x)(r)(e)o)(z)((l)((i)v)n)d)x) |
| Noisy tree: | ((((g)(y)y)(p)(x)(((h)d)(y)t)(m)l)((g)((e)y)o)z)x) |

Figure 28

| | |
|---|---|
| Original tree: | (((s)((i)n)c)(e)(t)(h)(e)((a)d)(((v)(e)n)t)((o)(f)(t)(h)e)(((d)(i)g)i)(t)((a)l)((c)o)((((m)p)((u)t)e)r)t) |
| Noisy tree: | ((n)(a)((f)t)(t)(i)(t)(a)(o)((t)r)t) |
| Original tree: | (((t)(o)(i)(l)(((l)(u)s)t)r)((a)(t)(e)((s)o)((m)(e)o)(((f)t)h)e)(((t)((h)e)(t)y)(p)((e)s)o)f) |
| Noisy tree: | (((o)(i)(u)r)((a)(t)((e)o)(f)e)(g)(p)f) |
| Original tree: | ((((t)(h)(e)((p)r)e)c)(((e)d)((i)n)((g)(e)(x)(a)m)p)((l)(e)c)(((o)n)t)(((a)i)(n)s)(((m)(a)n)y)o) |
| Noisy tree: | (((((e)((p)r)e)v)d)(e)(e)(x)(a)((((q)k)n)t)((i)(b)s)(((a)n)y)o) |
| Original tree: | (((((t)h)e)r)((e)a)(r)((e)m)(a)(n)(y)((p)(r)(o)(b)(l)e)((m)(s)((i)n)(p)(a)(t)(t)((e)r)(n)((r)e)((c)o)g)n) |
| Noisy tree: | (((t)e)(((k)y)r)(((n)o)a)(b)((m)(s)(a)(t)(r)g)n) |
| Original tree: | ((((t)(h)((e)o)(r)(i)((g)(i)(n)(a)t)i)((o)(n)o)(f)(p)(a)(r)(t)(i)((o)f)((t)h)((i)s)(b)(o)(o)((k)(i)(s)p)r)i) |
| Noisy tree: | (((r)((a)(o)p)(n)(f)(r)((b)t)(((p)q)h)(i)(b)(o)(o)(l)r)i) |
| Original tree: | ((((t)h)(e)(p)((u)b)l)(i)((s)h)(((e)d)l)(((i)t)e)((r)((a)t)u)((r)((e)(o)n)((p)a)t)l) |
| Noisy tree: | (((n)(e)(p)((e)l)(t)((a)u)r)((a)t)t) |
| Original tree: | (((((b)((a)y)e)s)((d)(e)(c)(i)(s)(i)o)(((n)t)h)e)((((o)r)y)(i)((s)a)(((f)u)n)(((d)a)m)e)n) |
| Noisy tree: | (((e)((w)(i)o)e)(((s)a)(j)(d)e)n) |
| Original tree: | ((w)(e)(s)(h)(((a)l)(l)n)(o)(w)((f)o)(r)(m)(a)(l)(((i)z)e)((t)(h)e)(i)(d)(e)((a)s)((j)u)(s)t) |
| Noisy tree: | ((s)(h)(l)(w)((g)r)(m)(a)(l)(i)(e)(e)(u)t) |
| Original tree: | (((l)(e)((t)u)(s)((s)p)(e)(c)((i)a)l)(((i)(z)e)(t)(h)(e)((s)(e)(r)e)s)(((u)(l)(t)(s)((b)(y)c)(o)(n)(s)i)d)e) |
| Noisy tree: | (((e)(t)(s)l)(i)((y)s)(e)((l)(b)(e)d)e) |
| Original tree: | ((((i)n)c)(l)(((a)s)s)((i)(f)(i)c)(a)(t)((i)o)(n)(p)(r)(o)((b)(l)(e)((m)(s)e)((a)((c)h)s)t)a) |
| Noisy tree: | (((i)c)(l)((k)c)(n)(r)(o)((l)(e)(w)((s)(h)s)t)a) |
| Original tree: | ((((((t)(h)(e)(r)((e)a)r)(e)((m)a)(n)(y)(d)(i)f)((((f)(e)r)e)n)(t)(w)(a)((y)(s)t)(o)(r)(e)(p)(r)e)s)e) |
| Noisy tree: | (((((a)r)(y)c)((f)(e)r)((t)(w)v)s)(a)(y)(s)(o)(r)(e)(r)s)e) |
| Original tree: | ((((((w)(h)i)((l)e)((t)h)(e)t)w)((o)c)(a)(t)(a)(g)((o)(r)y)(c)(a)(s)(e)(i)((s)h)((u)s)((((t)a)s)p)e)c) |
| Noisy tree: | (((((h)i)z)(t)w)(o)(t)(c)(s)((i)g)(h)(s)c) |
| Original tree: | ((b)(y)(t)(h)(i)(n)(k)(i)((n)g)(((o)((f)a)c)l)((a)(s)(s)i)(f)((i)e)(r)(a)((s)(a)d)((e)v)(i)(c)e) |
| Noisy tree: | ((b)(n)(c)(a)(f)(a)(s)((e)v)(i)e) |
| Original tree: | ((((t)(h)(e)(s)(t)(r)(u)((c)((t)u)r)(((e)o)(f)(a)(b)((a)y)e)(s)(c)(l)((a)s)((s)i)((f)i)((e)r)i)s)d) |
| Noisy tree: | (((h)((s)(r)((r)(t)u)(o)w)(a)(l)(i)(f)s)d) |
| Original tree: | ((((w)(e)b)(e)(g)(i)(n)((w)i)(t)(h)(t)(h)(e)(((u)n)i)(((v)a)r)(i)(((a)t)e)(n)((o)r)((m)a)(l)(d)(e)n)s) |
| Noisy tree: | (((w)n)(h)((a)r)(e)(n)(o)(a)(l)s) |
| Original tree: | ((((t)((h)e)(g)(e)(n)(e)(r)(((((a)l)m)u)l)t)((i)(v)(a)((r)i)(a)((t)(e)n)((o)(r)(m)a)l)d)e) |
| Noisy tree: | (((n)(g)(n)(r)(((a)l)l)t)(i)(v)(a)(r)((t)(e)n)((o)(r)(m)a)e) |
| Original tree: | ((((t)h)(e)(s)(i)(m)((p)((l)e)s)(((t)c)a)((s)(e)o)((c)c)((u)(r)(e)(s)(w)(((h)e)n)t)h)e) |
| Noisy tree: | (((((t)a)h)((p)(l)e)f)(s)(h)h)e) |

US 7,287,026 B2

METHOD OF COMPARING THE CLOSENESS OF A TARGET TREE TO OTHER TREES USING NOISY SUB-SEQUENCE TREE PROCESSING

This application claims benefit to: Canadian Application No. 2285171 filed on Oct. 7, 1999; Canadian Application No. 2299047 filed on Feb. 21, 2000; and, International Application No. PCT/CA00/01107 filed on Sep. 29, 2000.

FIELD OF THE INVENTION

The present invention relates to methods for pattern recognition, wherein the identity of the parent can be determined from a "noisy" fragment thereof. Subject matter that is identifiable by this method is such that it can be represented by a tree notation.

BACKGROUND OF THE INVENTION

The need to identify the parent of a subfragment arises frequently in a variety of fields ranging from engineering and medicine to electronics, computer science, physics, chemistry and biology. In most of the cases the problem is computationally intractable since the number of variables involved as a consequence of the degrees of uncertainty, renders the calculations impossible. This situation is aggravated by the common occurrence that the integrity of the sub-fragment may be compromised in some way.

Typically, when the pattern to be recognized is inherently a "two-dimensional" structure, it cannot be adequately represented using a one-dimensional (string or circular string) approximation. By representing the pattern as a tree and by utilizing tree comparison algorithms one can, generally speaking, achieve excellent recognition strategies. Indeed, such schemes have been utilized in Pattern Recognition (PR) in areas such as clustering by Lu (*IEEE Trans. Pattern Anal. and Mach. Intell.*, PAMI 1, pp. 219-224 (1979)) and by Cheng and Lu in waveform correlation (*IEEE Trans. PAMI*, PAMI 7, pp. 299-305 (1985)). However, when the pattern to be recognized is occluded and only noisy information of a fragment of the pattern is available, the problem encountered can be mapped onto that of recognizing a tree by processing the information in one of its noisy subtrees or subsequence trees.

Trees are a fundamental data structure in computer science. A tree is, in general, a structure which stores data and it consists of atomic components called nodes and branches. The nodes have values which relate to data from the real world, and the branches connect the nodes so as to denote the relationship between the pieces of data resident in the nodes. By definition, no edges of a tree constitute a closed path or cycle. Every tree has a unique node called a "root". The branch from a node toward the root points to the "parent" of the said node. Similarly, the branch of the node away from the root points to the "child" of the said node. The tree is said to be ordered if there is a left-to-right ordering for the children of every node.

Trees have numerous applications in various fields of computer science including artificial intelligence, data modeling, pattern recognition, and expert systems. In all of these fields, the trees structures are processed by using operations such as deleting their nodes, inserting nodes, substituting node values, pruning sub-trees from the trees, and traversing the nodes in the trees. When more than one tree is involved, operations that are generally utilized involve the merging of trees and the splitting of trees into multiple subtrees. In many of the applications which deal with multiple trees, the fundamental problem involves that of comparing them.

Trees, graphs, and webs are typically considered as a multidimensional generalization of strings. Among these different structures, trees are considered to be the most important "nonlinear' structures in computer science, and the tree-editing problem has been studied since 1976. Similar to the string-editing problem, (see: D. Sankoff and J. B. Kruskal, *Time wraps, string edits, and macromolecules: Theory and practice of sequence comparison*, Addison-Wesley (1983); R. A. Wagner and M. J. Fischer, *J. Assoc. Comput. Mach.*, 21:168-173, (1974); B. J. Oommen and R. L. Kashyap, *Pattern Recognition*, 31, pp. 1159-1177 (1998); P. A. V. Hall and G. R. Dowling, *Comput. Sur.*, 12: pp 381-402 (1980); R. L. Kashyap and B. J. Oommen, *Intern. J. Computer Math.*, 13: pp 17-40 (1983); R. Lowrance and R. A. Wagner, *J. ACM*, 22: pp 177-183 (1975)), the tree-editing problem concerns the determination of the distance between two trees as measured by the minimum cost sequence of edit operations. Typically, the edit sequence considered includes the substitution, insertion, and deletion of nodes needed to transform one tree into the other.

Unlike the string-editing problem, only few results have been published concerning the tree-editing problem. In 1977, Selkow (*Inform. Process. Letters*, 6(6):184-186, (1977)) (see also Sankoff and J. B. Kruskal, *Time wraps, string edits, and macromolecules: Theory and practice of sequence comparison*, Addison-Wesley (1983)) presented a tree editing algorithm in which insertions and deletions were only restricted to the leaves. Tai (*J. Assoc. Comput. Mach.*, 26:422-433 (1979)) in 1979 presented another algorithm in which insertions and deletions could take place at any node within the tree except the root. The algorithm of Lu (*IEEE Trans. Pattern Anal. and Mach. Intell.*, PAMI 1(2):219-224 (1979)) on the other hand, did not solve this problem for trees of more than two levels. The best known algorithm for solving the general tree-editing problem is the one due to Zhang and Shasha (*SIAM J. Comput.*, 18(6):1245-1262 (1989)). Also, in all the papers published till the mid-90's, the literature primarily contains only one numeric inter-tree dissimilarity measure—their pairwise "distance" measured by the minimum cost edit sequence. The literature on the comparison of trees is otherwise scanty: Shapiro and Zhang (*Comput. Appl. Biosci.* vol. 6, no. 4, 309-318, (1990)) has suggested how tree comparison can be done for ordered and unordered labeled trees using tree alignment as opposed to the edit distance utilized elsewhere (Zhang and Shasha (1989) supra). The question of comparing trees with variable length don't care edit operations was also solved by Zhang, Shasha and Wang (*Proceedings of the* 1992 *Symposium on Combinatorial Pattern Matching*, CPM92:148-161, (1992)). Otherwise, the results concerning unordered trees are primarily complexity results: Zhang, et al., (*Information Processing Letters*, 42:133-139, (1992)) showed that editing unordered trees with bounded degrees is NP-hard, and even MAX SNP-hard by Zhang and T. Jiang, (*Information Processing Letters*, 49:249-254 (1994)).

The most recent results concerning tree comparisons are probably the ones due to Oommen, Zhang and Lee (*IEEE Transactions on Computers*, TC-45:1426-1434, (1996)) In this publication, the authors defined and formulated an abstract measure of comparison, $\Omega(T_1, T_2)$, between two trees $T_1$ and $T_2$ presented in terms of a set of elementary inter-symbol measures $\omega(.,.)$ and two abstract operators. By appropriately choosing the concrete values for these two operators and for $\omega(.,.)$, the measure $\Omega$ was used to define various numeric quantities between $T_1$ and $T_2$ including (i)

the edit distance between two trees, (ii) the size of their largest common sub-tree, (iii) Prob($T_2|T_1$), the probability of receiving $T_2$ given that $T_1$ was transmitted across a channel causing independent substitution and deletion errors, and, (iv) the a posteriori probability of $T_1$ being the transmitted tree given that $T_2$ is the received tree containing independent substitution, insertion and deletion errors.

Unlike the generalized tree editing problem, the problem of comparing a tree with one of its possible subtrees or Subsequence Trees (SuTs) has almost not been studied in the literature at all. The only reported results for comparing trees in this setting have involved constrained tree distances and are due to Oommen and Lee, (*Information Sciences*, Vol. 77 No. 3,4:253-273 (1994)) and Zhang, (*Proceeding of the IASTED International Symposium*, New York, pp. 92-95 (1990)).

SUMMARY OF THE INVENTION

In one embodiment, this invention provides a method of comparing the closeness of a target tree to other trees located in a database of trees, said method comprising the steps of: (a) calculating a constraint in respect of each tree in the database based on an estimated number of edit operations and a characteristic of the target tree; (b) calculating a constrained tree edit distance between the target tree and each tree in the database using the constraint obtained in step (a); and (c) comparing the calculated constrained tree edit distances.

In another embodiment, this invention provides a method of matching a target tree representable structure to its closest tree representable structure, said method comprising the steps: (a) generating one or more target trees for a target structure; (b) calculating a constraint in respect of each tree in the database based on an estimated number of edit operations and a characteristic of the target tree; (c) calculating a constrained tree edit distance between the target tree and each tree in the library using the constraint obtained in step (b) and the intersymbol edit distance; (d) comparing the calculated constrained tree edit distances; and (e) reporting the tree in the database that has the smallest constrained tree distance.

The method of this invention comprises a series of nested algorithms. A schematic representation of the overall algorithm is presented in FIG. 8. This algorithm invokes algorithms for each of which schematic representations are presented in FIGS. 9-18.

BRIEF DESCRIPTION OF THE FIGURES

FIG. 24 is a schematic diagram showing how the invention can be used in the recognition of electronic circuitry. The recognition is achieved from a noisy portion of an electronic circuit sought for. The nodes in this case are the various electronic components such as resistors, diodes, transistors, capacitors etc. Since numerous tree representations of each electronic circuit are possible, each electronic circuit is first mapped into a set of representative tree structures. Similarly, the noisy fragment of the electronic circuit sought for is also mapped into a set of representative tree structures. The electronic circuitry recognition is achieved by invoking the solution to the NSuT problem between the various tree representations of each electronic circuit and the tree representations of the noisy fragment.

FIG. 26 presents the "confusion matrix" (Table I) with the probabilities of substituting a character with another character. The figures in the table are to be multiplied by a factor of $10^{-1}$.

FIG. 28 presents Table III, describing a subset of the trees used for Data Set A and their noisy subsequence trees. The trees and subsequence trees are represented as parethensized lists.

FIG. 29 presents Table VI, describing a subset of the trees used for Data Set B and their noisy subsequence trees. The trees and subsequence trees are represented as parenthesized lists. The original unparenthesized strings are the same as those used in Oommen, IEEE Trans. Pattern Anal. And Mach. Intell., Vol. PAMI 9, No. 5:676-685, (1987) and were obtained from Hall and Dowling, Comput. Sur., Vol 12:381-402 (December 1980).

DETAILED DESCRIPTION OF THE INVENTION

Figure 1:
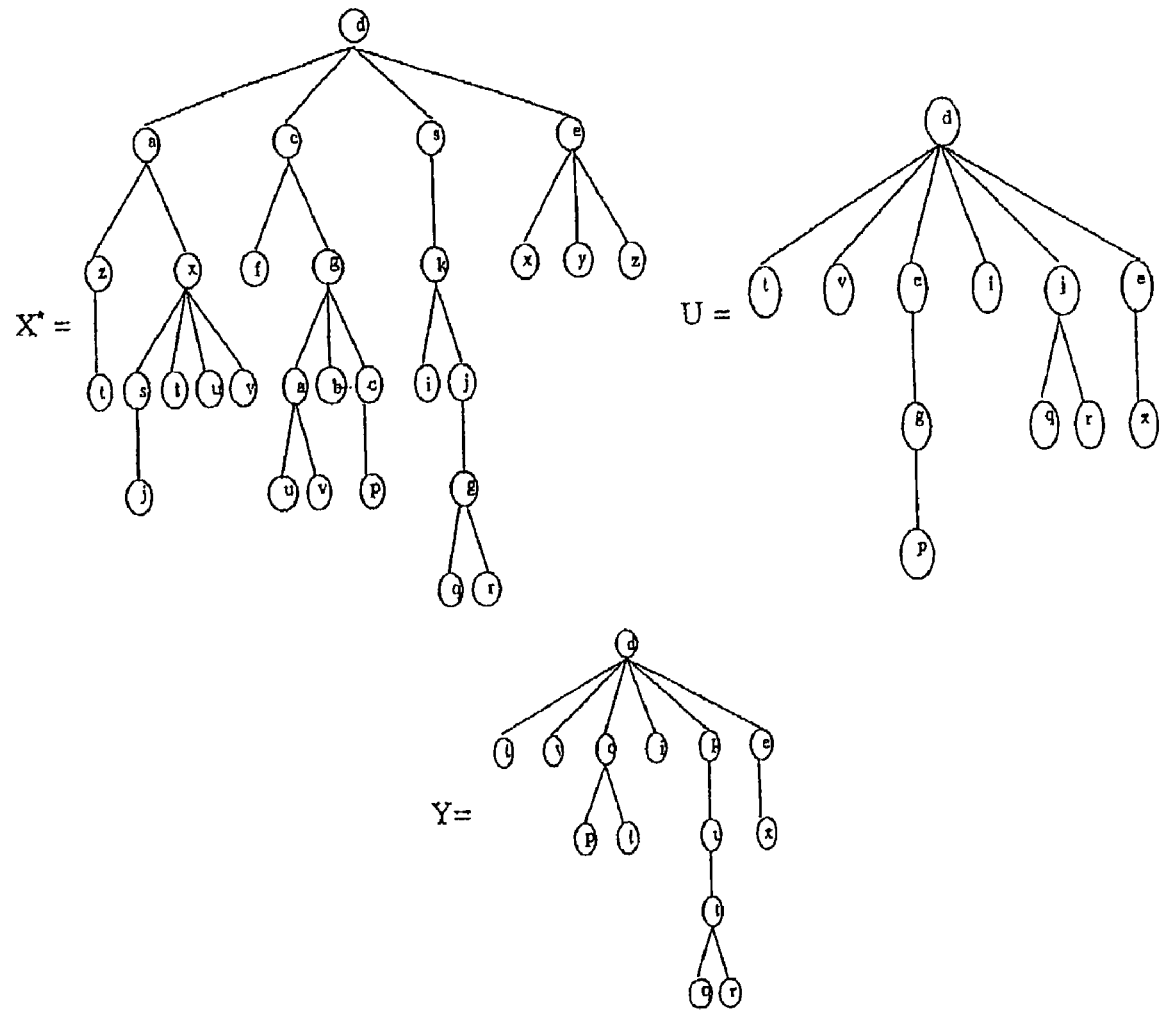
FIG. 1 presents an example of a tree X*, U, one of its Subsequence Trees, and Y which is a noisy version of U. The Noisy Subsequence Tree (NSuT) Recognition problem involves recognizing X* from Y.

This invention provides a method of comparing the closeness of a target tree to other trees, wherein the target tree can optionally be a noisy sub-fragment of the other trees. The tree is provided by a user and the trees to be compared are located in a database. The invention utilizes the process of constrained tree editing to tree structures derived from the target tree and at least one tree representation of every structure stored in the database. The method can also be applied to strings, wherein a string is considered a tree in which each parent node has exactly one child.

The method of this invention is based on the assumption that there is some connection between the target tree and one or more trees located in the database. The target could be unrelated, but similar, it could be a subfragment of a parent tree located in the database, or it could be a noisy subfragment of a parent located in the database. Moreover, since a string can be considered as a tree in which each parent node as exactly one child, the method can also be applied to string problems by representing the string as a tree. The versatility of the method of this invention derives from the fact that the Noisy Subsequence Tree Recognition problem is applied in each of these circumstances to compare the closeness of a target tree to other trees located in a database of trees.

In one embodiment, this invention provides a method of comparing the closeness of a target tree to other trees located in a database of trees, said method comprising the steps of: (a) calculating a constraint in respect of each tree in the database based on an estimated number of edit operations and a characteristic of the target tree; (b) calculating a constrained tree edit distance between the target tree and each tree in the database using the constraint obtained in step (a); and (c) comparing the calculated constrained tree edit distances.

In another embodiment, this invention provides a method of matching a target tree representable structure to its closest tree representable structure, said method comprising the steps: (a) generating one or more target trees for a target structure; (b) calculating a constraint in respect of each tree in the database based on an estimated number of edit operations and a characteristic of the target tree; (c) calculating a constrained tree edit distance between the target tree and each tree in the library using the constraint obtained in step (b) and the intersymbol edit distance; (d) comparing the calculated constrained tree edit distances; and (e) reporting the tree in the database that has the smallest constrained tree distance.

This method has wide-spread applications for any subject matter that can be depicted as a tree, which applies to tree representable structures as diverse as ribonucleic acid (RNA) chemical formulae, electronic circuitry, architectural plans, geographic maps, fingerprint records, engineering drawings, etc.

Since numerous tree representations of each item are possible, each item is first mapped into a set of representative tree structures. These tree representations are stored in a database means.

If the method is applied to a situation in which the target tree is a noisy fragment of a parent tree, located in a database, the noisy fragment of the item sought for is also mapped into a set of representative tree structures. The overall pattern recognition is achieved by invoking the solution to the NsuT problem between the various tree representations of each item and the tree representations of the noisy fragment for which the parent identity is being sought. Since the graph-to-tree manipulations are straightforward, the key of the invention involves the solution of the Noisy Subsequence Tree Recognition Problem described below which involves recognizing a tree, X*, which is an element of a dictionary or database of trees. The latter recognition is achieved by processing the information contained in a tree, Y, which in turn, is a noisy (garbled or inexact) version of U, one of subsequence trees of X*.

Since Y is a noisy version of an arbitrary subsequence tree of X*, (and not a noisy version of X* itself), clearly, just as in the case of recognizing noisy subsequences from strings (see Oommen (*IEEE Trans. Pattern Anal. and Mach. Intell.*, PAMI 9, No. 5: pp. 676-685 (1987))), it is meaningless to compare Y with all the trees in the dictionary themselves, even though they are potential sources of Y. The fundamental drawback in such a comparison strategy is the fact that significant information was deleted from X* even before Y was generated, and so Y should rather be compared with every possible subsequence tree of every tree in the dictionary. Clearly, this is intractable, since the number of SuTs of a tree is exponentially large and so an alternative way of comparing Y with every X in H has to be devised.

Before comparing Y to the individual tree in H, the additional information obtainable from the noisy channel will have to be used. Also, since the specific number of substitutions (or insertions/deletions) introduced in any specific transmission is unknown, it is reasonable to compare any X∈H and Y subject to the constraint that the number of substitutions that actually took place is its best estimate. Of course, in the absence of any other information, the best estimate of the number of substitutions that could have taken place is indeed its expected value, L, which is usually close to the size of the NSuT, Y. One could therefore use the set {L} as the constraint set to effectively compare Y with any X∈H. Since the latter set can be quite restrictive, a constraint set which is a superset of {L} marginally larger than {L} is suggested. Indeed, one such superset used for the experiments reported in this document contains merely the neighbouring values, and is {L−1, L, L+1}. Since the size of the set is still a constant, there is no significant increase in the computation times.

Oommen (*IEEE Trans. Pattern Anal. and Mach. Intell.*, PAMI 9: pp. 676-685 (1987)) devised an algorithm for the recognition of noisy subsequence from strings, which was achieved by evaluating the inter-string constrained edit distance. The results reported for solving the NsuT problem are not mere extensions of the corresponding string editing and recognition problem. This is because, unlike in the case of strings, the topological structure of the underlying graph prohibits the two-dimensional generalizations of the corresponding computations. Indeed, inter-tree computations require the simultaneous maintenance of meta-tree considerations represented as the parent and sibling properties of the respective trees, which are completely ignored in the case of linear structures such as strings. This further justifies the intuition that not all "string properties" generalize naturally to their corresponding "tree properties".

In contrast, however, the present invention has vast and enormous applications in problems which involve strings, substrings and subsequences. The current invention, as it has been presented here addresses the problem of recognizing trees by processing the information resident in their (noisy) subsequence trees. But if it is observed that a string is itself a tree in which each parent node has exactly one child, the current invention can be directly applied to the corresponding problems involving strings. Although the mappings between the problems from the tree-domain to the string-domain are straightforward, the following examples (in post-order notation) are catalogued so as to clarify their instantiations.

For example, consider the string recognition problem. Recognizing the string "approximately" by processing the information in the noisy string "approfshrtely", can be achieved by recognizing the post-order tree "(((((((((((a)p)p)r)o)x)i)m)a)t)e)l)y)" by processing the information in the post-order tree "(((((((((((a)p)p)r)o)f)s)h)r)t)e)l)y)" using the method for NSuT recognition introduced here.

In another example, consider the substring recognition problem. Recognizing the string "approximately" by processing the information in the noisy substring "approf", can be achieved by recognizing the post-order tree "(((((((((((a)p)p)r)o)x)i)m)a)t)e)l)y)" by processing the information in the post-order subtree "((((((a)p)p)r)o)f)" using the method for NSuT recognition introduced here.

In yet another example, consider the substring recognition problem. Recognizing the string "approximately" by processing the information in the noisy subsequence "appxiftxy", can be achieved by recognizing the post-order tree "(((((((((((a)p)p)r)o)x)i)m)a)t)e)l)y)" by processing the information in the post-order subsequence tree "(((((((((a)p)p)x)i)f)t)x)y)" using the method for NSuT recognition introduced here.

It is thus clear that the present invention, essentially represents a single generic solution for all (noisy) string, substring and subsequence recognition algorithms, while it simultaneously can be used as a generic solution to all (noisy) tree, subtree and subsequence tree recognition problems.

Description of Tree Representable Structures

The invention pertains to the recognition of subject matter which can be described as a planar or non-planar graph in two dimensions using nodes and edges. Items constituting such subject matter are called Tree Representable Structures. A "tree representable structure", as referred to herein, is any structure which can be represented using nodes and edges in a tree structure. Each item of this subject matter can be represented in a tree structure by extracting from the graph an underlying spanning tree as explained in Aho et al. (*The Design and Analysis of Computer Algorithms*, Addison Wesley, Reading: Mass., (1974)) and by Cormen et al. (*Introduction to Algorithms*, The MIT Press, Cambridge: Mass., (1989)). The items do not need not be two dimensional. Rather, they must be representable as two-dimensional graphs which may be planar or non-planar. Once a database comprising such (extracted) tree structures is constructed, the parent of any "noisy" fragment of any of these tree structures can be identified using the method of this invention. Examples of items that can be described in two-dimensions are map-like structures such as RNA molecules or parts thereof, plans, designs, chemical compounds described in their molecular structures, chemical compounds described in their atomic structures, drawings, electronic circuits, fingerprints, and flowcharts. The recognition of all of these items in their particular application domain utilizes the solution of the Noisy Subsequence Recognition (NsuT) problem described presently, which indeed constitutes a central kernel of the invention.

A two-dimensional tree representation is readily generated from a general pattern, or structure. First the characteristic features of the pattern, or structure, are identified. Second, certain of these features are identified as nodes and others as edges and subsequently organized to form a representative two-dimensional tree. For example, using the application domain involving fingerprints, given the original fingerprint, a preprocessing system would typically extract the characterizing features which would be used in the recognition. The features in this application domain are referred to as the minutiae. The relationship between the minutiae can be represented using edges. The resulting structure is a tree in which the nodes are the minutiae themselves and the edges represent the proximity between them.

A pattern would be string-representable if the pattern can be described as a sequence of individual symbols in a left-to-right manner or a right-to-left manner. If, apart from such a linear description, the sequence of symbols also possesses a parent-child relationship, the pattern is tree-representable. It should be observed that whereas a string-representable pattern obeys a sibling property between the symbols, a tree-representable pattern would additionally possess both a sibling property and a parent-child property.

Generating a Tree for a Graph Structured Item

A graph is a two-dimensional structure consisting of nodes (also called vertices) and edges. The edges can be represented as lines between the nodes. Each node possesses a node content which consists of its identity and a value that it contains. The graph can be stored in terms of its adjacency matrix, which is a two-dimensional matrix which has an entry in its <i, j> position to indicate that there is an edge between nodes i and j. The graph can alternatively be stored in terms of an adjacency list for every node, which list is a one-dimensional list stored for every node. The list for node i has an entry j to indicate that there is an edge between nodes i and j in the graph.

Obtaining a tree structure from a graph is a straightforward and fundamental task in computing as explained in Aho et al. (*The Design and Analysis of Computer Algorithms*, Addison Wesley, Reading: Mass., (1974)) and by Cormen et al. (*Introduction to Algorithms*, The MIT Press, Cambridge: Mass., (1989)). Such a tree is called a spanning tree. The details of a computation yielding a spanning tree are omitted as they can be found in any fundamental textbook in computer science are well known in the field. The method is briefly outlined as follows.

A preferred method for deriving a spanning tree from a graph entails starting from an arbitrary node, (for example, i,) and mark it as a "visited" node. The method would then recursively visit all the adjacent nodes of the most recently visited node, which have not been marked "visited" yet, and retain the edge between them. The tree would consist of the entire set of nodes and the retained edges.

Note that various tree representations of a graph are possible depending on the starting node and the sequence in which the nodes adjacent to a "visited" node are themselves "visited".

Trees can be generated for different perspectives of subject matter that is a three-dimensional structure. Obviously this factor could generate an almost infinite number of permutations for comparing a target tree to the database of trees. This problem can be addressed by considering that the problem of determining an appropriate tree representation for a tree-representable structure is problem dependant. It is by no means trivial. Since each item can be mapped into numerous spanning trees, and each target can, in turn, be mapped into numerous spanning trees, the optimal recognition based on the criteria of minimizing the constrained edit distance would involve a tree representation of the target item to all the tree representations of the items. Since the number of tree representations of the item is prohibitively large, it is therefore expedient to use just a representative set of so-called perspective trees for each pattern. The subset of trees that can be chosen to represent an item can be chosen using any criterion. One criterion could be to use the representation which are most "stringy"—in which each node has the minimum number of children. Other criteria could involve the representation that is the maximum/minimum spanning tree of the graph, where the edge-weights could be the functions of the node values themselves.

An alternate method for achieving the pattern recognition would be that of comparing a single tree representation of the target with a small subset of tree representations of the items. If the associated constrained distance between a tree representation of a item and the representation of the target is greater than a user-specified threshold value, the computation would request for a new tree representation of the target.

The Noisy Subsequence Tree Recognition Problem

To demonstrate the NSuT Recognition problem, let Y be a NsuT and X be any arbitrary element of the database means, also called the dictionary, H.

Generating the Data Structure Representation of the Dictionary

Figure 6:
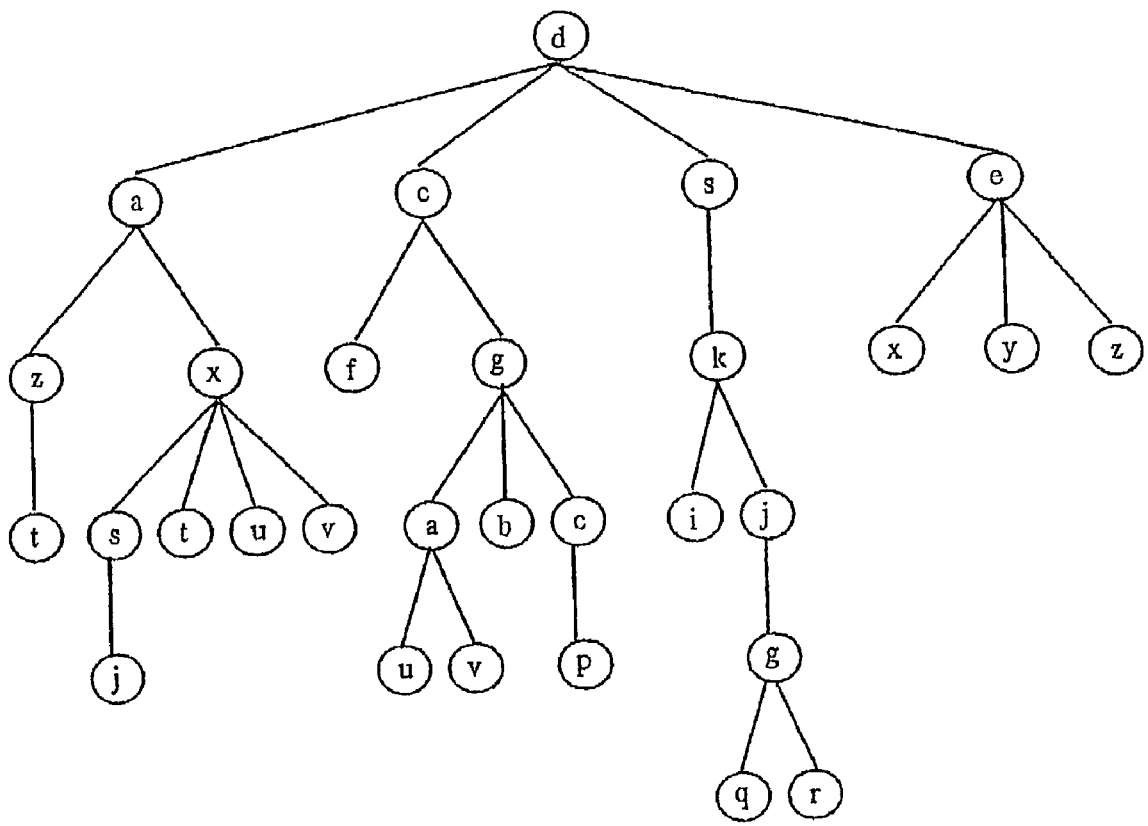
FIG. 6 demonstrates a tree from the finite dictionary H. Its associated list representation is as follows:
(((((t)z)(((j)s)(t)(u)(v)x)a)((f)(((u)(v)a)(b)((p)c)g)c)(((i)(((q)(r)g)j)k)s)((x)(y)(z)e)d)
Figure 7:
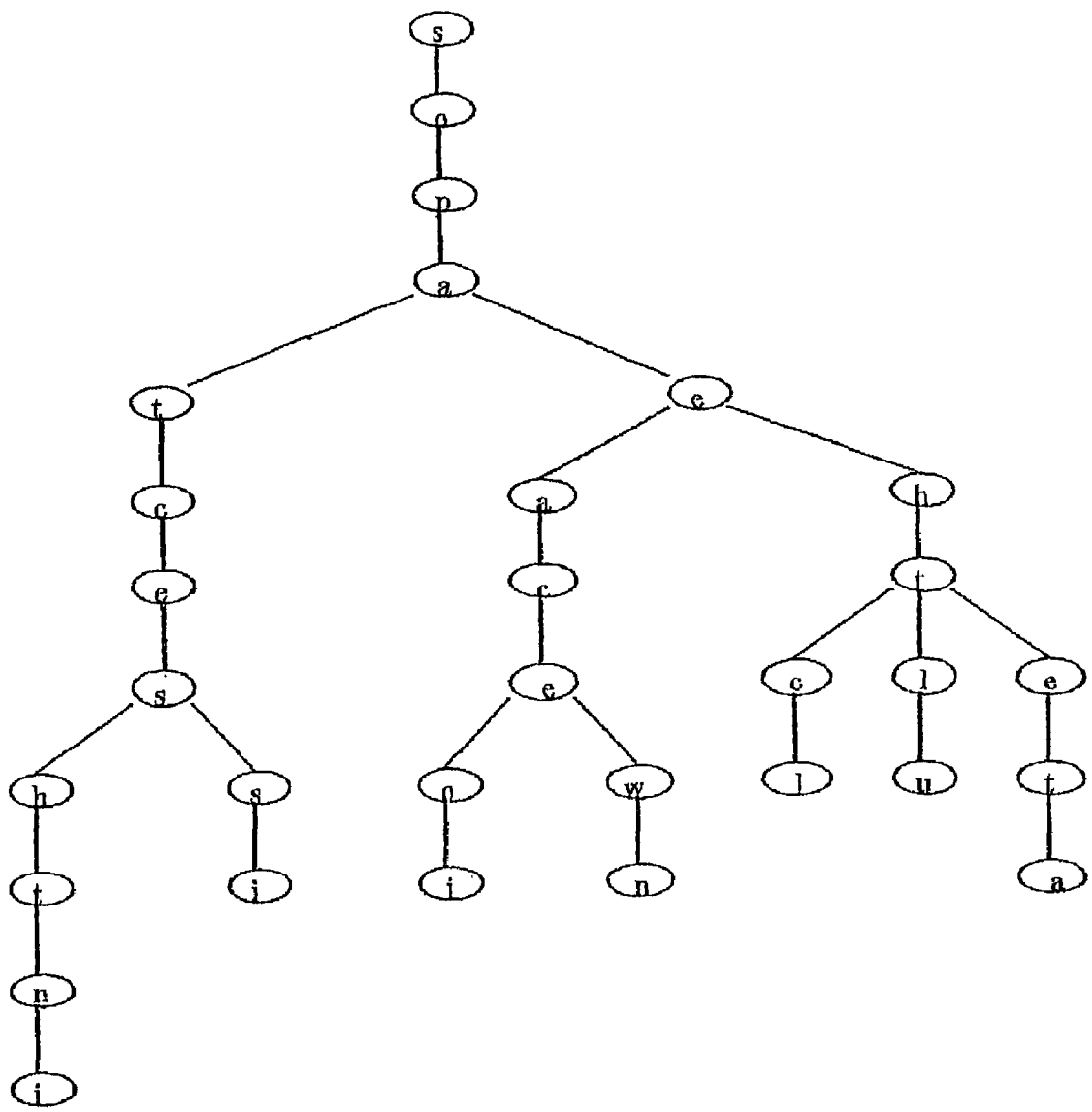
FIG. 7 presents the left-to-right postorder tree representation of a list obtained from a string.
String Represented: inthissectionwecalculatetheapos.
TreeRepresented:
((((((((((i)n)t)h)((i)s)s)e)c)t)((((((i)o)((n)w)e)c)a)((((l)c)((u)l)(((a)t)e)t)h)e)a)p)o)s)

Generating a dictionary from a set of tree structures is a straightforward task which is well known to one skilled in the art, and which involves storing the trees in their left-to-right post-order parenthesized representations as explained in Aho et al. (*The Design and Analysis of Computer Algorithms*, Addison Wesley, Reading: Mass., (1974)) and by Cormen et al. (*Introduction to Algorithms*, The MIT Press, Cambridge: Mass., (1989). A tree and its corresponding left-to-right postorder tree representation are given in FIG. 6.

In any implementation, the stored dictionary would contain the parenthesized representations of all the trees. The invention also considers other straightforward data structure representations of trees. In particular, the invention also considers the trivial extension where the right-to-left postorder ordering of the nodes of the tree is used instead of its left-to-right postorder ordering.

The Solution to NsuT Recognition

The methodology involves sequentially comparing Y with every element X of H, the basis of comparison being the constrained edit distance between two trees as defined by Oommen and Lee (*Information Sciences*, Vol. 77, pp. 253-273 (1994)). In general, the actual constraint used in evaluating the constrained distance can be any arbitrary edit constraint involving the number and type of edit operations to be performed. However, in this scenario a specific constraint which implicitly captures the properties of the corrupting mechanism ("channel") which noisily garbles U into Y is used. The algorithm which incorporates this constraint has been used to test the pattern recognition system yielding a remarkable accuracy. Experimental results for the NsuT recognition problem which involve manually constructed trees of sizes between 25 and 35 nodes and which contain an average of 21.8 errors per tree demonstrate that the scheme has about 92.8% accuracy. Similar experiments for randomly generated trees yielded an accuracy of 86.4%.

The solution to the Noisy Subsequence Tree Recognition Problem is described below.

Notations and Definitions

Let N be an alphabet and N* be the set of trees whose nodes are elements of N. Let $\mu$ be the null tree, which is distinct from $\lambda$, the null label not in N. A tree $T \in N^*$, with M nodes, is said to be of size $|T|=M$. The tree will be represented in terms of the left-to-right postorder numbering of its nodes. The advantages of this ordering are catalogued by Zhang and Shasha, (*SIAM J. Comput.* (1989)).

The invention also considers the trivial extension where the right-to-left postorder numbering of the nodes of the tree is used instead of the left-to-right postorder numbering of the nodes.

Let $T[i]$ be the $i^{th}$ node in the tree according to the left-to-right postorder numbering, and let $\delta(i)$ represent the postorder number of the leftmost leaf descendant of the subtree rooted at $T[i]$. Note that when $T[i]$ is a leaf, $\delta(i)=i$. $T[i \ldots j]$ represents the postorder forest induced by nodes $T[i]$ to $T[j]$ inclusive, of tree T. $T[\delta(i) \ldots i]$ will be referred to as Tree(i). Size(i) is the number of nodes in Tree(i). The father of i is denoted as $f(i)$. If $f^0(i)=i$, the node $f^k(i)$ can be recursively defined as $f^k(i)=f(f^{k-1}(i))$. The set of ancestors of i is: $Anc(i)=\{f^k(i)|0 \leq k \leq Depth(i)\}$.

An edit operation on a tree is either an insertion, a deletion or a substitution of one node by another. In terms of notation, an edit operation is represented symbolically as: $x \rightarrow y$ where x and y can either be a node label or $\lambda$, the null label. $x=\lambda$ and $y \neq \lambda$ represents an insertion; $x \neq \lambda$ and $y=\lambda$ represents a deletion; and $x \neq \lambda$ and $y \neq \lambda$ represents a substitution. Note that the case of $x=\lambda$ and $y=\lambda$ has not been defined—it is not needed.

Figure 2:
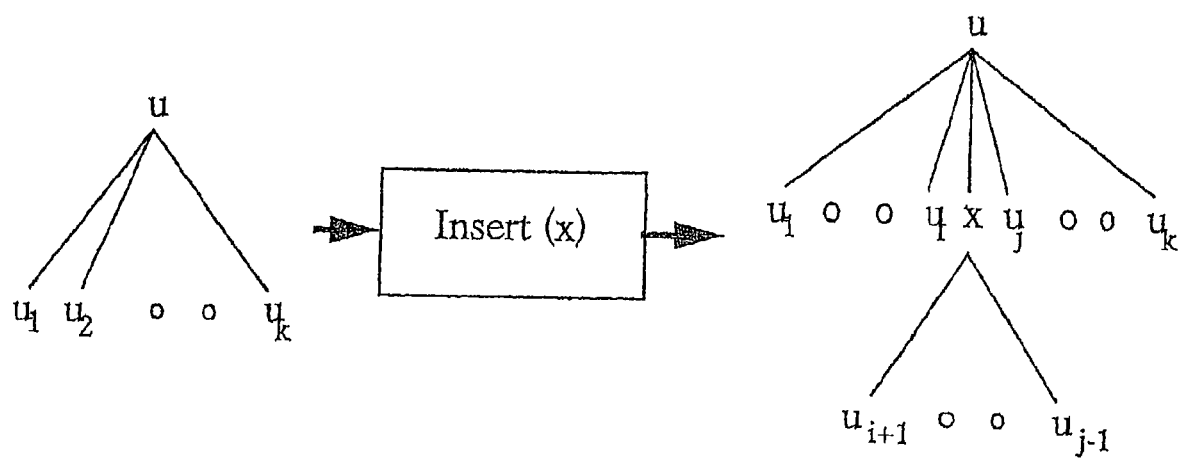
FIG. 2 presents an example of the insertion of a node in a tree.

The operation of insertion of node x into tree T states that node x will be inserted as a son of some node u of T. It may either be inserted with no sons or take as sons any subsequence of the sons of u. If u has sons $u_1, u_2, \ldots, u_k$, then for some $0 \leq i \leq j \leq k$, node u in the resulting tree will have sons $u_1, \ldots, u_i, x, u_j, \ldots, u_k$, and node x will have no sons if $j=i+1$, or else have sons $u_{i+1}, \ldots, u_{j-1}$. This edit operation is shown in FIG. 2.

Figure 3:
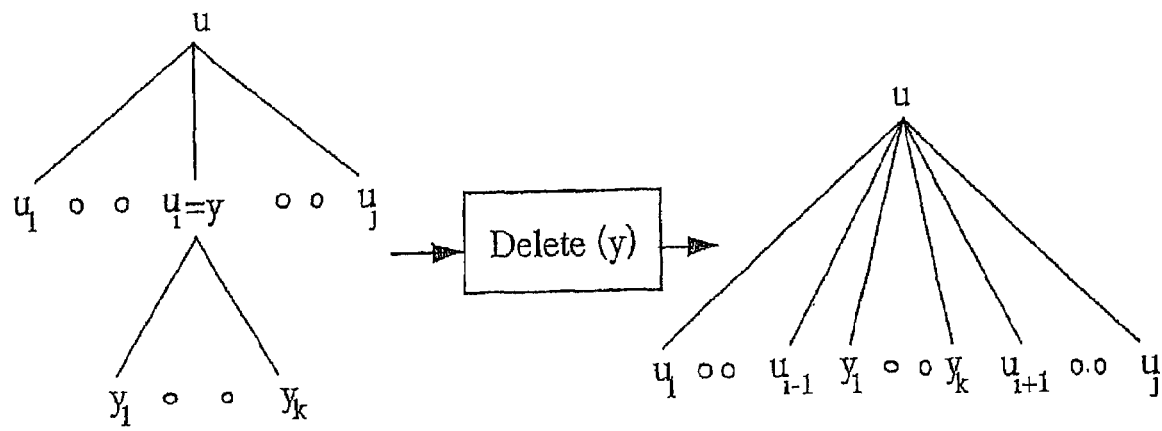
FIG. 3 presents an example of the deletion of a node in a tree.

The operation of deletion of node y from a tree T states that if node y has sons $y_1, y_2, \ldots, y_k$ and node u, the father of y, has sons $u_1, u_2, \ldots, u_j$ with $u_i=y$, then node u in the resulting tree obtained by the deletion will have sons $u_1, u_2, \ldots, u_{i-1}, y_1, y_2, \ldots, y_k, u_{i+1}, \ldots, u_j$. This edit operation is shown in FIG. 3.

Figure 4:
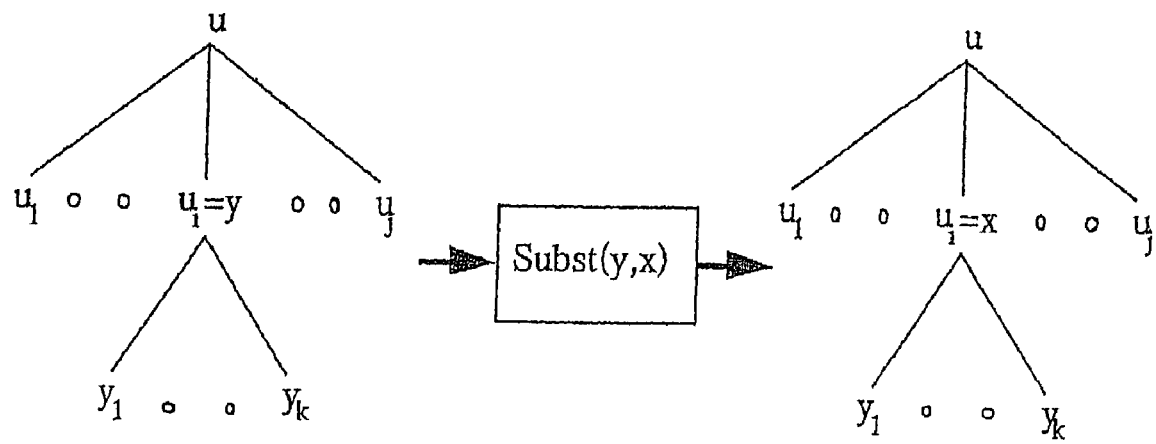
FIG. 4 presents an example of the substitution of a node by another in a tree.

The operation of substituting node x by node y in T states that node y in the resulting tree will have the same father and sons as node x in the original tree. This edit operation is shown in FIG. 4.

Let $d(x,y) \geq 0$ be the cost of transforming node x to node y. If $x \neq \lambda \neq y$, $d(x,y)$ will represent the cost of substitution of node x by node y. Similarly, $x \neq \lambda$, $y=\lambda$ and $x=\lambda$, $y \neq \lambda$ will represent the cost of deletion and insertion of node x and y respectively. The distances $d(.,.)$ obey:

$$d(x,y) \geq 0;\ d(x,x)=0; \quad (1)$$

$$d(x,y)=d(y,x);\ \text{and}$$

$$d(x,z) \leq d(x,y)+d(y,z)$$

where (3) is essentially a "triangular" inequality constraint.

Let S be a sequence $s_1, \ldots, s_k$ of edit operations. An S-derivation from A to B is a sequence of trees $A_0, \ldots, A_k$ such that $A=A_0$, $B=A_k$, and $A_{i-1} \rightarrow A_i$ via $s_i$ for $1 \leq i \leq k$. The inter-node edit distance $d(.,.)$ is extended to the sequence S by assigning:

$$W(S) = \sum_{i=1}^{|S|} d(s_i).$$

With the introduction of W(S), the distance between $T_1$ and $T_2$ can be defined as follows: $D(T_1,T_2)=\text{Min}\ \{W(S)|S$ is an S-derivation transforming $T_1$ to $T_2\}$. It is easy to observe that:

$$D(T_1,T_2) \leq d(T_1[|T_1|], T_2[|T_2|]) + \sum_{i=1}^{|T_1|-1} d(T_1[i], \lambda) + \sum_{j=1}^{|T_2|-1} d(\lambda, T_2[j]).$$

The operation of mapping between trees is a description of how a sequence of edit operations transforms $T_1$ into $T_2$. A pictorial representation of a mapping is given in FIG. 5. Informally, in a mapping the following holds:

(i) Lines connecting $T_1[i]$ and $T_2[j]$ correspond to substituting $T_1[i]$ by $T_2[j]$.

(ii) Nodes in $T_1$ not touched by any line are to be deleted.

(iii) Nodes in $T_2$ not touched by any line are to be inserted.

Formally, a mapping is a triple $(M, T_1, T_2)$, where M is any set of pairs of integers $(i,j)$ satisfying:

(i) $1 \leq i \leq |T_1|$, $1 \leq j \leq |T_2|$;

(ii) For any pair of $(i_1,j_1)$ and $(i_2,j_2)$ in M, (a) $i_1=i_2$ if and only if $j_1=j_2$ (one-to-one).

(b) $T_1[i_1]$ is to the left of $T_1[i_2]$ if and only if $T_2[j_1]$ is to the left of $T_2[j_2]$ (the Sibling Property).

(c) $T_1[i_1]$ is an ancestor of $T_1[i_2]$ if and only if $T_2[j_1]$ is an ancestor of $T_2[j_2]$ (the Ancestor Property).

Whenever there is no ambiguity, M will be used to represent the triple $(M, T_1, T_2)$, the mapping from $T_1$ to $T_2$. Let I, J be sets of nodes in $T_1$ and $T_2$, respectively, not touched by any lines in M. Then the cost of M can be defined as follows:

$$\cos t(M) = \sum_{(i,j)\in M} d(T_1[i], T_2[j]) + \sum_{i\in I} d(T_1[i], \lambda) + \sum_{j\in J} d(\lambda, T_2[j]).$$

Since mappings can be composed to yield new mappings (see Tai (*J. ACM*, Vol 26, pp 422-433 (1979)), and Zhang and Shasha (*SIAM J. Comput*. Vol. 18, No. 6: pp. 1245-1262 (1989))), the relationship between a mapping and a sequence of edit operations can now be specified.

Lemma I.

Given S, an S-derivation $s_1, \ldots, s_k$ of edit operations from $T_1$ to $T_2$, there exists a mapping M from $T_1$ to $T_2$ such that cost (M)$\leq$W(S). Conversely, for any mapping M, there exists a sequence of editing operations such that W(S)=cost (M).

Proof: Same as the proof of Lemma 2 by Zhang and Shasha (*SIAM J. Comput*. Vol. 18, pp. 1245-1262 (1989)).

Due to the above lemma, it can be seen that:

$D(T_1,T_2)$=Min {cost($M$)|$M$ is a mapping from $T_1$ to $T_2$}.

Thus, to search for the minimal cost edit sequence, a search has only to be performed for the optimal mapping.

The Process of Constrained Tree Editing Applied to Recognizing Subsequence Trees Each of the processes involved in the recognition of NsuTs is described below using both figures and algorithmic notation.

Process RecognizeSubsequenceTree

Figure 8:
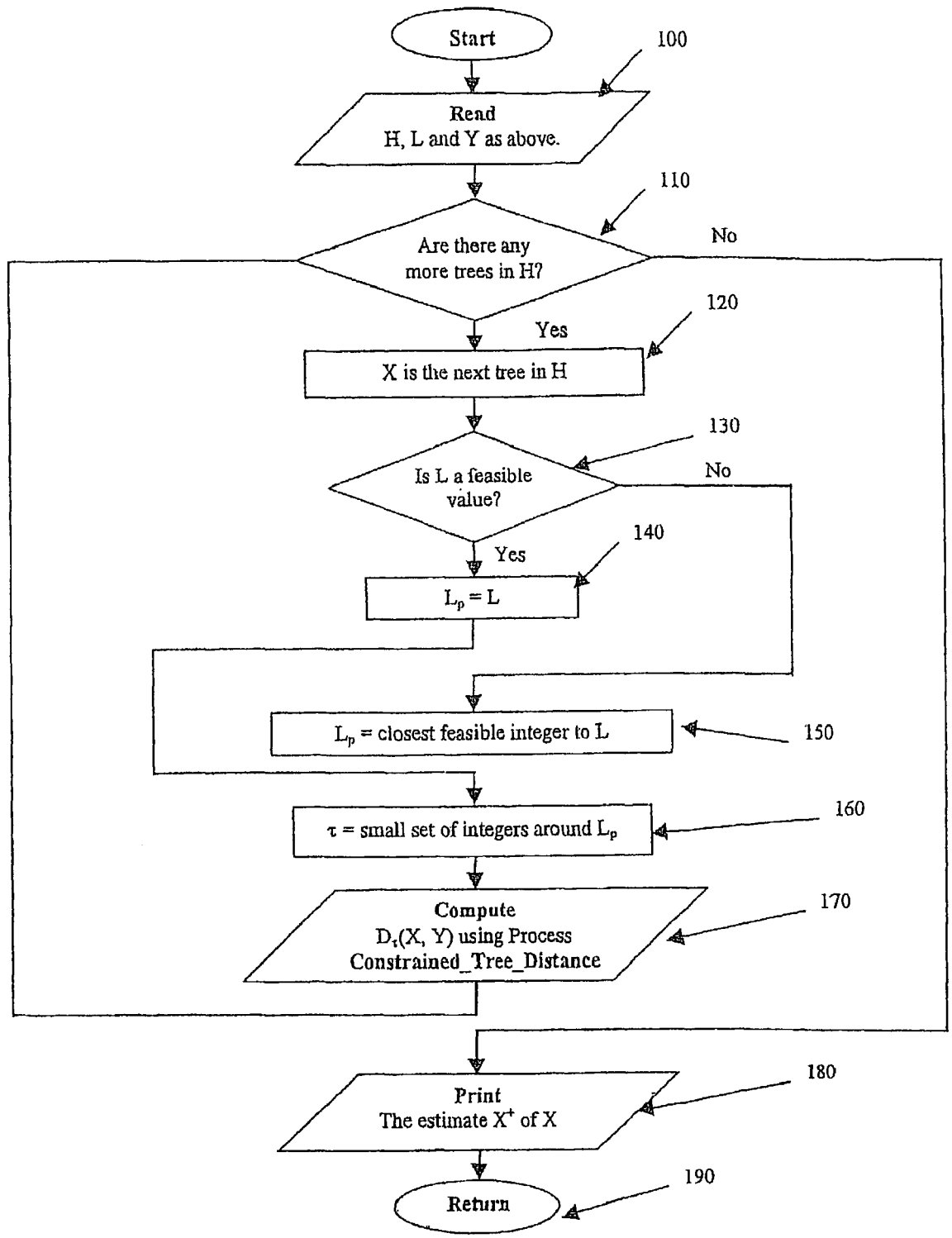
FIG. 8 presents a schematic diagram showing the Process RecognizeSubsequenceTrees used to solve the Noisy Subsequence Tree Recognition Problem. The input comprises (1) the finite dictionary, H, (2) Y, a noisy version of a subsequence tree of an unknown X* in H, and (3) L, the expected number of substitutions in Y. The output comprises the estimate $X^+$ of X*. If L is not a feasible value $L_p$ is the closest feasible integer. The set of elementary edit distances {d(.,.)} is assumed global.

The solution to the NsuT Recognition problem is achieved by the Process RecognizeSubsequenceTrees shown in FIG. 8. FIG. 8 commences in 100 with the input being presented. The input, first of all, consists of the Dictionary, H. It also includes L, the expected number of feasible substitutions caused in the garbling process for the particular problem domain. It finally includes the noisy subsequence tree, Y, which is used to determine its parent whence its ungarbled version was obtained. A decision is first made in block 110 determining if there are any more trees in H. If the answer to this query is "no", the estimate $X^+$ of $X^*$ is printed in block 180. If there are more trees in H, control is given to block 120, where an assignment to X is made of the next tree in H. Another decision is now invoked in block 130 to determine if L is a feasible value. If it is not, then the closest feasible integer to L is assigned into $L_p$. This occurs in block 150. If the decision from 130 is "yes", then $L_p$ is assigned the value L at block 140. Another assignment is made in block 160 to τ, which is assigned to be a small set of integers around $L_p$. In the absence of any other information, the best estimate of the number of substitutions that could have taken place is indeed its expected value, L, which is usually close to the size of the NSuT, Y. In the examples shown in this submission, this is set to be |Y|−1, since the probability of a node value being substituted is usually very close to unity.

One could therefore use the set {L} as the constraint set to effectively compare Y with any X∈H. Since the latter set can be quite restrictive, a constraint set which is a superset of {L} marginally larger than {L} is suggested. The superset used in the examples presented in this submission is the set $\{L_p-1, L_p, L_p+1\}$. At this juncture the process computes $D_\tau(X, Y)$ by invoking Process Constrained_Tree_Distance in block 170, and then control is returned to 110, where the process is repeated again until there are no more trees in H.

The Process RecognizeSubsequenceTrees described above is formally described algorithmically below.

Figure 9:
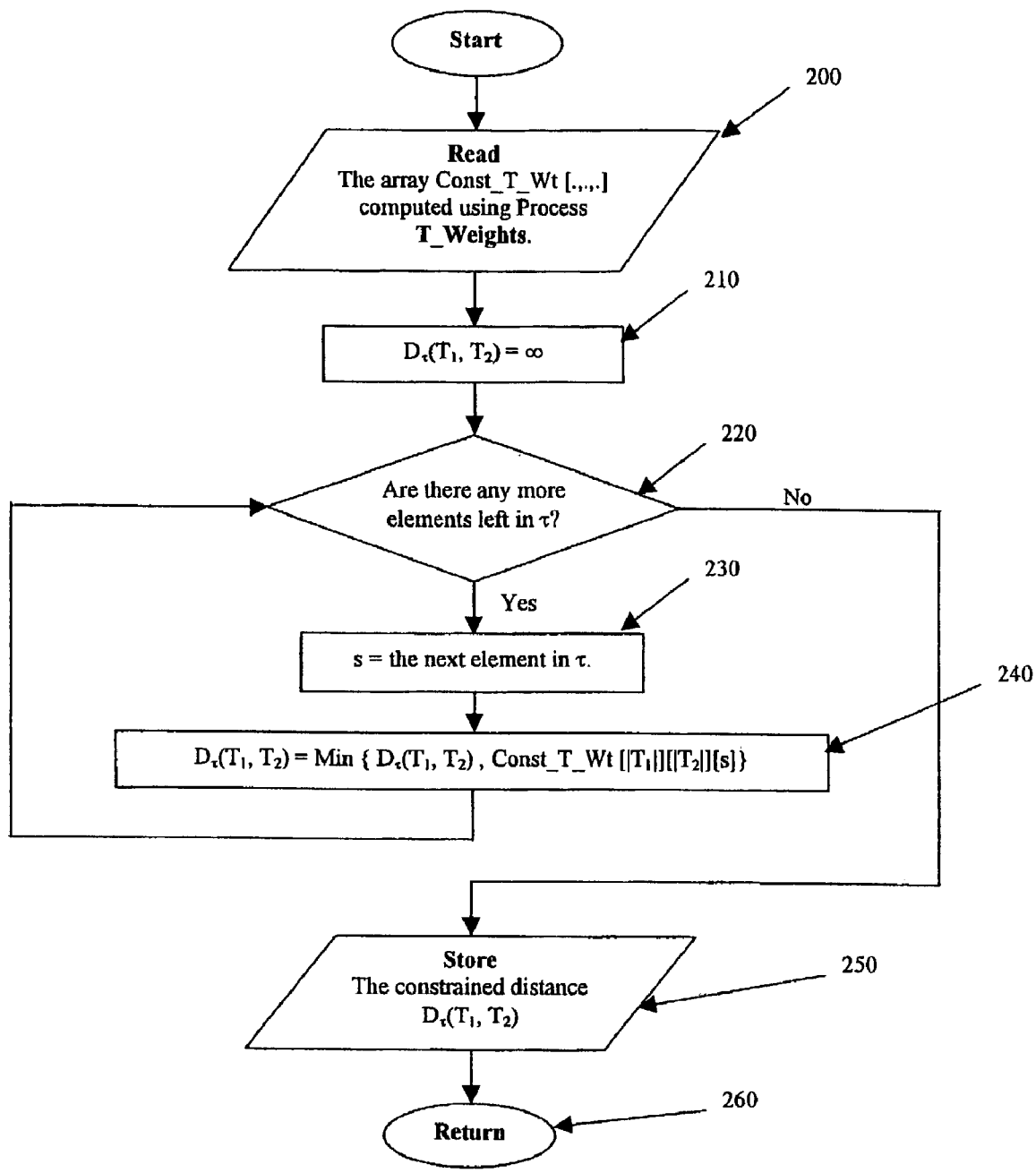
FIG. 9 is a schematic diagram showing the Process Constrained_Tree_Distance. The input comprises the array Const_T_Wt[.,.,.] computed using Process T_Weights and constraint τ given as a set of the number of substitutions used in the constrained editing process. The output comprises the constrained distance $D_τ(T_1, T_2)$.

PROCESS RecognizeSubsequenceTrees
Input: 1. The finite dictionary H.
  2. Y, a noisy version of a subsequence tree of an unknown X* in H.
  3. L, the expected number of substitutions that took place in the transmission. In the examples shown in this submission, this is set to be |Y|−1, since the probability of a node value being substituted is usually very close to unity.
Output: The estimate $X^+$ of $X^*$. If L is not a feasible value $L_p$ is the closest feasible integer.
BEGIN
  For every tree X∈H do
  Begin
    If L is a feasible value then
      $L_p$=L
    Else
      $L_p$=closest feasible integer to L
    EndIf
    τ=Superset of {L} marginally larger than {L}
    Compute $D_\tau(X,Y)$ using Algorithm Constrained_Tree_Distance
  End
  $X_+$ is the tree minimizing $D_\tau(X,Y)$
END Process RecognizeSubsequenceTrees Process Constrained_Tree_Distance The Process RecognizeSubsequenceTrees invokes the Process Constrained_Tree_Distance shown in FIG. 9. FIG. 9 starts off in block 200 by reading in the array Const_T_Tw [.,.,.] computed using the Process T_Weights which is assumed to have been invoked. It then, in block 210, passes control to an assignment statement setting $D_\tau(T_1, T_2)$ to be infinite. A decision is then made in block 220 of whether there are any more elements left in τ. If there is none, control is passed to an Input/Output block at block 250, where the constrained distance $D_\tau(T_1, T_2)$ is stored. If the decision from block 220 is "yes", control passes to an assignment statement in block 230, assigning s to take on the value of the next element in τ. Subsequently, in block 240 the minimum of the current value of $D_\tau(T_1, T_2)$ and Const_T_Wt [|T_1|][|T_2|][s] is recorded in $D_\tau(T_1, T_2)$, and the control then returns to the decision block 220. This describes a loop which terminates when there are no more elements in τ.

The Process Constrained_Tree_Distance described above is formally described algorithmically below.

Figure 10:
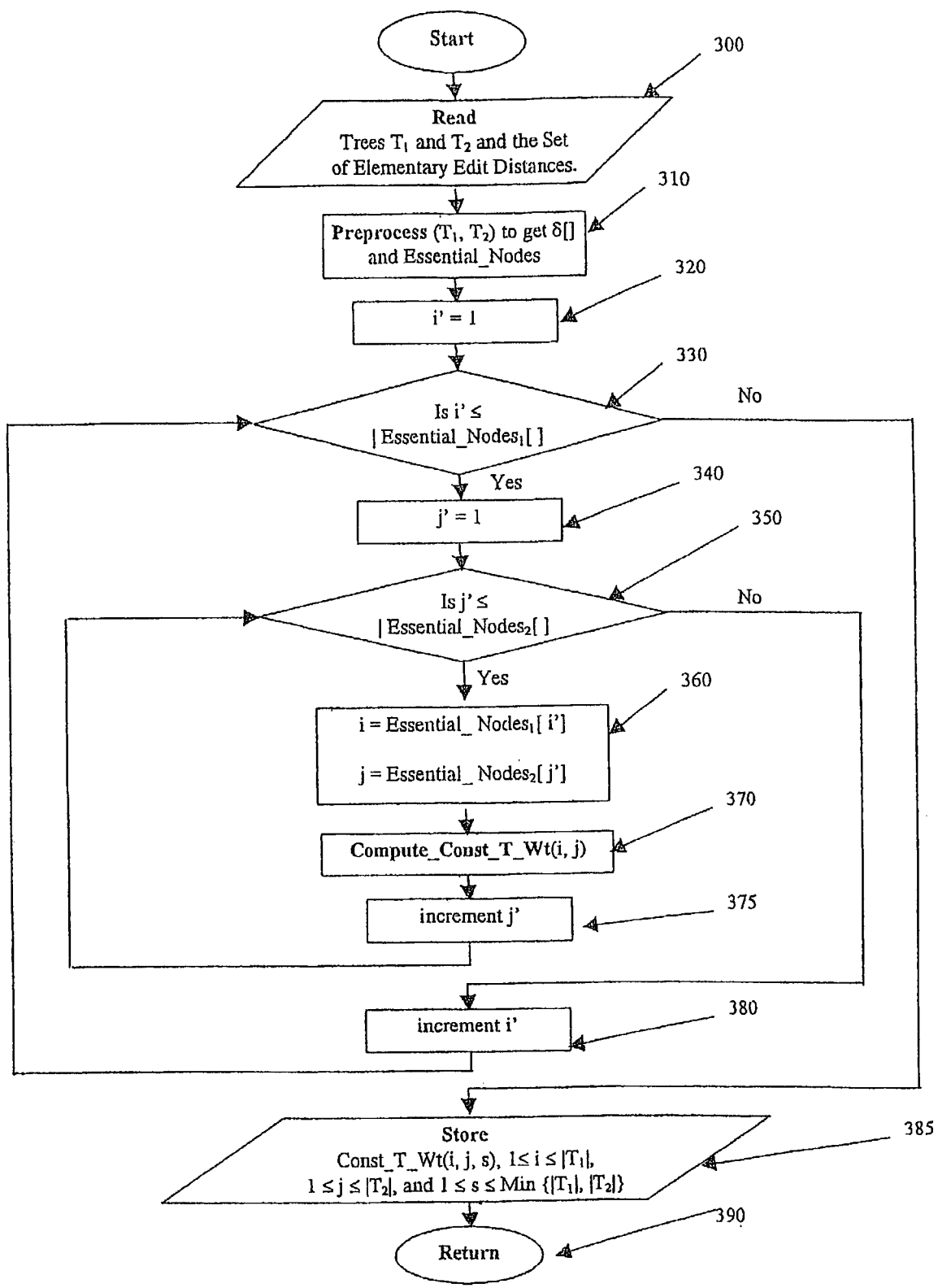
FIG. 10 is a schematic diagram showing the Process T_Weights. The input comprises Trees $T_1$ and $T_2$ and the Set of Elementary Edit Distances. The output comprises Const_T_Wt(i, j, s), for $1 \leq i \leq |T_1|$, $1 \leq j \leq |T_2|$, and $1 \leq s \leq \text{Min}\{|T_1|, |T_2|\}$.

PROCESS Constrained_Tree_Distance
Input: The array Const_T_Wt [.,.,.] computed after first invoking Process T_Weights.
Output: The constrained distance $D_\tau(T_1,T_2)$ with τ=Superset of {L} marginally larger than {L}
BEGIN
  Invoke Process T_Weights and store the results in array Const_T_Wt [.,.,.]
  $D_\tau(T_1,T_2)=\infty$;
  For all s in τ Do
    $D_\tau(T_1,T_2)$=Min $\{D_\tau(T_1,T_2),$ Const_T_Wt $[|T_1|][|T_2|][s]\}$
  EndFor
END Process Constrained_Tree_Distance
  Process T_Weights The Process Constrained_Tree_Distance first invokes the Process T_Weights shown in FIG. 10. FIG. 10 begins with an Input/Output block (block 300) where the Trees $T_1$ and $T_2$ and the set of elementary edit distances are read into the system. It then invokes the Process Preprocess($T_1$, $T_2$) to get δ[ ] and Essential_Nodes of both trees in block 310. This is followed by an assignment of the variable i' to unity in block 320. A decision block is then invoked in 330 to determine of i' is less than or equal to |Essential_Nodes$_1$[ ]|—this constitutes the start of a looping structure. If it is not, an Input/Output operation is performed in block 385, where the values of Const_T_Wt(i, j, s) are stored for i between 1 and |T$_1$|, i between 1 and |T$_2$|, and s is between 1 and the minimum of |T$_1$| and |T$_2$|. If the decision from block 330 is "yes", an assignment of j' to unity occurs in 340, followed by another decision block (forming an inner loop) in 350 to see if j' is less than or equal to |Essential_Nodes$_2$[ ]|. If the output of this decision block is "no", then i' is incremented in 380, and control is returned to block 330, which constitutes the outer loop. If the decision from block 350 is "yes", an assignment block (360) occurs where i is set to the next value in Essential_Nodes$_1$, which is Essential_Nodes$_1$[i'], and j is set to the next value in Essential_Nodes$_2$, which is Essential_Nodes$_2$[j']. This is followed by invoking the Process Compute_Const_Wt for values of i and j in 370. This leads to the final statement in the loop, at block 375, where j' is incremented, and control is returned to block 350, the top of the inner loop.

The Process T_Weights described above is formally described algorithmically below.

PROCESS T_Weights
Input: Trees $T_1$ and $T_2$ and the set of elementary edit distances.
Output: Const_T_Wt[i, j, s], $1 \leq i \leq |T_1|$, $1 \leq j \leq |T_2|$, and $1 \leq s \leq \text{Min}\{|T_1|, |T_2|\}$.
Assumption: The Process Preprocess has been invoked with trees $T_1$ and $T_2$ to yield the δ[ ] and Essential_Nodes [ ] arrays for both trees. These quantities are assumed to be global.
BEGIN
  Preprocess ($T_1$,$T_2$);
  For i'=1 to |Essential_Nodes$_1$[ ]| Do
    For j'=1 to |Essential_Nodes$_2$[ ]| Do
      i=Essential_Nodes$_1$[i'];
      j=Essential_Nodes$_2$[j'];
      Compute_Const_T_Wt(i, j);
    EndFor
  EndFor
END Process T_Weights.

Process Preprocess

Figure 11:
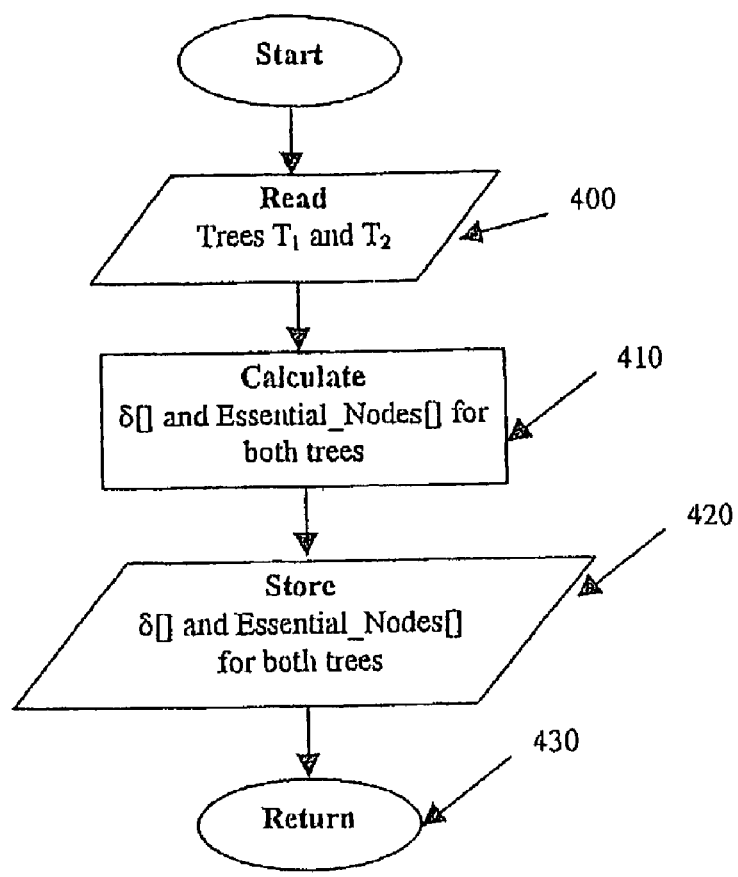
FIG. 11 is a schematic diagram showing the Process Preprocess_For_TWeights. The input comprises Trees $T_1$ and $T_2$. The outputs are the δ[ ] and Essential_Nodes[ ] for both trees.

The Process T_Weights first invokes the Process Preprocess shown in FIG. 11. FIG. 11 starts off with a sequence of Input/Output operations in block 400 where both the trees $T_1$ and $T_2$ are read in. Subsequently, in block 410 the δ[ ] and Essential_Nodes[ ] for both trees are calculated. Finally, these two variables are stored back into the system in block 420, before returning in 430. The Process Preprocess is so straightforward and so its formal algorithmic description is omitted.

Figure 12:
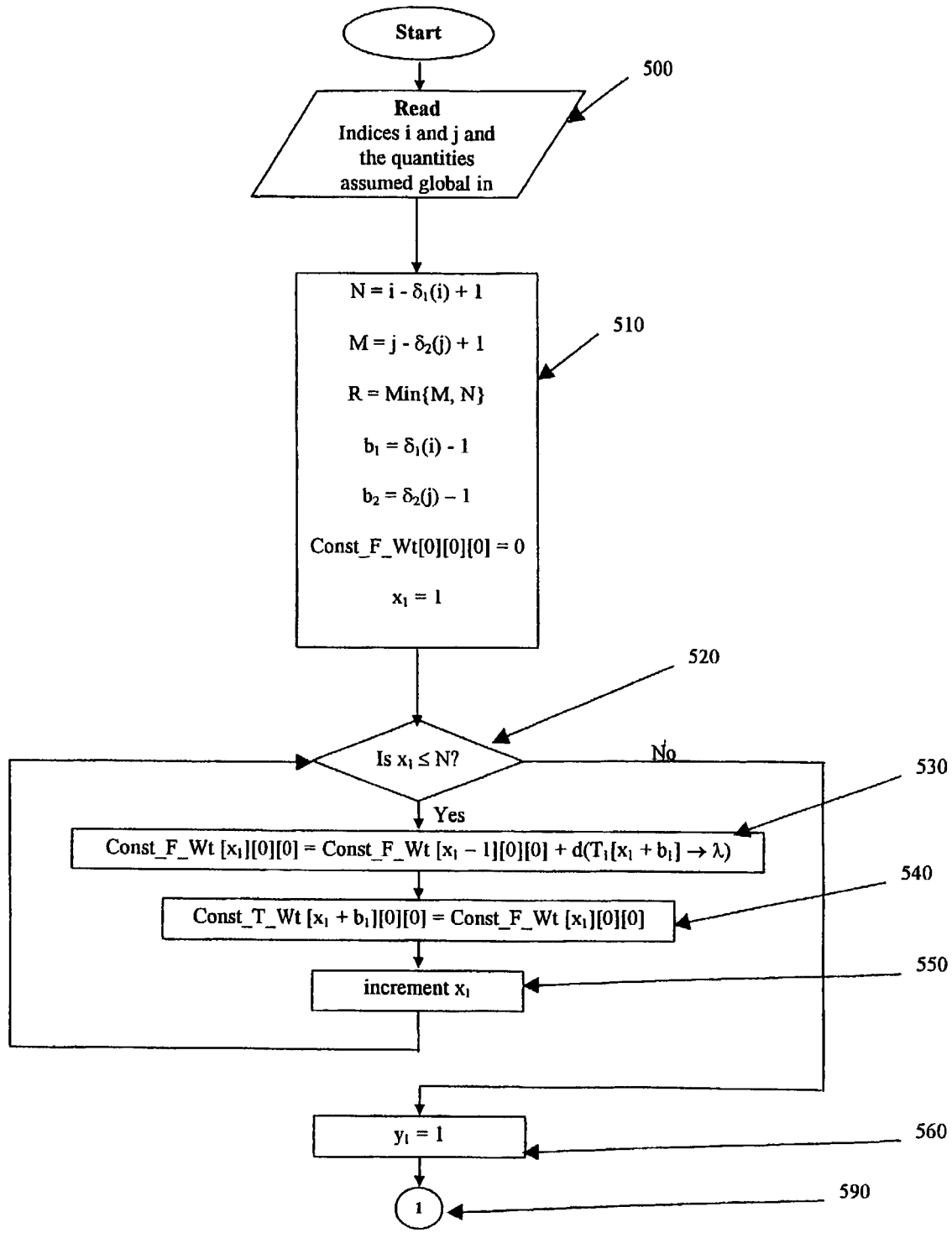
FIG. 12 is a schematic diagram showing the Process Compute_Const_T_Wt. The input comprises the indices i, j and the quantities assumed global in T_Weights. The output comprises the array Const_TWt[$i_1,j_1$,s], $δ_1(i) \leq i_1 \leq i$, $δ_2(j) \leq j_1 \leq j$, $0 \leq s \leq \text{Min}\{\text{Size}(i), \text{Size}(j)\}$.

This leads us to the Process which does most of the computing, the Process Compute_Const_T_Wt shown in a sequence of figures starting from FIG. 12.

Process Compute_Const_T_Wt

FIG. 12 commences in block 500 with an Input/Output operation where the indices i and j and the quantities assumed global in the Process T_Weights are read in. A series of assignments in block 510 then occurs with the following assignments which are essentially initializations of the local variables:

$N = i - \delta_1(i) + 1$
$M = j - \delta_2(j) + 1$
$R = \text{Min}\{M, N\}$
$b_1 = \delta_1(i) - 1$
$b_2 = \delta_2(j) - 1$
Const_F_Wt[0][0][0]=0, and
$x_1 = 1$.

A decision in block 520 is invoked to determine if $x_1$ is less than or equal to N—this is the beginning of a loop. If it is not, control is passed to block 560, where $y_1$ is initialized to be 1. Control is then passed to block 590, which leads to the next phase of this method. If the decision in block 520 is "yes", the assignments:

Const_F_Wt $[x_1][0][0]$=Const_F_Wt $[x_1-1][0][0]+d$
   $(T_1[x_1+b_1] \to \lambda)$, and Const_T_Wt $[x_1+b_1][0][0]$=Const_F_Wt $[x_1][0][0]$ occur in blocks 530, and 540 respectively. This is followed by incrementing $x_1$ in block 550. The Process continues in FIG. 13.

Figure 13:
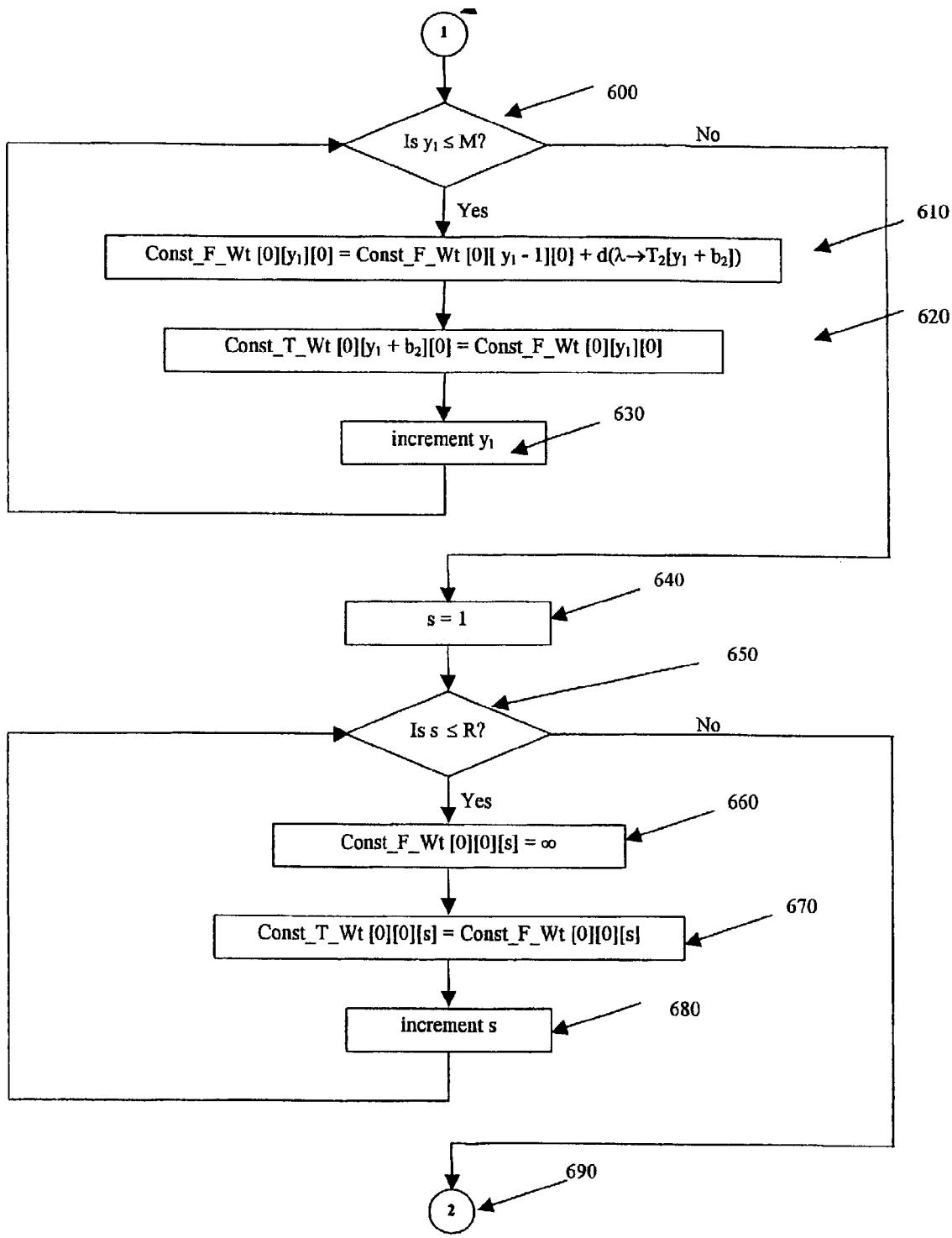
FIG. 13 is a schematic diagram showing the steps of the Process Compute_Const_T_Wt subsequent to those shown in FIG. 12.

FIG. 13 continues where FIG. 12 left off, starting with a decision in block 600, where a test is invoked to see if $y_1$ is less than or equal to M. This initiates another loop. If it is not, control is passed on to block 640 explained presently. If however, the test in block 600 returns a "yes", the assignments:

Const_F_Wt $[0][y_1][0]$=Const_F_Wt $[0][y_1-1][0]+d$
   $(\lambda \to T_2[y_1+b_2])$, and Const_T_Wt $[0][y_1+b_2][0]$=Const_F_Wt $[0][y_1][0]$ in blocks 610 and 620 respectively are done. The final block in the loop, labeled 630, increments $y_1$ before it passes control back to block 600. Continuing from the response of "no" from block 600, the process carries out an assignment of s to 1 in block 640. This is followed by the decision to test if s is less than or equal to R in block 650—which constitutes the entry of another loop. If the answer to block 650 is "no", control is passed to block 690, which is the next phase of this process. If, however, the answer to block 650 is "yes", the following assignments occur in blocks 660 and 670 respectively:

Const_F_Wt $[0][0][s]=\infty$, and

Const_T_Wt $[0][0][s]$=Const_F_Wt $[0][0][s]$.

Finally, s is incremented in block 680 before control is returned to block 650 for the next iteration of the loop. The process continues in FIG. 14.

Figure 14:
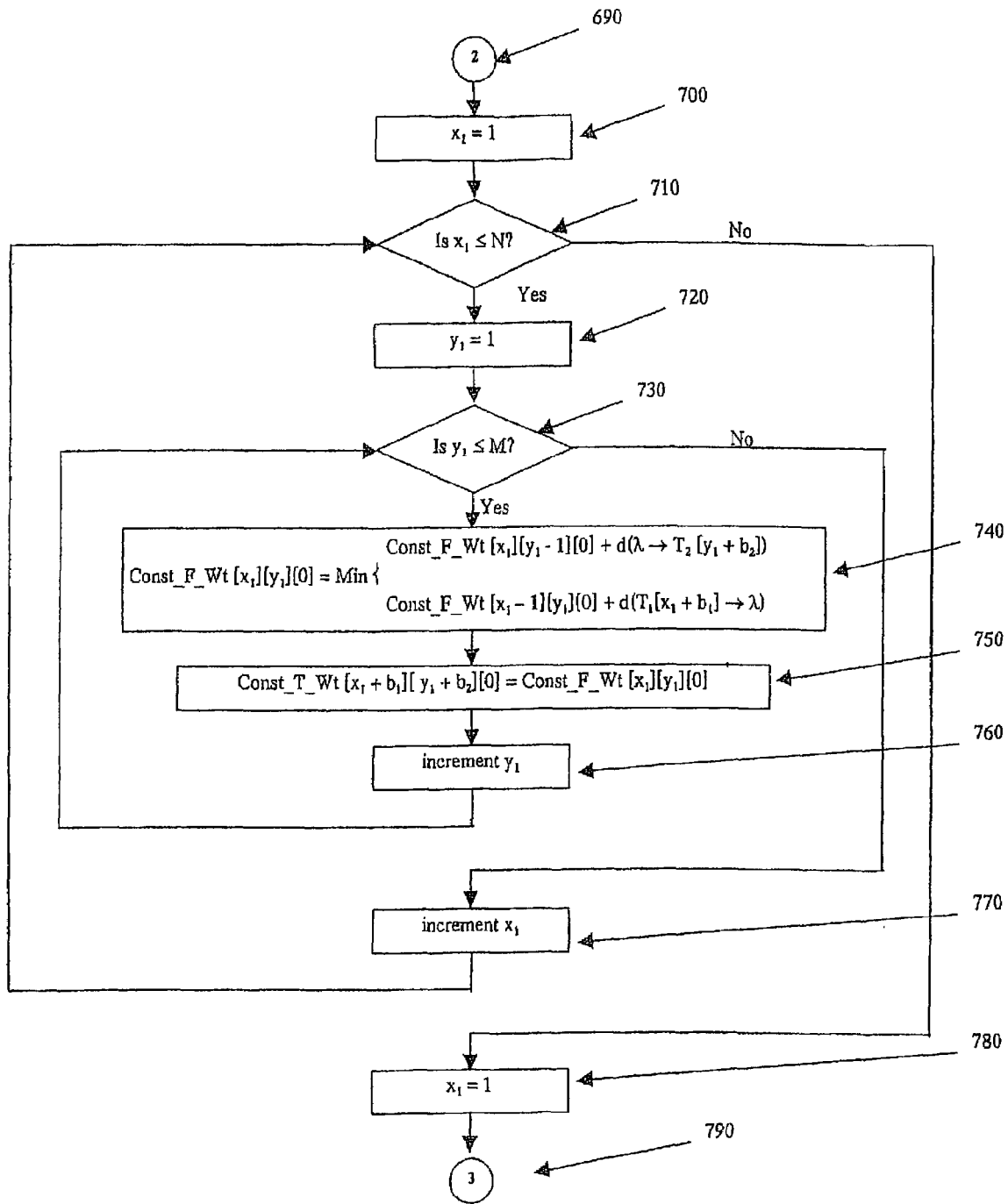
FIG. 14 is a schematic diagram showing the steps of the Process Compute_Const_T_Wt subsequent to those shown in FIG. 13.

FIG. 14 further develops the Process (Compute_Const_T_Wt) with an assignment of $x_1$ to 1 in block 700. Thereafter the Process makes a decision in block 710 to test if $x_1$ is less than or equal to N—which initializes a loop. If the decision in block 710 is "no", control is passed to block 780 (which is an assignment of $x_1$ to 1) which then passes control to the next phase of the method, block 790. If, on the other hand, the decision to block 710 is "yes", the assignment $y_1=1$ occurs in block 720, and another loop whose starting decision block is at block 730 is encountered. This block tests the query "is $y_1$ less than or equal to M?". If the answer to this query is "no", control is passed to 770, which increments $x_1$, before finishing this iteration of the inner loop and passing control back to 710. If the answer to this query is "yes", the following assignments are computed in block 740 and 750 respectively:

Const_F_Wt [$x_1$][$y_1$][0]=the minimum of
(a) Const_F_Wt [$x_1$][$y_1-1$][0]+d($\lambda \to T_2$ [$y_1+b_2$]), and
(b) Const_F_Wt [$x_1-1$][$y_1$][0]+d($T_1[x_1+b_1] \to \lambda$), and
(c) Const_T_Wt [$x_1+b_1$][$y_1+b_2$][0]=Const_F_Wt [$x_1$][$y_1$][0].

The outer loop concludes each iteration by incrementing $y_1$ in block 760 before control being passed back to block 730. FIG. 14 continues to the subsequent operations of the Process in FIG. 15.

Figure 15:
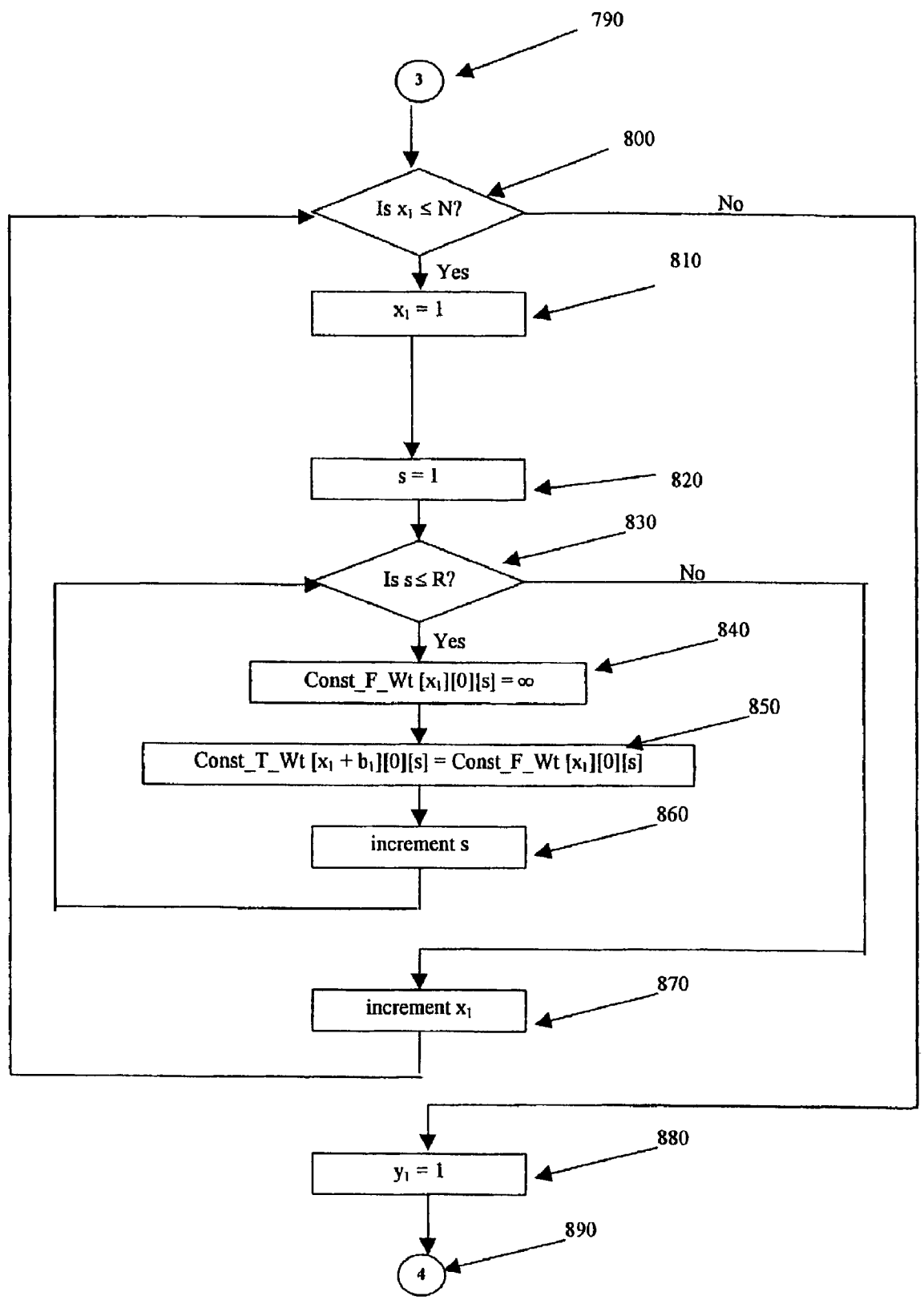
FIG. 15 is a schematic diagram showing the steps of the Process Compute_Const_T_Wt subsequent to those shown in FIG. 14.

FIG. 15 continues the Process with the test "is $x_1$ less than or equal to N?" in block 800. Again, this is the beginning of a loop. If the test in block 800 returns a negative answer, control is passed to block 880 where $y_1$ is set to 1 before going on to the next phase in block 890. If the test in block 800 returns a positive answer, the Process does an assignment of $x_1=1$ in block 810, followed by another assignment of $s=1$ in block 820. At this juncture the Process initiates another looping decision block at block 830, which queries if s is less than or equal to R. If the answer to the query in block 830 is "no", control is passed to block 870, where $x_1$ is increased by one and the control flows back to block 800. If the answer to the query in block 830 is "yes", control is passed to blocks 840 and 850 with the following assignments:

Const_F_Wt [$x_1$][0][s]=∞, and

Const_T_Wt [$x_1+b_1$][0][s]=Const_F_Wt [$x_1$][0][s].

This is followed by incrementing s before control is passed back to block 830. The Process continues in FIG. 16.

Figure 16:
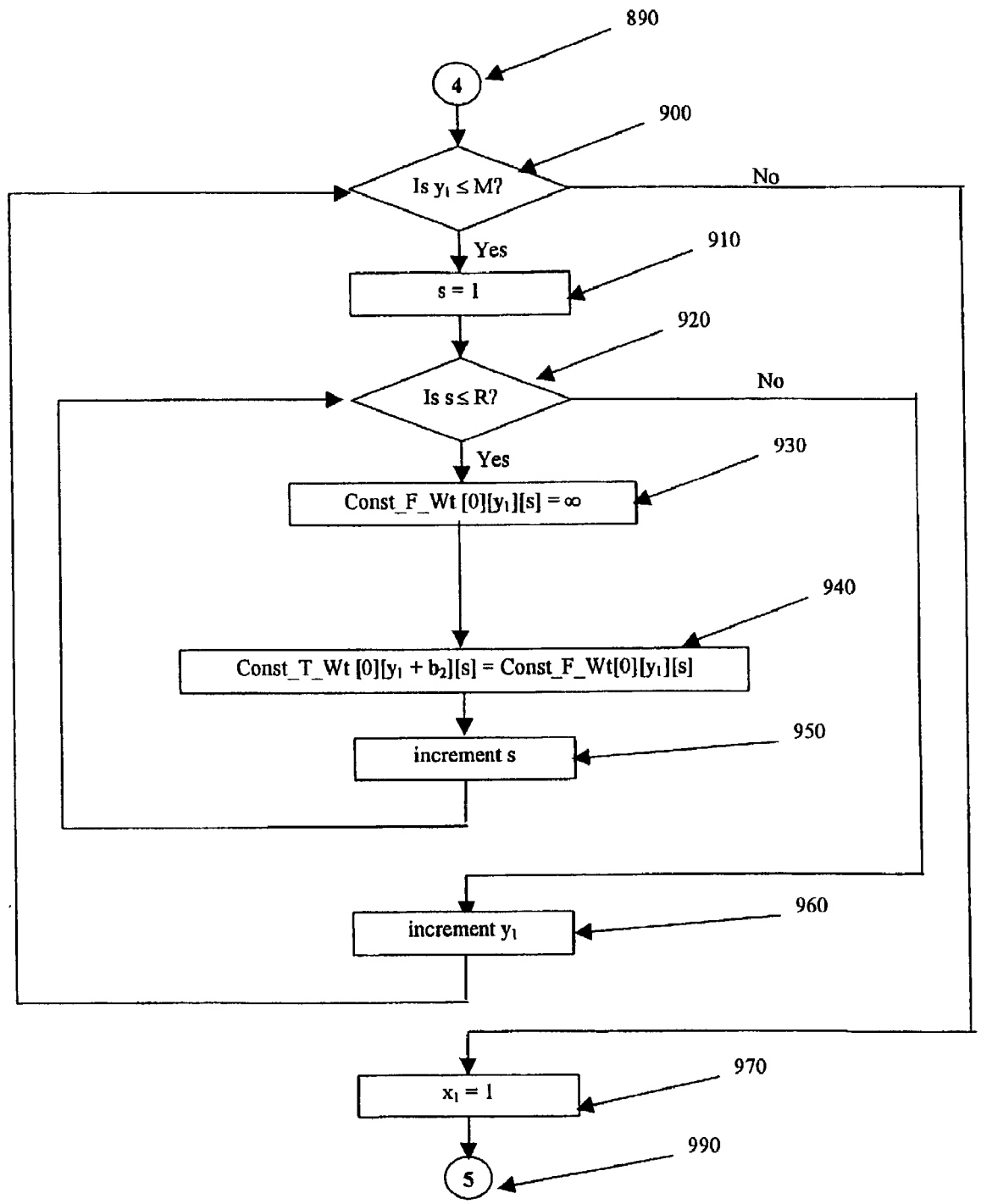
FIG. 16 is a schematic diagram showing the steps of the Process Compute_Const_T_Wt subsequent to those shown in FIG. 15.

FIG. 16 continues the process where FIG. 15 left off. The first block is a loop-initializing decision in block 900 evaluating the question "is $y_1$ less than or equal to M?". If the answer to the query in block 900 is in the negative, control is passed to block 970 with the assignment $x_1=1$ before proceeding to the next figure (FIG. 17) in block 990. If the answer to the query in block 900 is in the positive, block numbered 910 is encountered where s is initialized to 1. The process then embarks on another loop-initializing decision in block 920 where the question "is s less than or equal to R" is processed. If the answer to the query in block 920 is "no", control is passed to block 960 where $y_1$ is incremented before control is passed back to block 900. If the answer from block 920 is "yes", the following assignment statements are done in blocks 930 and 940 respectively:

Const_F_Wt [0][$y_1$][s]=∞, and

Const_T_Wt [0][$y_1+b_2$][s]=Const_F_Wt[0][$y_1$][s].

Before returning to block 920, s is incremented in block 950. The Process continues in FIGS. 17 and 18.

Figure 17:
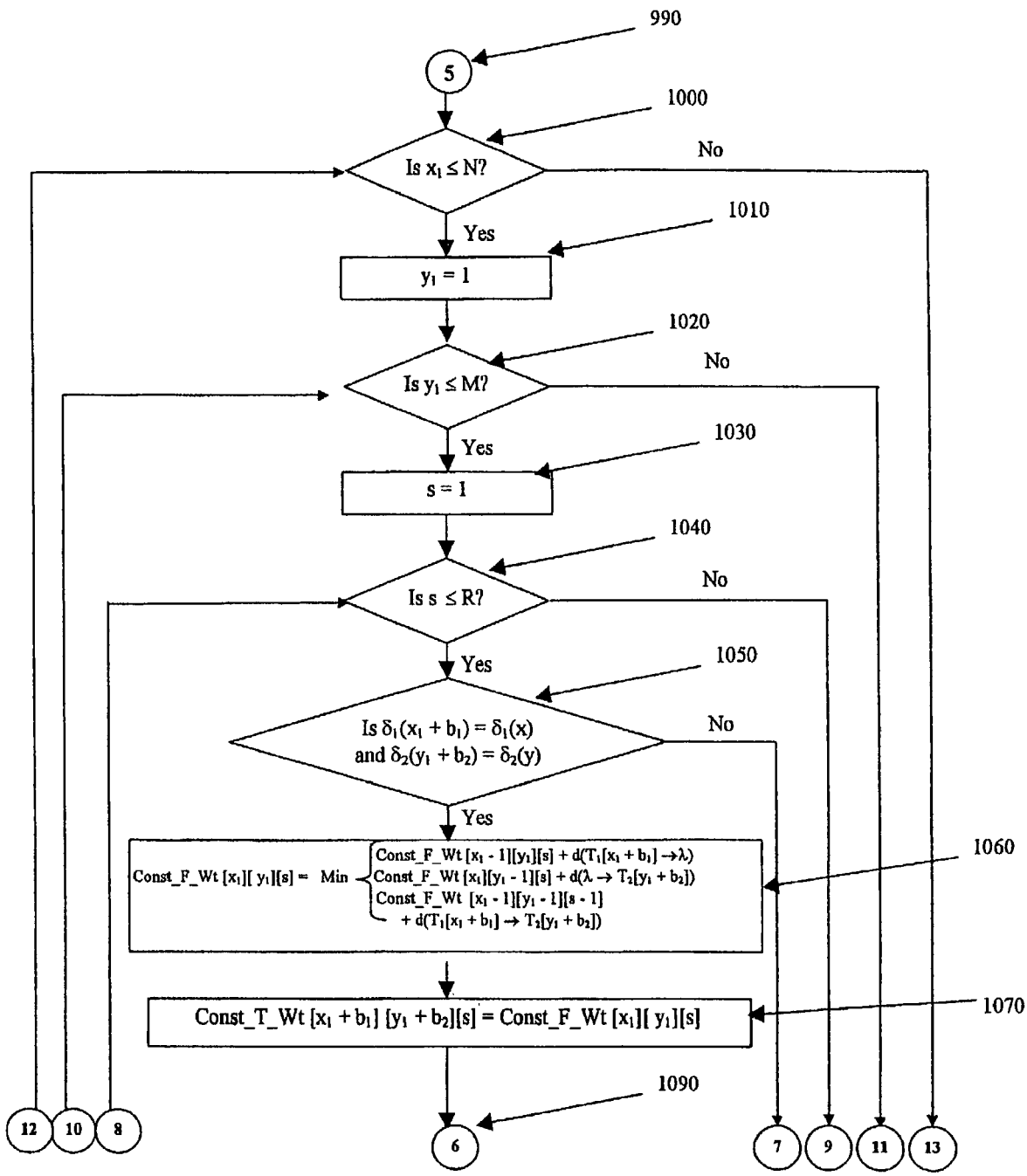
FIG. 17 is a schematic diagram showing the steps of the Process Compute_Const_T_Wt subsequent to those shown in FIG. 16.
Figure 18:
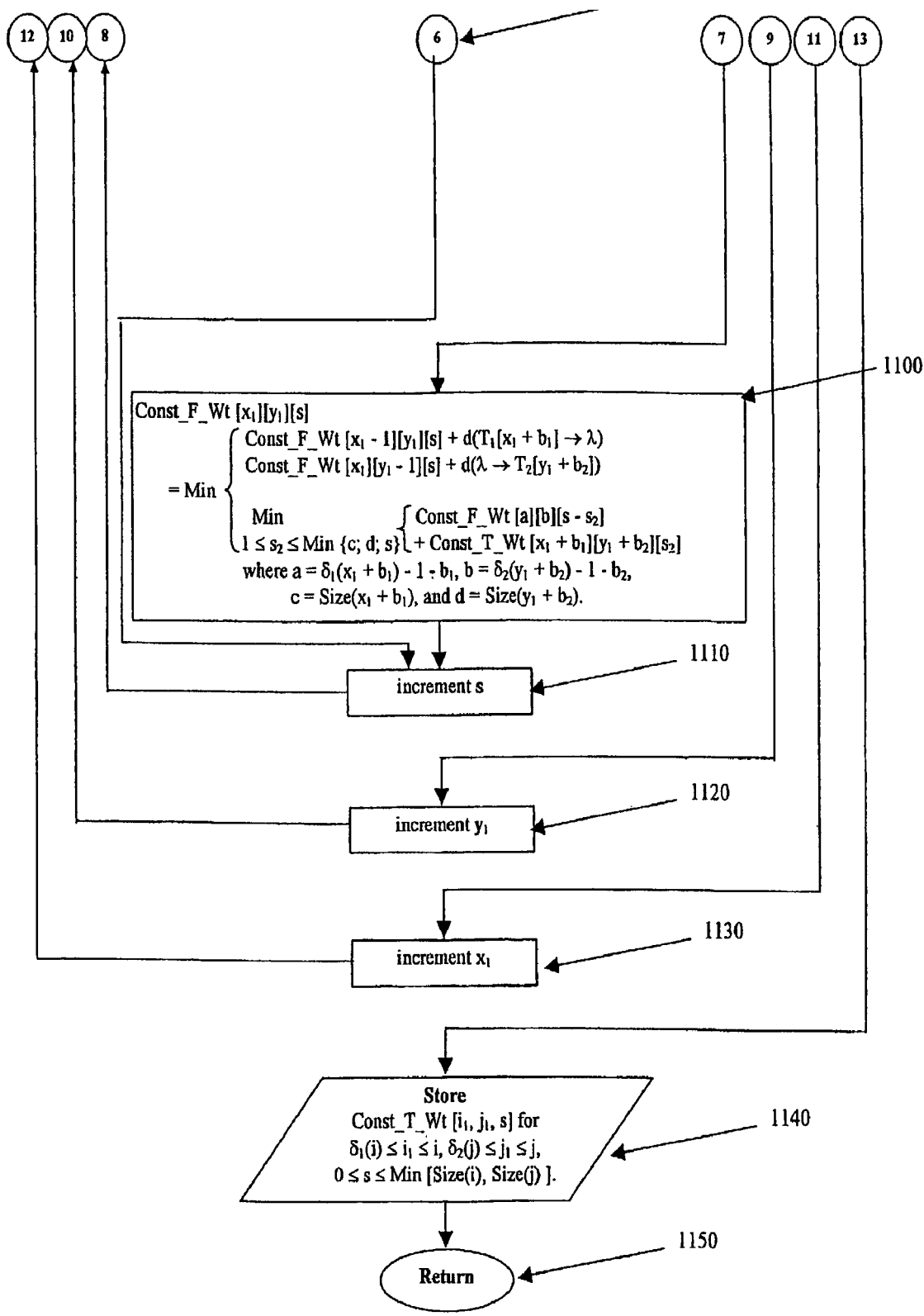
FIG. 18 is a schematic diagram showing the steps of the Process Compute_Const_T_Wt subsequent to those shown in FIG. 17.
Figure 19C:
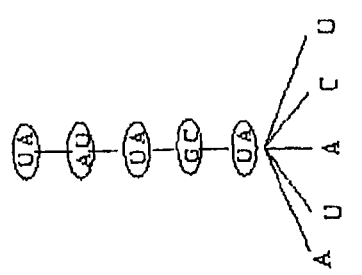
FIG. 19 is a schematic diagram showing how the invention can be used in the recognition of Ribonucleic Acids (RNA) molecules from their noisy fragments. Since an RNA molecule can be directly represented as a tree structure, the recognition of the RNA molecule from its fragment is a straightforward application of the solution to the NSuT problem.
Figure 19D:
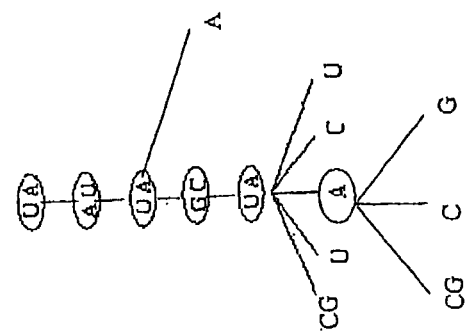
Figure 19B:
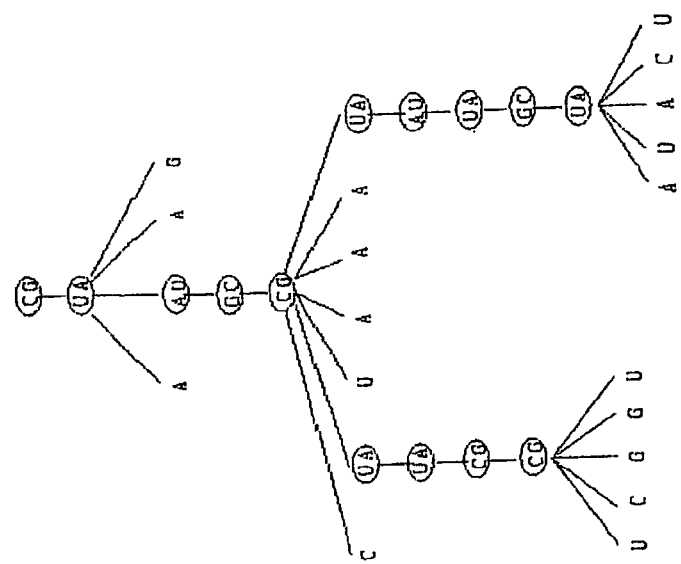
Figure 19A:
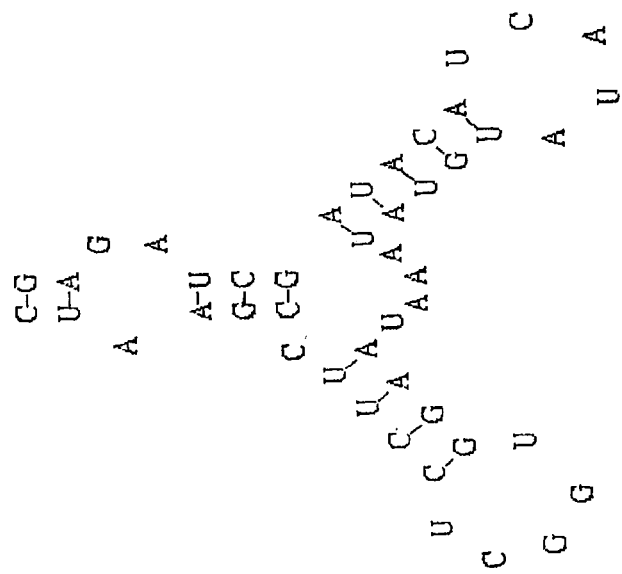
Figure 20D:
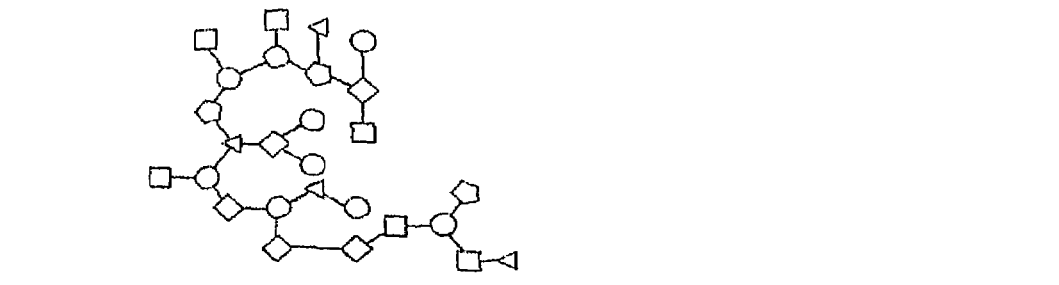
FIG. 20 is a schematic diagram showing how the invention can be used in the recognition of chemical compounds, represented in terms of their molecules, from their noisy fragments. Since chemical compounds are drawn as graphs, each compound is first mapped into a set of representative tree structures. Similarly, the noisy fragment of the compound is also mapped into a set of representative tree structures. The compound recognition is achieved by invoking the solution to the NSuT problem between the various tree representations of each compound and the tree representations of the noisy fragment.
Figure 20C:
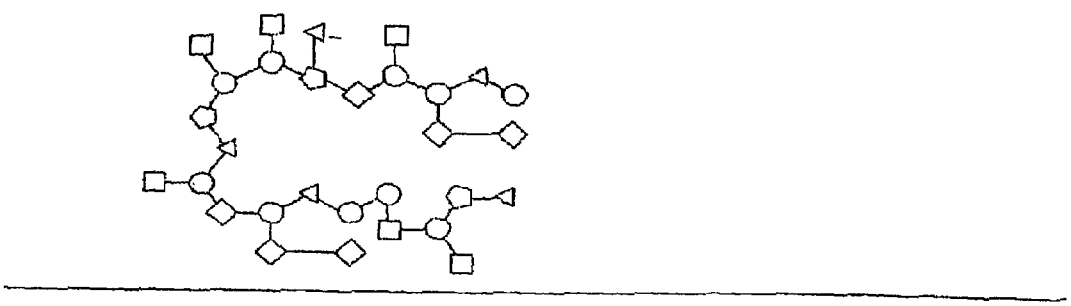
Figure 20B:
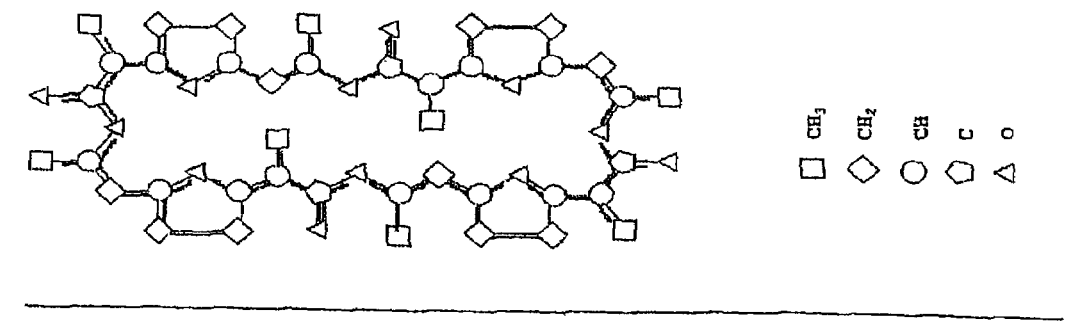
Figure 20A:
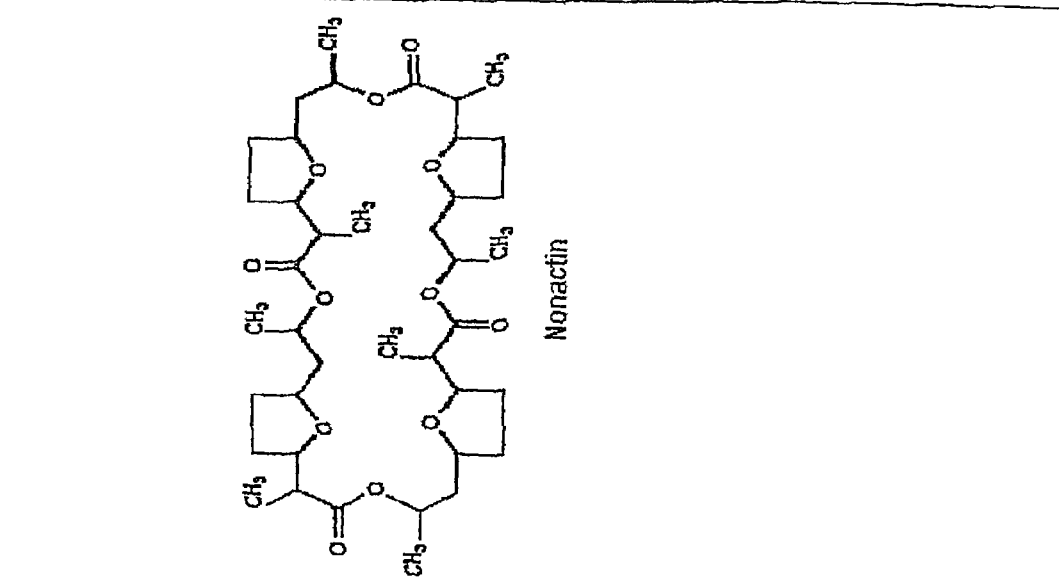
Figure 21D:
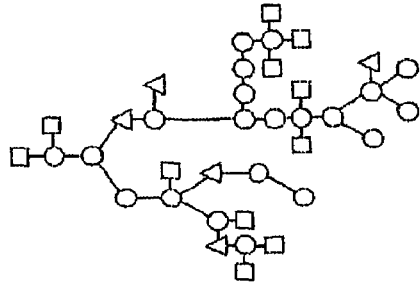
FIG. 21 is a schematic diagram showing how the invention can be used in the recognition of chemical compounds, represented in terms of their atomic structure, from their noisy fragments. Since chemical compounds are drawn as graphs, each compound is first mapped into a set of representative tree structures, where the nodes are the atoms. Similarly, the noisy fragment of the compound is also mapped into a set of representative tree structures. The compound recognition is achieved by invoking the solution to the NSuT problem between the various tree representations of each compound and the tree representations of the noisy fragment.
Figure 21C:
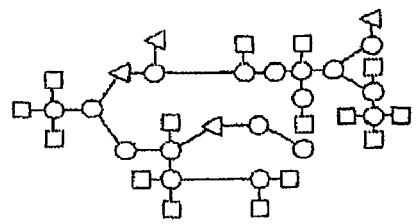
Figure 21B:
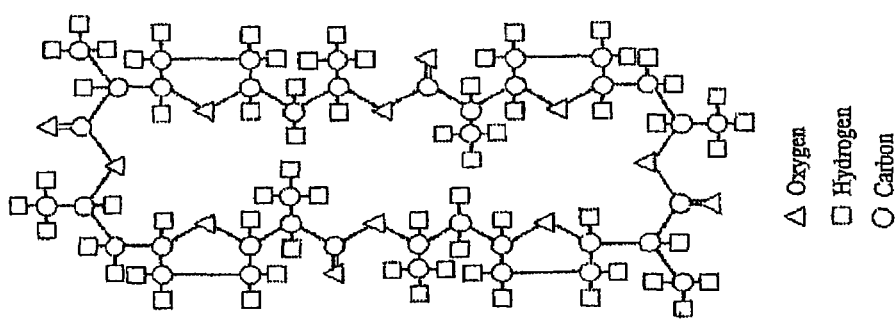
Figure 21A:
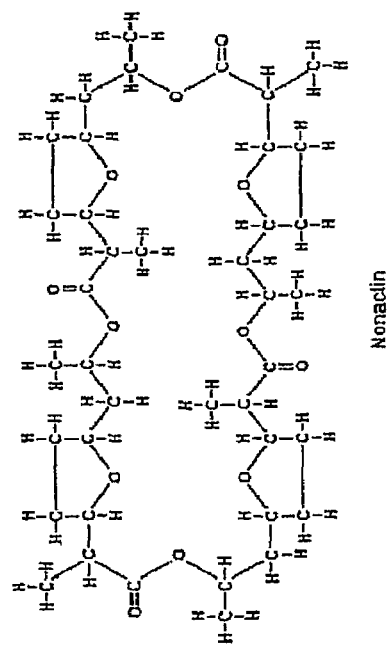
Figure 22D:
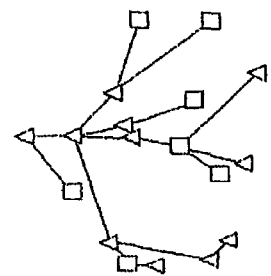
FIG. 22 is a schematic diagram showing how the invention can be used in the recognition of fingerprints. As is well known in the field of fingerprint recognition, the fingerprints are characterized by their minuatae. The recognition is achieved from a noisy portion of the fingerprint sought for. Since numerous minuatae representations of each fingerprints are possible, each fingerprint is first mapped into a set of representative tree structures. Similarly, the noisy fragment of the fingerprint is also mapped into a set of representative tree structures. The fingerprint recognition is achieved by invoking the solution to the NSuT problem between the various tree representations of each fingerprint and the tree representations of the noisy fragment.
Figure 22C:
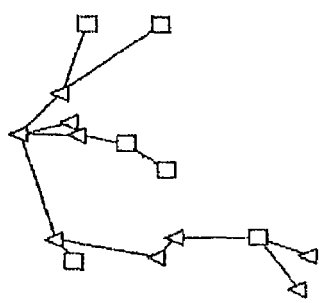
Figure 22B:
Figure 22A:
Figure 23D:
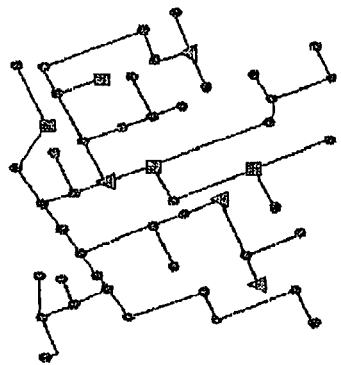
FIG. 23 is a schematic diagram showing how the invention can be used in the recognition of maps. The recognition is achieved from a noisy portion of the map sought for. Since numerous tree representations of each map are possible, each map is first mapped into a set of representative tree structures. Similarly, the noisy fragment of the map sought for is also mapped into a set of representative tree structures. The map recognition is achieved by invoking the solution to the NSuT problem between the various tree representations of each map and the tree representations of the noisy fragment.
Figure 23C:
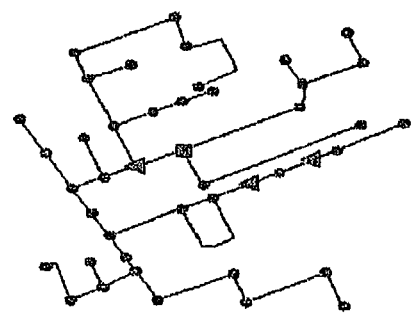
Figure 23B:
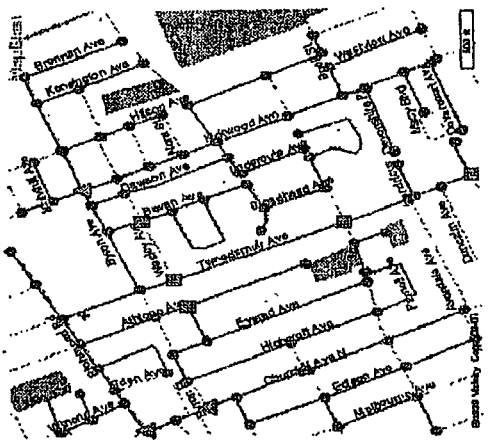
Figure 23A:
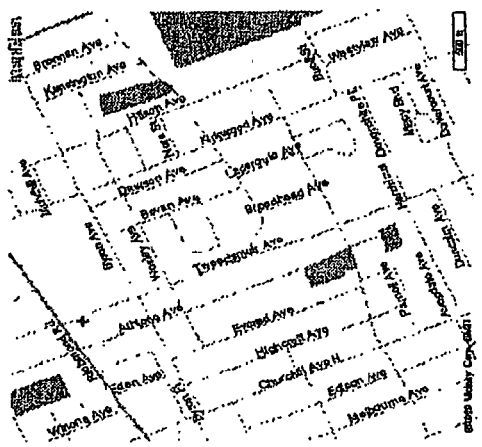
Figure 25D:
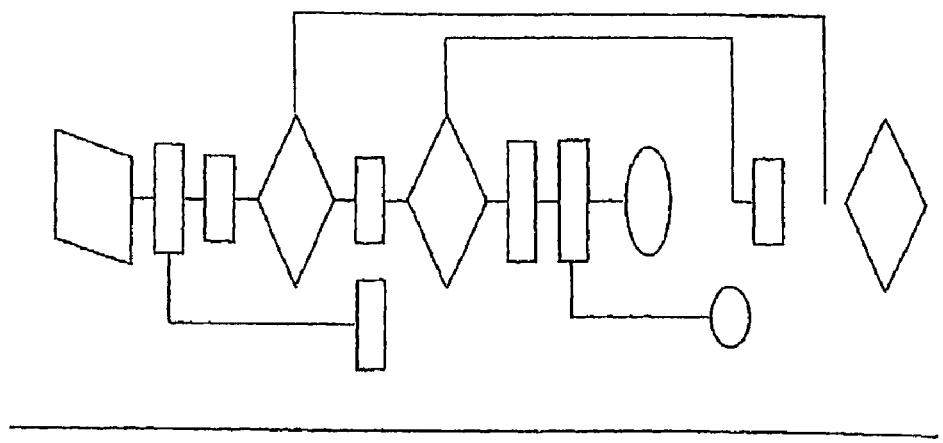
FIG. 25 is a schematic diagram showing how the invention can be used in the recognition of flow charts. The recognition is achieved from a noisy portion of a flow chart sought for. The nodes in this case are the various symbols used in flow charting such as assignments, loops, comparisons, control structures etc. Since numerous tree representations of each flow chart are possible, each flow chart is first mapped into a set of representative tree structures. Similarly, the noisy fragment of the flow chart sought for is also mapped into a set of representative tree structures. The flow chart recognition is achieved by invoking the solution to the NSuT problem between the various tree representations of each flow chart and the tree representations of the noisy fragment.
Figure 25C:
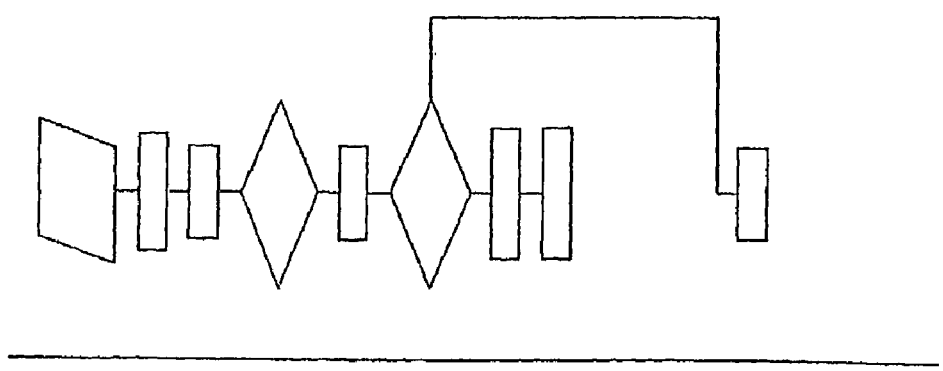
Figure 25B:
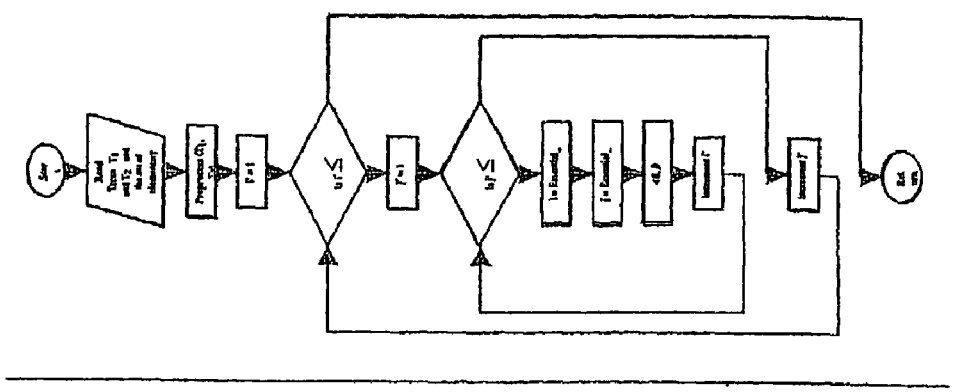
Figure 25A:
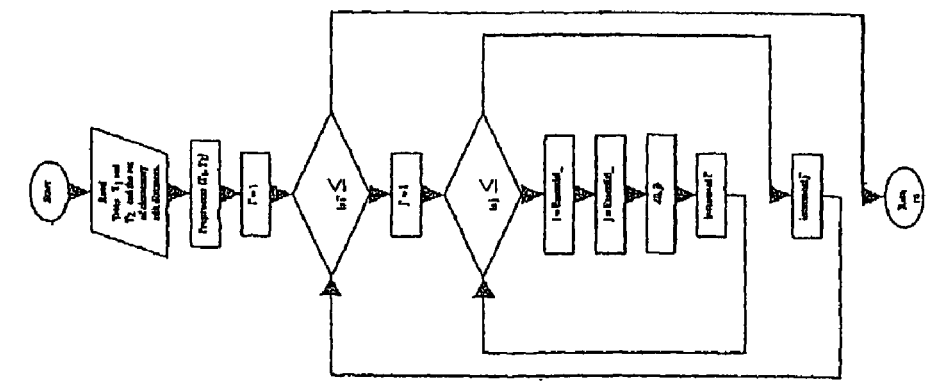

FIGS. 17 and 18 describe parallel sections of the same process, and so they are described together. The process first executes block 1000, which evaluates the question "is $x_1$ less than or equal to N?". This block initiates a loop. If the answer to this query is "no", the Process traverses link 13, and proceeds to block 1140, which is the Input/Output block which stores the value of Const_T_Wt [$i_1, j_1$, s] for $i_1$ being between $\delta_1(i)$ and i $j_1$ being between $\delta_2(j)$ and j, and finally s being between 0 and the minimum of [Size(i), Size(j)]. At block 1140, the control passes to the final return block of the method, which is block 1150. If, however, the response from block 1000 is "yes", $y_1$ is initialized to be 1 in block 1010 before entering another loop. The question in the decision block 1020 tests if $y_1$ is less than or equal to M. If the answer to block 1020 is negative, the Process traverses link 11 and proceeds to block 1130 of FIG. 18, which increments $y_1$ before backtracking link 12 to block 1000. If the answer to block 1020's question was in the affirmative, the Process proceeds to block 1030, where s is set to 1 and where the Process resolves another decision at block 1040. The question asked at block 1040 is: "Is s less than or equal to R?". If the answer to this query is "no", the Process jumps to FIG. 18 through link 9 which brings it to block 1120 where $y_1$ is increased by 1. At this juncture control is passed back up through link 10 to FIG. 17, to block 1020 for the next iteration of this loop. If the decision from block 1040 turns out to be "yes", the Process immediately encounter another decision block. However, this one does not initiate a loop. At this block, numbered 1050, it is determined whether $\delta_1(x_1+b_1)=\delta_1(x)$ and $\delta_2(y_1+b_2)=\delta_2(y)$. If the computation of block 1050 yields a "no", the Process traverses link 7 to FIG. 18. This leads the Process to block 1100, which assigns:

Const_F_Wt [$x_1$][$y_1$][s]=Min $$\begin{cases} \text{Const\_F\_Wt}[x_1 - 1][y_1][s] + d(T_1[x_1 + b_1] \to \lambda) \\ \text{Const\_F\_Wt}[x_1][y_1 - 1][s] + d(\lambda \to T_2[y_1 + b_2]) \\ \text{Min} \begin{cases} \text{Const\_F\_Wt}[a][b][s - s_2] + \\ \text{Const\_T\_Wt}[x_1 + b_1][y_1 + b_2][s_2] \end{cases} \\ 1 \le s_2 \le \text{Min}\{c; d; s\} \end{cases}$$

where $a = \delta_1(x_1 + b_1) - 1 - b_1, b = \delta_2(y_1 + b_2) - 1 - b_2$,
$c = \text{Size}(x_1 + b_1)$ and $d = \text{Size}(y_1 + b_2)$.

Control to block 1110, which increments s, backtracks to FIG. 17 through link 8, to block 1040. If the decision from block 1050 yields a "yes", however, the Process proceeds to block 1060 where it computes the following assignment:

Const_F_Wt[$x_1$][$y_1$][s] =

$$\text{Min} \begin{cases} \text{Const\_F\_Wt}[x_1 - 1][y_1][s] + d(T_1[x_1 + b_1] \to \lambda) \\ \text{Const\_F\_Wt}[x_1][y_1 - 1][s] + d(\lambda \to T_2[y_1 + b_2]) \\ \text{Const\_F\_Wt}[x_1 - 1][y_1 - 1][s - 1] + \\ d(T_1[x_1 + b_1] \to T_2[y_1 + b_2]) \end{cases}$$

Const_T_Wt[$x_1 + b_1$][$y_1 + b_2$][s] = Const_F_Wt[$x_1$][$y_1$][s].

This in turn, leads the Process to block 1070, where Const_T_Wt [$x_1+b_1$][$y_1+b_2$][s] is assigned to take the value of Const_F_Wt [$x_1$][$y_1$][s]. Control then passes to block 1110, described earlier, through link 6. This completes the description of this figure, and the entire Process.

The Process Compute_Const_T_Wt described above in detail, is formally described algorithmically below.

PROCESS Compute_Const_T_Wt

---

Input: Indices i, j and the quantities assumed global in T_Weights.
Output: Const_T_Wt [$i_1, j_1$, s], $\delta_1(i) \le i_1 \le i, \delta_2(j) \le j_1 \le j$,
$0 \le s \le \text{Min}\{\text{Size}(i), \text{Size}(j)\}$.
BEGIN
    N = i − $\delta_1$(i) + 1;   /* size of subtree rooted at $T_1$[i] */
    M = j − $\delta_2$(j) + 1;   /* size of subtree rooted at $T_2$[j] */
    R = Min{M, N};
    $b_1$ = $\delta_1$(i) − 1;   /* adjustment for nodes in subtree rooted at $T_1$[i] */
    $b_2$ = $\delta_2$(j) − 1;   /* adjustment for nodes in subtree rooted at $T_2$[j] */
    Const_F_Wt [0][0][0] = 0;   /* Initialize Const_F_Wt */

-continued

```
For x₁ = 1 to N Do
    Const_F_Wt [x][0][0] = Const_F_Wt [x₁][0][0] + d(T₁[x₁+b₁]→λ);
    Const_T_Wt [x₁+b₁][0][0] = Const_F_Wt [x₁][0][0];
EndFor
For y₁ = 1 to M Do
    Const_F_Wt [0][y1][0] =
Const_F_Wt [0][y₁-1][0] + d(λ→T₂[y₁+b₂]);
    Const_T_Wt [0][y₁+b₂][0] = Const_F_Wt [0][y₁][0];
EndFor
For s = 1 to R Do
    Const_F_Wt [0][0][s] = ∞;
    Const_T_Wt [0][0][s] = Const_F_Wt [0][0][s];
EndFor
For x₁ = 1 to N Do
    For y₁ = 1 to M Do
        Const_F_Wt [x₁][y₁][0] = Min
        ⎧ Const_F_Wt[x₁][y₁ - 1][0] + d(λ → T₂[y₁ + b₂])
        ⎨
        ⎩ Const_F_Wt[x₁ - 1][y₁][0] + d(T₁[x₁ + b₁]) → λ)

Const_T_Wt [x₁+b₁][y₁+b₂][0] = Const_F_Wt [x₁][y₁][0];
    EndFor
EndFor
For x₁ = 1 to N Do
    For s = 1 to R Do
        Const_F_Wt [x₁][0][s] = ∞;
        Const_T_Wt [x₁+b₁][0][s] = Const_F_Wt [x₁][0][s];
    EndFor
EndFor
For y₁ = 1 to M Do
    For s = 1 to R Do
        Const_F_Wt [0][y₁][s] = ∞;
        Const_T_Wt [0][y₁+b₂][s] = Const_F_Wt [0][y₁][s];
    EndFor
EndFor
For x₁ = 1 to N Do
    For y₁ = 1 to M Do
        For s = 1 to R Do
            If δ₁(x₁+b₁) = δ₁(x) and δ₂(y₁+b₂) =δ₂(y) Then
                Const_F_Wt [x₁][y₁][s] = Min
        ⎧ Const_F_Wt[x₁ - 1][y₁][s] + d(T₁[x₁ + b₁]) → λ)
        ⎨ Const_F_Wt[x₁][y₁ - 1][s] + d(λ → T₂[y₁ + b₂])
        ⎨ Const_F_Wt[x₁ - 1][y₁ - 1][s - 1] +
        ⎩ d(T₁[x₁ + b₁] → T₂[y₁ + b₂])

Const_T_Wt [x₁+b₁][y₁+b₂][s] = Const_F_Wt [x₁][y₁][s];
            Else
                Const_F_Wt [x₁][y₁][s]
                    ⎧ Const_F_Wt[x₁ - 1][y₁][s] + d(T₁[x₁ + b₁]) → λ)
                    ⎨ Const_F_Wt[x₁][y₁ - 1][s] + d(λ → T₂[y₁ + b₂])
                = Min ⎨         Min          ⎧ Const_F_Wt[a][b][s - s₂] +
                    ⎩ 1 ≤ s₂ ≤ Min{c; d; s} ⎩ Const_T_Wt[x₁ + b₁][y₁ + b₂][s₂]
                where a = δ₁(x₁+b₁) -1-b₁, b = δ₂(y₁+b₂)-1-b₂,
                      c = Size(x₁+b₁) and d = Size(y₁+b₂).
            EndIf
        EndFor
    EndFor
EndFor
END Process Compute Const_T_Wt
```

The Process RecognizeSubsequenceTrees assumes that the constrained distance subject to a specified constraint set, τ, can be computed. Since τ is fully defined in terms of the number of substitutions required in the comparison, all the information required for the comparison will be available in the array Const_T_Wt [.,.,.] computed using Process T_Weights. Thus, after the array Const_T_Wt [.,.,.] is computed, the distance $D_\tau(T_1,T_2)$ between $T_1$ and $T_2$ subject to the constraint τ can be directly evaluated using the Process Constrained_Tree_Distance, which essentially minimizes Const_T_Wt over all the values of 's' found in the constraint set.

Training the Recognition System

For the above processes to be utilized in any application domain, the user has to specify the inter-symbol distances. These distances are typically symbol dependant. The distance associated with an operation decreases with the likelihood of the corresponding error occurring. Thus if it is very likely that the symbol 'a' in the alphabet can be misrepresented by a 'b', it would mean that the distance d(a, b) is correspondingly small. These probabilities (or likelihoods) are called confusion probabilities, and the inter-symbol distances are usually specified in terms of the negative log-likelihood of one symbol being transformed into (misrepresented by) another. In the absence of such likelihood information, traditional 0/1 distances for equal/non-equal symbols can be utilized. Alternatively, the distances can be learnt by using a training set of noisy samples whose identities are known. This process is called "training" and is necessary in all pattern recognition problems. One possible method of training is explained as follows. The distances associated with deletion and insertion are first set to unity. The distance associated with an equal substitution is then set to zero. Finally, the distance associated with a non-equal substitution is set to a value 'r'. The value of 'r' is chosen so as to maximize the probability of recognition of the samples in the training set. This is easily done in the case of strings as explained by Oommen and Loke (*Proceedings of the 1997 IEEE International Conference on Systems, Man and Cybernetics* (1997)). In the case of trees this would otherwise require a search in the space of values of 'r' in the range [0, 2], and so a straightforward search in this space using a desired resolution would yield a suitable value for 'r'.

Rationale for the Above Processes

The rationale for the above processes lies in the theory and computation of Inter-tree Constrained Edit Distances. To define this distance, it is noted that the editing of $T_1$ to $T_2$ can be specified subject to any general edit constraint. This constraint can be arbitrarily complex as long as it is specified in terms of the number and type of edit operations to be included in the optimal edit sequence.

Consider the problem of editing $T_1$ to $T_2$, where $|T_1|=N$ and $|T_2|=M$. Editing a postorder-forest of $T_1$ into a postorder-forest of $T_2$ using exactly i insertions, e deletions, and s substitutions, corresponds to editing $T_1[1 \ldots e+s]$ into $T_2[1 \ldots i+s]$. Bounds on the magnitudes of variables i, e, s, are obtained by observing that they are constrained by the sizes of trees $T_1$ and $T_2$. Thus, if r=e+s, q=i+s, and R=Min{N,M}, these variables will have to obey the following constraints:

$$\max\{0, M-N\} \leq i \leq q \leq M,$$

$$0 \leq e \leq r \leq N,$$

$$0 \leq s \leq R.$$

Values of (i,e,s) which satisfy these constraints are termed feasible values of the variables. Let $$H_i = \{j | \max\{0, M-N\} \leq j \leq M\},$$

$$H_e = \{j | 0 \leq j \leq N\}, \text{ and,}$$

$$H_s = \{j | 0 \leq j \leq \text{Min}\{M, N\}\}.$$

$H_i$, $H_e$, and $H_s$ are called the set of permissible values of i, e, and s.

Theorem I specifies the feasible triples for editing $T_1[1 \ldots r]$ to $T_2[1 \ldots q]$.

Theorem I.

To edit $T_1[1 \ldots r]$, the postorder-forest of $T_1$ of size r, to $T_2[1 \ldots q]$, the postorder-forest of $T_2$ of size q, the set of feasible triples is given by $\{(q-s, r-s, s)| 0 \leq s \leq \text{Min}\{M,N\}\}$.

Proof:

Consider the constraints imposed on feasible values of i, e, and s. Since the problem involves editing $T_1[1 \ldots r]$ to $T_2[1 \ldots q]$, only those triples (i,e,s) in which i+s=r and e+s=q have to be considered. But, the number of substitutions can take any value from 0 to $\text{Min}\{r,q\}$. Therefore, for every value of s in this range, the feasible triple (i,e,s) must have exactly r−s deletions since r=e+s. Similarly, the triple (i,e,s) must have exactly q−s insertions since q=s+i. The result follows.

An edit constraint is specified in terms of the number and type of edit operations that are required in the process of transforming $T_1$ to $T_2$. It is expressed by formulating the number and type of edit operations in terms of three sets $Q_i$, $Q_e$, and $Q_s$ which are subsets of the sets $H_i$, $H_e$, and $H_s$ defined above. Thus, to edit $T_1$ to $T_2$ performing no more than k deletions, the sets $Q_s$ and $Q_i$ are both $\phi$, the null set, and $Q_e = \{j | j \in H_e, j \leq k\}$. Similarly, to edit $T_1$ to $T_2$ performing $k_i$ insertions, $k_e$ deletions, and $k_s$ substitutions yields $Q_i = \{k_i\} \cap H_i$, $Q_e = \{k_e\} \cap H_e$, and $Q_s = \{k_s\} \cap H_s$.

Theorem II.

Every edit constraint specified for the process of editing $T_1$ to $T_2$ is a unique subset of $H_s$.

Proof:

Let the constraint be specified by the sets $Q_i$, $Q_e$, and $Q_s$. Every element $j \in Q_i$ requires editing to be performed using exactly j insertions. Since $|T_2|=M$, from Theorem 1, this requires that the number of substitutions be M−j. Similarly, if $j \in Q_e$, the edit transformation must contain exactly j deletions. Since $|T_1|=N$, Theorem 1 requires that N−j substitutions be performed. Let $$Q_e^* = \{N-j | j \in Q_e\}, \text{ and}$$

$$Q_i^* = \{M-j | j \in Q_i\}.$$

Thus, for any constraint, the number of substitutions permitted is $Q_s \cap Q_e^* \cap Q_i^* \subset H_s$.

Figure 5:
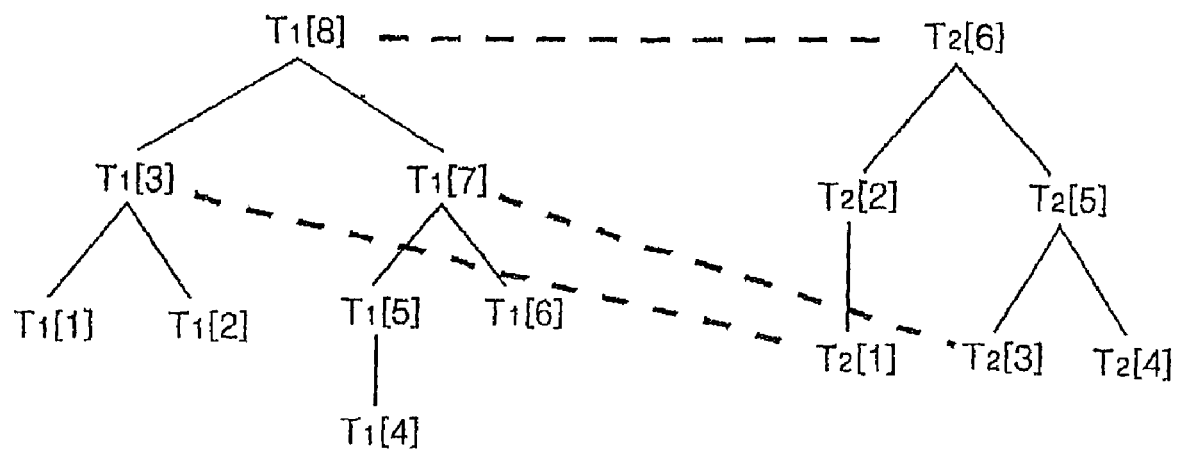
FIG. 5 presents an example of a mapping between two labeled ordered trees.

To clarify matters, consider the trees $T_1$ and $T_2$ shown in FIG. 5. If $T_1$ has to be transformed to $T_2$ by performing at most 5 insertions, at least 3 substitutions and the number of deletions being 3, then $$Q_i = \{0,1,2,3,4,5\}, Q_e = \{3\}, \text{ and } Q_s = \{3,4,5,6\}.$$

From these it can be seen that:

$Q_e^* = \{5\}$, and $Q_i^* = \{1,2,3,4,5,6\}$ yielding,
$\tau = Q_s \cap Q_e^* \cap Q_i^* = \{5\}$.

Hence, the optimal transformation must contains exactly 5 substitutions.

The edit distance subject to the constraint $\tau$ is written as $D_\tau(T_1, T_2)$. By definition, $D_\tau(T_1, T_2) = \infty$ if $\tau = \phi$, the null set. The computation of $D_\tau(T_1, T_2)$ is now considered.

Constrained Tree Editing

Since edit constraints can be written as unique subsets of $H_s$, the distance between forest $T_1[i' \ldots i]$ and forest $T_2[j' \ldots j]$ subject to the constraint that exactly s substitutions are performed, is denoted by $\text{Const\_F\_Wt}(T_1[i' \ldots i], T_2[j' \ldots j], s)$ or more precisely by $\text{Const\_F\_Wt}([i' \ldots i], [j' \ldots j], s)$. The distance between $T_1[1 \ldots i]$ and $T_2[1 \ldots j]$ subject to this constraint is given by $\text{Const\_F\_Wt}(i,j,s)$ since the starting index of both trees is unity. As opposed to this, the distance between the subtree rooted at i and the subtree rooted at j subject to the same constraint is given by $\text{Const\_T\_Wt}(i,j,s)$. The difference between $\text{Const\_F\_Wt}$ and $\text{Const\_T\_Wt}$ is subtle. Indeed, $$\text{Const\_T\_Wt}(i,j,s) = \text{Const\_F\_Wt}(T_1[\delta(i) \ldots i], T_2[\delta(j) \ldots j], s).$$

These weights obey the following properties proved in Oommen and Lee (*Information Sciences*, Vol. 77, pp. 253-273 (1994)).

Lemma II

Let $i_1 \in Anc(i)$ and $j_1 \in Anc(j)$. Then (i) $\text{Const\_F\_Wt}(\mu, \mu, 0) = 0.$ (ii) $\text{Const\_F\_Wt}(T_1[\delta(i_1) \ldots i], \mu, 0) =$
$\text{Const\_F\_Wt}(T_1[\delta(i_1) \ldots i-1], \mu, 0) + d(T_1[i], \lambda).$ (iii) $\text{Const\_F\_Wt}(\mu, T_2[\delta(j_1) \ldots j], 0) =$
$\text{Const\_F\_Wt}(\mu, T_2[\delta(j_1) \ldots j-1], 0) + d(\lambda, T_2[j]).$ (iv) $\text{Const\_F\_Wt}(T_1[\delta(i_1) \ldots i], T_2[\delta(j_1) \ldots j], 0) = \text{Min}$ $\begin{cases} \text{Const\_F\_Wt}(T_1[\delta(i_1) \ldots i-1], T_2[\delta(j_1) \ldots j], 0) + d(T_1[i], \lambda) \\ \text{Const\_F\_Wt}(T_1[\delta(i_1) \ldots i], T_2[\delta(j_1) \ldots j-1], 0) + d(\lambda, T_2[j]). \end{cases}$ (v) $\text{Const\_F\_Wt}(T_1[\delta(i_1) \ldots i], \mu, s) = \infty$ if $s > 0.$ (vi) $\text{Const\_F\_Wt}(\mu, T_2[\delta(j_1) \ldots j], s) = \infty$ if $s > 0.$ (vii) $\text{Const\_F\_Wt}(\mu, \mu, s) = \infty$ if $s > 0.$ Proof: The proofs are found as the proofs of Lemmas IIa and IIb of Oommen and Lee (*Information Sciences*, Vol. 77, pp. 253-273 (1994)).

Lemma II essentially states the properties of the constrained distance when either s is zero or when either of the trees is null. These are "basis" cases that can be used in any recursive computation. For the non-basis cases, the scenarios when the trees are non-empty and when the constraining parameter, s, is strictly positive are considered. Theorem III gives the recursive property of $\text{Const\_F\_Wt}$ in such a case.

Theorem III.

Let $i_1 \in Anc(i)$ and $j_1 \in Anc(j)$. Then $\text{Const\_F\_Wt}(T_1[\delta(i_1) \ldots i], T_2[\delta(j_1) \ldots j], s) = \text{Min}$ $$\begin{cases} \text{Const\_F\_Wt}([\delta(i_1) \ldots i-1], [\delta(j_1) \ldots j], s) + d(T_1[i], \lambda) \\ \text{Const\_F\_Wt}([\delta(i_1) \ldots i], [\delta(j_1) \ldots j-1], s) + d(\lambda, T_2[j]) \\ \underset{1 \leq s_2 \leq \text{Min}\{Size(i); Size(j); s\}}{\text{Min}} \begin{cases} \text{Const\_F\_Wt}([\delta(i_1) \ldots \delta(i)-1], [\delta(j_1) \ldots \delta(j)-1], s-s_2) + \\ \text{Const\_F\_Wt}([\delta(i) \ldots i-1], [\delta(j) \ldots j-1], s_2-1) + \\ d(T_1[i], T_2[j]) \end{cases} \end{cases}$$

Proof:

The proof of the theorem is in Oommen and Lee (*Information Sciences*, Vol. 77, pp. 253-273 (1994)). A minimum cost mapping M between $T_1[\delta(i_1) \ldots i]$ and $T_2[\delta(j_1) \ldots j]$ using exactly s substitutions has to be determined. The map can be extended to $T_1[i]$ and $T_2[j]$ in the following three ways:

(i) If $T_1[i]$ is not touched by any line in M, then $T_1[i]$ is to be deleted. Thus, since the number of substitutions in Const_F_Wt(.,.,.) remains unchanged, the following is true:

Const_F_Wt($T_1[\delta(i_1) \ldots ij], T_2[\delta(j_1) \ldots jj], s$)=Const_F_Wt($T_1[\delta(i_1) \ldots i-1], T_2[\delta(j_1) \ldots jj], s$)+$d(T_1[i],\lambda)$.

(ii) If $T_2[j]$ is not touched by any line in M, then $T_2[j]$ is to be inserted. Again, since the number of substitutions in Const_F_Wt(.,.,.) remains unchanged, the following is true:

Const_F_13 Wt($T_1[\delta(i_1) \ldots ij], T_2[\delta(j_1) \ldots jj], s$)=Const_F_Wt($T_1[\delta(i_1) \ldots ij], T_2[\delta(j_1) \ldots j-1], s$)+$d(\lambda,T_2[j])$.

(iii) Consider the case when both $T_1[i]$ and $T_2[j]$ are touched by lines in M. Let (i,k) and (h,j) be the respective lines, i.e. (i,k) and (h,j)∈M. If $\delta(i_1) \leq h \leq \delta(i)-1$, then i is to the right of h and so k must be to the right of j by virtue of the sibling property of M. But this is impossible in $T_2[\delta(j_1) \ldots j]$ since j is the rightmost sibling in $T_2[\delta(j_1) \ldots j]$. Similarly, if i is a proper ancestor of h, then k must be a proper ancestor of j by virtue of the ancestor property of M. This is again impossible since $k \leq j$. So h has to equal to i. By symmetry, k must equal j, so (i,j)∈M.

By the ancestor property of M (see Oommen and Lee (*Information Sciences*, Vol. 77, pp. 253-273 (1994)) for the details of this argument), any node in the subtree rooted at $T_1[i]$ can only be touched by a node in the subtree rooted at $T_2[j]$. Since exactly s substitutions must be performed in this transformation, the total number of substitutions used in the sub-transformation from $T_1[\delta(i_1) \ldots \delta(i)-1]$ to $T_2[\delta(j_1) \ldots \delta(j)-1]$ and the sub-transformation from $T_1[\delta(i) \ldots i-1]$ to $T_2[\delta(j) \ldots j-1]$ must be equal to s−1 (the last substitution being the operation $T_1[i] \rightarrow T_2[j]$). If $s_2-1$ is the number of substitutions used in the sub-transformation from $T_1[\delta(i) \ldots i-1]$ to $T_2[\delta(j) \ldots j-1]$, $s_2$ can take any value between 1 to Min{Size(i),Size(j),s}. Hence, $$\text{Const\_F\_Wt}(T_1[\delta(i_1)\ldots i], T_2[\delta(j_1)\ldots j], s) = \underset{1 \leq s_2 \leq \text{Min}\{Size(i); Size(j); s\}}{\text{Min}} \begin{cases} \text{Const\_F\_Wt}(T_1[\delta(i_1)\ldots\delta(i)-1], T_2[\delta(j_1)\ldots\delta(j)-1], s-s_2) + \\ \text{Const\_F\_Wt}(T_1[\delta(i)\ldots i-1], T_2[\delta(j)\ldots j-1], s_2-1) + \\ d(T_1[i], T_2[j]) \end{cases}$$

Since these three cases exhaust the possible ways for yielding Const_F_Wt($\delta(i_1) \ldots i, \delta(j_1) \ldots j, s$), the minimum of these three costs yields the result.

Theorem III naturally leads to a recursive method, except that its time and space complexities will be prohibitively large. The main drawback with using Theorem III is that when substitutions are involved, the quantity Const_F_Wt($T_1[\delta(i_1) \ldots i], T_2[\delta(j_1) \ldots j], s$) between the forests $T_1[\delta(i_1) \ldots i]$ and $T_2[\delta(j_1) \ldots j]$ is computed using the Const_F_Wts of the forests $T_1[\delta(i_1) \ldots \delta(i)-1]$ and $T_2[\delta(j_1) \ldots \delta(j)-1]$ and the Const_F_Wts of the remaining forests $T_1[\delta(i) \ldots i-1]$ and $T_2[\delta(j) \ldots j-1]$. Since under certain conditions, the removal of a sub-forest leaves us with an entire tree, the computation is simplified. Thus, if $\delta(i)=\delta(i_1)$ and $\delta(j)=\delta(j_1)$ (i.e., i and $i_1$, and j and $j_1$ span the same subtree), the subforests from $T_1[\delta(i_1) \ldots \delta(i)-1]$ and $T_2[\delta(j_1) \ldots \delta(j)-1]$ do not get included in the computation. If this is not the case, the Const_F_Wt($T_1[\delta(i_1) \ldots i], T_2[\delta(j_1) \ldots j], s$) can be considered as a combination of the Const_F_Wt($T_1[\delta(i_1) \ldots \delta(i)-1], T_2[\delta(j_1) \ldots \delta(j)-1], s-s_2$)) and the tree weight between the trees rooted at i and j respectively, which is Const_T_Wt($i,j,s_2$). This is proved below.

Theorem IV.

Let $i_1 \in Anc(i)$ and $j_1 \in Anc(j)$. Then the following is true:

If $\delta(i) = \delta(i_1)$ and $\delta(j) = \delta(j_1)$ then Const_F_Wt($T_1[\delta(i_1)\ldots i], T_2[\delta(j_1)\ldots j], s$) = Min $$\begin{cases} \text{Const\_F\_Wt}(T_1[\delta(i_1)\ldots i-1], T_2[\delta(j_1)\ldots j], s) + d(T_1[i], \lambda) \\ \text{Const\_F\_Wt}(T_1[\delta(i_1)\ldots i], T_2[\delta(j_1)\ldots j-1], s) + d(\lambda, T_2[j]) \\ \text{Const\_F\_Wt}(T_1[\delta(i_1)\ldots \delta(i)-1], T_2[\delta(j_1)\ldots \delta(j)-1], s-1) + d(T_1[i], T_2[j]) \end{cases}$$

-continued otherwise,

Const_F_Wt($T_1[\delta(i_1) \ldots i], T_2[\delta(j_1) \ldots j], s$) = Min $$\begin{cases} \text{Const\_F\_Wt}(T_1[\delta(i_1)\ldots i-1], T_2[\delta(j_1)\ldots j], s) + d(T_1[i], \lambda) \\ \text{Const\_F\_Wt}(T_1[\delta(i_1)\ldots i], T_2[\delta(j_1)\ldots j-1], s) + d(\lambda, T_2[j]) \\ \underset{1 \le s_2 \le \text{Min}\{\text{Size}(i); \text{Size}(j); s\}}{\text{Min}} \begin{cases} \text{Const\_F\_Wt}(T_1[\delta(i_1)\ldots \delta(i)-1], T_2[\delta(j_1)\ldots \delta(j)-1], s-s_2) + \\ \text{Const\_T\_Wt}(i, j, s_2) \end{cases} \end{cases}$$

Sketch of Proof:

By Theorem III, if $\delta(i)=\delta(i_1)$ and $\delta(j)=\delta(j_1)$, the forests $T_1[\delta(i_1) \ldots \delta(i)-1]$ and $T_2[\delta(j_1) \ldots \delta(j)-1]$ are both empty. Thus, Const_F_Wt($T_1[\delta(i_1) \ldots \delta(i)-1], T_2[\delta(j_1) \ldots \delta(j)-1], s-s_2$)=Const_F_Wt($\mu,\mu,s-s_2$)

which is equal to zero if $s_2=s$, or is equal to ∞ if $s_2<s$. The first part of the theorem follows.

For the second part, using arguments given in Oommen and Lee (*Information Sciences*, Vol. 77, pp. 253-273 (1994)) it can be seen that:

Const_F_Wt($T_1[\delta(i_1) \ldots i], T_2[\delta(j_1) \ldots j], s$) ≤

Const_F_Wt($T_1[\delta(i_1) \ldots \delta(i)-1], T_2[\delta(j_1)\ldots\delta(j)-1], s-s_2$) +

Const_T_Wt($i, j, s_2$).

Analogously, it can be shown that:

Const_T_Wt($i,j,s_2$)≤Const_F_Wt($T_1[\delta(i) \ldots i-1], T_2[\delta(j) \ldots j-1], s_2-1$)+$d(T_1[i], T_2[j])$.

Theorem III and these two inequalities justify replacing Const_T_Wt($i,j,s_2$) for the corresponding Const_F_Wt expressions, and the result follows. The details of the proof are found in Oommen and Lee (*Information Sciences*, Vol. 77, pp. 253-273 (1994)).

Theorem IV suggests that a dynamic programming flavored method can be used to solve the constrained tree editing problem. The second part of Theorem IV suggests that to compute Const_T_Wt($i_1,j_1,s$), the quantities Const_T_Wt($i,j,s_2$) must be available for all i and j and for all feasible values of $0 \le s_2 \le s$, where the nodes i and j are all the descendants of $i_1$ and $j_1$ except nodes on the path from $i_1$ to $\delta(i_1)$ and the nodes on the path from $j_1$ to $\delta(j_1)$. The theorem also asserts that the distances associated with the nodes which are on the path from $i_1$ to $\delta(i_1)$ get computed as a by-product in the process of computing the Const_F_Wt between the trees rooted at $i_1$ and $j_1$. These distances are obtained as a by-product because, if the forests are trees, Const_F_Wt is retained as a Const_T_Wt. The set of nodes for which the computation of Const_T_Wt must be done independently before the Const_T_Wt associated with their ancestors can be computed is called the set of Essential_Nodes, and these are merely those nodes for which the computation would involve the second case of Theorem IV as opposed to the first. The set Essential_Nodes of tree T is defined as:

Essential_Nodes(T)={k|there exists no k'>k such that $\delta(k)=\delta(k')$}.

Observe that if k is in Essential_Nodes(T) then either k is the root or k has a left sibling. Intuitively, this set will be the roots of all subtrees of tree T that need separate computations. Thus, the Const_T_Wt can be computed for the entire tree if Const_T_Wt of the Essential_Nodes are computed.

Based on these arguments Const_T_Wt(i, j, s) can be computed and stored it in a permanent three-dimensional array Const_T_Wt. From Theorem IV, it can be observed that to compute the quantity Const_T_Wt(i, j, s) the quantities which are involved are precisely the terms Const_F_Wt([$\delta(i) \ldots$ h], [$\delta(j) \ldots$ k], s') defined for a particular input pair (i, j), where h and k are the internal nodes of Tree$_1$(i) and Tree$_2$(j) satisfying, $\delta(i) \le h \le i$, $\delta(j) \le k \le j$, and where s' is in the set of feasible values and satisfies $0 \le s' \le s = \text{Min }\{|\text{Tree}_1(i)|, |\text{Tree}_2(j)|\}$. The intention is store these values using a single temporary three-dimensional array Const_F_Wt [.,.,.]. But in order to achieve this, it is clear that the base indices of the temporary three-dimensional array Const_F_Wt [.,.,.] will have to be adjusted each time the procedure is invoked, so as to utilize the same memory allocations repeatedly for every computation. This is achieved by assigning the base values $b_1$ and $b_2$ as $b_1=\delta_1(i)-1$, and $b_2=\delta(j)-1$. Thus, for a particular input pair (i,j), the same memory allocations Const_F_Wt [.,.,.] can be used to store the values in each phase of the computation by assigning for all $1 \le x_1 \le i-\delta(i)+1$, $1 \le y_1 \le j-\delta(j)+1$:

Const_F_Wt [$x_1,y_1,s'$]=Const_F_Wt([$\delta(i) \ldots \delta(i)+x_1-1$], [$\delta(j) \ldots \delta(j)+y_1-1$], s').

Consequently, it must be noted that for every $x_1$, $y_1$, and s' in any intermediate step in the method, the quantity Const_T_Wt( ) that has to be stored in the permanent array can be obtained by incorporating these base values again, and has the form Const_T_Wt [$x_1+b_1$, $y_1+b_2$, s']. This is the rationale for the Process Compute_Const_T_Wt formally described above.

The space required by the above Process is obviously $O(|T_1|*|T_2|*\text{Min}\{|T_1|, |T_2|\})$. If Span(T) is the Min{Depth(T), Leaves(T)}, the Process' time complexity is (see Oommen and Lee (*Information Sciences*, Vol. 77, pp. 253-273 (1994))):

$O(|T_1|*|T_2|*(\text{Min}\{|T_1|, |T_2|\})^2*\text{Span}(T_1)*\text{Span}(T_2))$.

Rationale for the Principles Used in Noisy Subsequence-Tree Recognition

Using the foundational concepts of constrained edit distances explained in the previous sections, the principles used in Noisy Subsequence-Tree recognition are now justified. The assumptions made in the recognition process are quite straightforward. First of all, it is assumed that a "Transmitter" intends to transmit a tree X* which is an element of a finite dictionary of trees, H. However, rather than transmitting the original tree the transmitter opts to randomly delete nodes from X* and transmit one of its subsequence trees, U. The transmission of U is across a noisy channel which is capable of introducing substitution, deletion and insertion errors at the nodes. Note that, to render the problem meaningful (and distinct from the uni-dimensional one studied in the literature) it is assumed that the tree itself is transmitted as a two dimensional entity. In other words, the serialization of this transmission process is not considered, for that would merely involve transmitting a string representation, which would, typically, be a traversal pre-defined by both the Transmitter and the Receiver. The receiver receives Y, a noisy version of U. The rationale for recognizing X* from Y is discussed below.

To render the problem tractable, the solution assumes that some of the properties of the channel can be observed. More specifically, the solution assumes that L, the expected number of substitutions introduced in the process of transmitting U, can be estimated. In the simplest scenario (where the transmitted nodes are either deleted or substituted for) this quantity is obtained as the expected value for a mixture of Bernoulli trials, where each trial records the success of a node value being transmitted as an non-null symbol.

Since U can be an arbitrary subsequence tree of X*, it is obviously meaningless to compare Y with every X∈H using any known unconstrained tree editing algorithm. Before Y can be compared to the individual tree in H, the additional information obtainable from the noisy channel will have to be used. Also, since the specific number of substitutions (or insertions/deletions) introduced in any specific transmission is unknown, it is reasonable to compare any X∈H and Y subject to the constraint that the number of substitutions that actually took place is its best estimate. Of course, in the absence of any other information, the best estimate of the number of substitutions that could have taken place is indeed its expected value, L. This is usually close to the size of Y since the probability of a node value being substituted is very close to unity. In the examples explained below, this is set to be |Y|−1. One could therefore use the set {L} as the constraint set to effectively compare Y with any X∈H. Since the latter set can be quite restrictive, a constraint set which is a superset of {L} marginally larger than {L} is suggested. The superset used in the examples presented in this submission is the set $\{L_p-1, L_p, L_p+1\}$. Since the size of the set is still a constant, there is no significant increase in the computation times. This is exactly the rationale for the recognition Process RecognizeSubsequenceTrees described earlier.

Recognition of RNA Structures

One embodiment of this invention is the use of the method for the processing of ribonucleic acid (RNA) secondary structures from their tree representations (see Le et al. (*Comp. Appl. Biosci.* (1989)); Le et al. (*Computers and Biomedical Research*, 22, 461-473 (1989)); Shapiro and Zhang (*Comp. Appl. Biosci.* (1990)); Shapiro (*Comput. Appl. Biosci.*, 387-393 (1988)); Takahashi et al. (*Analytical Science*, Vol. 3, 23-28 (1987)). A molecule of RNA is made up of a long sequence of subunits (the Ribonucleotides (RN)) which are linked together. Each Ribonucleotide contains one of the four possible bases, abbreviated by A, C, G, and U. This base sequence is called the primary structure of the RNA molecule.

One example of an item that can be represented by a tree structure is the secondary structure of Ribonucleic Acids (RNA). Under natural conditions, a RNA sequence twists and bends and the bases form bonds with one another to yield complicated patterns. The latter bonding pattern is called its secondary structure. Research in this field has shown that similar structures have similar functionality and the use of sequence comparison by itself is inadequate for determining the structural homology as described by Shapiro and Zhang (*Comp. Appl. Biosci.* (1990)).

For example, a typical secondary structure of an RNA sequence may be represented as a tree, as explained by Shapiro and Zhang (*Comp. Appl. Biosci.* (1990)) and Shapiro (*Comput. Appl. Biosci.*, 387-393 (1988)) using node values such as M, H, I, B, R and N (for Multiple loop, Hairpin loop, Internal loop, Bulge loop, helical stem Region, and exterNal single-stranded region respectively). This representation only considers the topology of the loops and stem regions, so a more dissected representation would have to also consider the sizes of the loops and the helical stems Using this tree-representation and the method of this invention, the comparison of RNA secondary structure trees can also help identify conserved structural motifs in an RNA folding process and construct taxonomy trees as explained by Shapiro and Zhang (*Comp. Appl. Biosci.* (1990)). In all such molecular biological domains, the method proposed here can be used to recognize (classify) RNA secondary structure trees by merely processing noisy (garbled) versions of their subsequence trees. This could assist the biologist trace proteins when only their fragments are available for examination.

Rather than work with the above tree representations of RNA structures described above, to demonstrate the power of the scheme, a more recent tree representation of RNA secondary structures by Zhang (Zhang Proceedings of IEEE International Joint Symposia on Intelligence and Systems, Rockville, Md., May 98, pp. 126-132 (1999)) is now referred to. FIG. 19 is a schematic diagram showing how the method described by the invention can be used in the recognition of RNA molecules from their noisy fragments. Since RNA secondary structures can be directly represented as a tree structure, the recognition of the RNA secondary structures from its fragment is a straightforward application of the solution to the NsuT problem. The inter-symbol distances in this case can be specified in terms of the likelihood of one base (or base pair) being misrepresented by another. This is traditionally achieved using the negative likelihood function. In the absence of such information, traditional 0/1 distances for equal/non-equal bases or base pairs can be utilized. They can also be learnt using the training methodology explained earlier.

Use in Taxonomy

In the classical sense, taxonomy refers to the science of classifying organisms; the process of classification provides a framework for the organization of items. Today, however, the notion of taxonomy is extended well beyond the classification of organisms to items such as DNA gene sequences, for example. The value of classification comes from it serving as an index to stored information, having a heuristic value which allows for prediction and interpolation, which permits the making of generalizations, and serves as a basis for explanation. The three main schools or philosophical approaches to taxonomy are 1) phenetic taxonomy or numerical taxonomy, which classifies on the basis of overall morphological or genetic similarity; 2) cladistic taxonomy or phylogenetic taxonomy, which classifies strictly on branching points; and 3) evolutionary taxonomy, traditional taxonomy, or gradistic taxonomy, classifies on a combination of branching and divergence.

Figure 30:
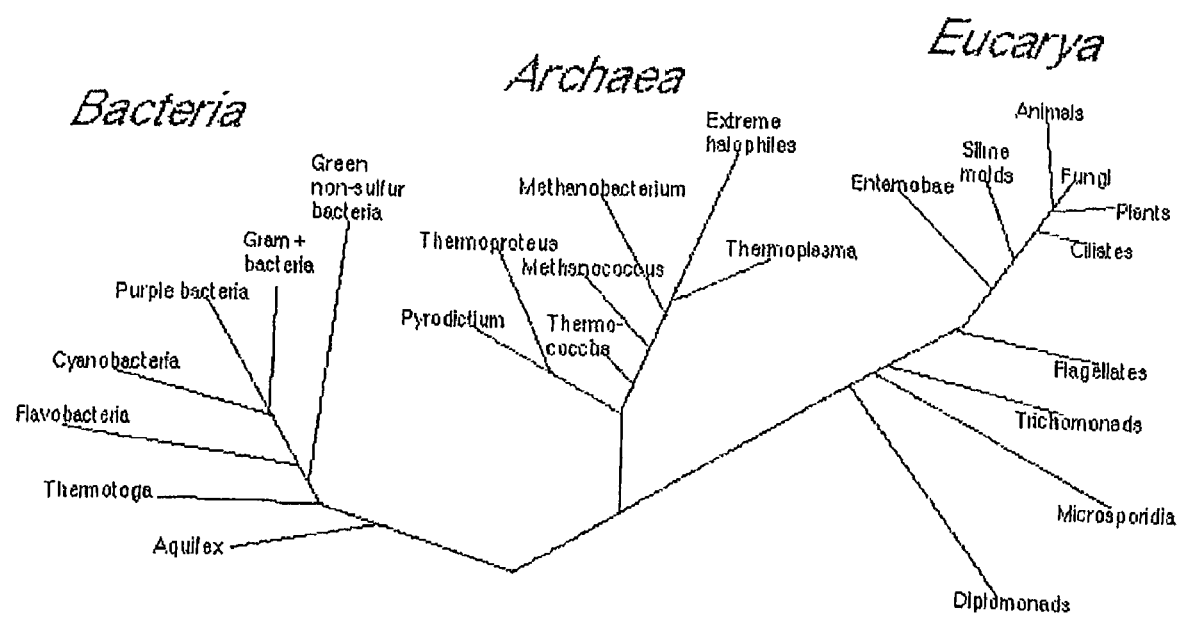
FIG. 30 presents a typical example of a bacterial phylogenetic tree displaying the differences between Bacteria and Archaea.

It is important to note that within the field of taxonomy there may be two levels of tree representation. The first is the relationship between elements, as illustrated in FIG. 30.

The second is the representation of each element (eg. a gene sequence) in an 'element specific' or 'signature' tree structure form, as dictated by the kinds of different features and the relationship of such features which each element may or may not have and in a manner similar to FIGS. 19A-D, 20A-D and 21A-D. The method of the invention uses the matching of this second type of tree structures to then identify the closest known element in a relational tree of elements and thereby obtain information regarding, for example, related gene sequences.

In another embodiment, the method of this invention can be utilized in tree and string taxonomy in a straightforward manner, when tree taxonomy or string taxonomy is applicable to determining the relationship between two or more elements. The tree taxonomy problem involves determining the similarity/dissimilarity and relationship between the various trees in a set of trees. These trees can be, for example, the tree representations of various viruses/bacteria or the genetic tree representations of various biological species, or compounds. Generally, pairs of trees having shorter inter-tree distances are more likely to be inter-related than those with longer inter-tree distances, permitting a relationship between the various trees to be determined.

Using the method of this invention, one may readily determine an enhanced similarity/dissimilarity measure (ie. the inter-tree constrained edit distance) between the various trees in a set of trees, thereby providing a measure of the relative similarity/dissimilarity between the various trees in a set of trees from which the taxonomy of the trees may be established.

In a further embodiment of this invention, sets of trees having shorter inter-tree distances measured using the method of this invention, may be clustered according to their similarity, into sub-dictionaries, each sub-dictionary containing a cluster of similar trees. By such a clustering, a hierarchical classification can be achieved. This clustering process can be repeated recursively to further refine the hierarchical classification.

Moreover, since a string can be considered as a tree in which each parent node has exactly one child, the current invention can be directly applied to the corresponding problems involving strings—including the string taxonomy problem which involves determining the mutating relationships between the elements of a set of strings, which strings can be, for example, the representations of various viruses/bacteria, or the genetic string representations of various biological species, or compounds.

Taxonomy Applied to Bioinformatics and DNA Sequence Analysis

In addition to classical taxonomy with respect to organisms, one area of science where the need for taxonomy is mounting exponentially is with regard to DNA sequences, paralleling the rate of gene sequencing. The advent of cloning technology allowing foreign DNA sequences to be easily introduced into a bacteria has enabled rapid, mass production of particular DNA sequences. Oligonucleotide synthesis provided researchers with the ability to construct short fragments of DNA with sequences of their own choosing which could be used to probe vast libraries of DNA to extract genes containing the same sequence as the probe. These fragments could also be used in polymerase chain reactions to amplify existing DNA sequences or to modify these sequences.

In order to utilize this information however, access to a collected pool of sequence information and a method of extracting from this pool only those sequences of interest. Advances in computer technology have provided the means to store and organize sequence information into databases in addition to analyzing sequence data rapidly. Then, means for readily comparing sequences is needed in order to compare sequences to determine gene function, developing phylogenetic relationships and simulating protein models.

Scientific research has shown that all genes share common elements, and for many genetic elements, it has been possible to construct consensus sequences representing the norm for a given class of organisms. Common genetic elements include promoters, enhancers, polyadenylation signal sequences and protein binding sites. Genetic elements share common sequences which enables the application of mathematical algorithms to be applied to the analysis of sequence data.

Theoretical scientists have derived new and sophisticated algorithms which allow sequences to be readily compared using probability theories. Such comparisons may them become the basis for determining gene function, developing phylogenetic relationships and simulating protein models. Hence even if the source of a particular sequence is not known, identifying a different sequence which most closely resembles the first and which may in turn be linked through taxonomic classification to a corresponding elemental tree of a class of genes. There is even potential to obtain further information if for example, the translation of the gene sequences into protein sequences could then be related to an elemental tree depicting the relationship between members of a class of proteins.

Recognition of Chemical Compounds Described in Terms of Molecules

In another embodiment, the method of this invention can be used to recognize chemical compounds that are described in terms of molecules. They are recognized from their noisy fragments, also described in terms of their component molecules. Since chemical compounds are graphs, each compound is first mapped into a set of representative tree structures. Similarly, the noisy fragment of the compound is also mapped into a set of representative tree structures. The compound recognition is achieved by invoking the solution to the NSuT problem between the various tree representations of each compound and the tree representations of the noisy fragment. FIG. 20 is a schematic diagram showing how the invention can be used for this purpose, and the implementation of the invention is straightforward by specifying the inter-symbol distances between the molecules. These distances can be specified in terms of the likelihood of one molecule being transformed into (misrepresented by) another. This is traditionally achieved using the negative likelihood function. In the absence of such information, traditional 0/1 distances for equal/non-equal symbols can be utilized. They can also be learnt using the training methodology explained earlier.

Recognition of Chemical Compounds Described in Terms of Atomic Structures

In another embodiment, the method of this invention can be used to recognize chemical compounds that are described in terms of atomic structures. They are recognized from their noisy fragments, also described in terms of their component atomic structures. Since chemical compounds are graphs, each compound is first mapped into a set of representative tree structures, where the nodes are the atoms. Similarly, the noisy fragment of the compound is also mapped into a set of representative tree structures. The compound recognition is achieved by invoking the solution to the NSuT problem between the various tree representations of each compound and the tree representations of the noisy fragment. FIG. 20 is a schematic diagram showing how the invention can be used for this purpose, and the implementation of the invention is straightforward by specifying the inter-symbol distances between the respective atoms. These distances can be specified in terms of the likelihood of one atom being transformed into (misrepresented by) another, and is related to the positions of the atoms in the periodic table. This can be achieved using the negative likelihood function of the confusion probabilities. In the absence of such information, traditional 0/1 distances for equal/non-equal symbols can be utilized. The inter-symbol distances can also be learnt using the training methodology explained earlier.

Fingerprint Recognition

In another embodiment, the method of this invention can be used to recognize fingerprints. The fingerprints are first preprocessed as described by Johannesen et al. ((*Proc. of SSPR* '96, (1996)) and described in terms of their minuatae. This is the straightforward necessary step required in any fingerprint recognition system, because the fingerprint image has to represented in terms of the features, and the best features in this problem domain are the minuatae. They are recognized from their noisy sub-portions which may or may not be contiguous. These noisy sub-portions are also described in terms of their component minuatae after the same preprocessing. Since numerous minuatae representations of each fingerprints are possible, each fingerprint is first mapped into a set of representative tree structures. Similarly, the noisy fragment of the fingerprint is also mapped into a set of representative tree structures. The fingerprint recognition is achieved by invoking the solution to the NSuT problem between the various tree representations of each fingerprint and the tree representations of the noisy sub-portion. FIG. 22 is a schematic diagram showing how the invention can be used for this purpose, and the implementation of the invention is straightforward by specifying the inter-symbol distances between the respective types of minuatae. These distances can be specified in terms of the likelihood of one minuatae being transformed into (misrepresented by) another, and is related to the characteristics of the image processing environment which distinguishes the minuatae themselves from the "raw" image. In the absence of such information, traditional 0/1 distances for equal/non-equal minuatae can be utilized. The inter-symbol distances between the minuatae can also be learnt using the training methodology explained earlier.

Map Recognition

In another embodiment, the method of this invention can be used to recognize maps. The maps are first preprocessed using standard image processing preprocessing operations (see Haralick and Shapiro (*Computer and Robot Vision* (1992))) and described in terms of their distinguishing features (landmarks) such as stop signs, yields, stop lights, bridges, railroad crossings etc. This is the straightforward necessary step and is usually available in most geographical information systems. The maps are recognized from their noisy sub-portions which may or may not be contiguous. These noisy sub-portions are also described in terms of their component distinguishing features after the same preprocessing. Since numerous tree representations of each map are possible, each map is first mapped into a set of representative tree structures. Similarly, the noisy fragment of the map sought for is also mapped into a set of representative tree structures. The map recognition is achieved by invoking the solution to the NSuT problem between the various tree representations of each map and the tree representations of the noisy fragment. FIG. 23 is a schematic diagram showing how the invention can be used in the recognition of maps.

The implementation of the invention to this problem domain is straightforward by specifying the inter-symbol distances between the respective types of distinguishing features. These distances can be specified in terms of the likelihood of one distinguishing feature being transformed into (misrepresented by) another, and is related to the characteristics of the image processing environment of the GIS system which recognizes the distinguishing features themselves from the "raw" image. Again, in the absence of such information, traditional 0/1 distances for equal/non-equal distinguishing landmarks can be utilized. The inter-symbol distances can also be learnt using the training methodology explained earlier.

Recognition of Electronic Circuitry

The method of this invention can be used to recognize electronic circuitry. The circuits are first preprocessed and described in terms of their components and wiring diagrams which form the nodes and edges of the underlying graph. The nodes in this case are the various electronic components such as resistors, diodes, transistors, capacitors etc. Obtaining this representation is the straightforward—since most circuits are designed on paper (or in a computer) before they are implemented in hardware. The circuits are recognized from their noisy sub-portions which may or may not be contiguous. Thus the portion of the circuit available may come from different portions of the circuit to be recognized. Since numerous tree representations of each electronic circuit are possible, each electronic circuit is first mapped into a set of representative tree structures. Similarly, the noisy fragment of the electronic circuit sought for is also mapped into a set of representative tree structures. The electronic circuitry recognition is achieved by invoking the solution to the NSuT problem between the various tree representations of each electronic circuit and the tree representations of the noisy fragment. FIG. 24 is a schematic diagram showing how the invention can be used in this application domain. The implementation of the invention to this problem domain is straightforward by specifying the inter-symbol distances between the respective types of components. These distances can be specified in terms of the likelihood of one component (resistor, diode etc.) being transformed into (misrepresented by) another, and is related to the characteristics of the hardware set-up which recognizes the components themselves from the actual circuit or printed circuit board. Again, in the absence of such information, traditional 0/1 distances for equal/non-equal components can be utilized. As before, the inter-symbol distances can also be learnt using the training methodology explained earlier Recognition of Flow Charts The method of this invention can be used to recognize flow charts. The flow charts are first preprocessed and described in terms of their graphical features (the symbolic icons) which form the nodes of the underlying graph. The nodes in this case are the various symbols used in flow charting such as assignments, loops, comparisons, control structures etc. Obtaining this representation is the straightforward—since most flow charts are drawn on paper (or in a computer) before they are implemented in software. The flow charts are recognized from their noisy sub-portions which may or may not be contiguous. Since numerous tree representations of each flow chart are possible, each flow chart is first mapped into a set of representative tree structures. Similarly, the noisy fragment of the flow chart sought for is also mapped into a set of representative tree structures. The flow chart recognition is achieved by invoking the solution to the NSuT problem between the various tree representations of each flow chart and the tree representations of the noisy fragment. FIG. 25 is a schematic diagram showing how the invention can be used in the recognition of flow charts. The implementation of the invention to this problem domain is straightforward by specifying the inter-symbol distances between the respective types of flow-charting iconic symbols. These distances can be specified in terms of the likelihood of one symbol being transformed into (misrepresented by) another. As usual, in the absence of such information, they can be learnt using the training process explained earlier or traditional 0/1 distances for equal/non-equal iconic symbols can be utilized.

Other Applications of the Invention

Apart from the above applications, studies in compiler construction have also used tree-comparison algorithms in automatic error recovery and correction of programming languages [Ta79]. Indeed the method of this invention can be used in any problem domain involving the comparison of tree-patterns with other tree-patterns representing a noisy sub-pattern which has been "occluded" at multiple junctures.

In one embodiment of the method of the present invention can be applied to the fundamental problem of data mining in areas where current day technology is not applicable. Typically, the data to be mined is represented symbolically. Current day syntactic data mining tools would seek for patterns in which the relationship between the symbols in the data is governed by a left-to-right or right-to-left ordering. The method of this invention would be capable of mining the data where the relationship between the symbols in the data is governed by both a left-to-right (or right-to-left) ordering and a latent parent-child relationship. Thus, the method could be used to discover patterns which are actually governed by a tree relationship, but which relationship is occluded by the string representation of the data to be mined.

As an example, consider the problem where the data to be mined searches for repeated patterns of a phone prefix "4892676". The method of the invention can search for the pattern where the pattern sought for is distributed over a larger supersequence as "4abcbfsjd2iejf6iejfif6". Furthermore, this supersequence could also be noisy, for example, "4abcbfsjd2iejf6iejfif3".

In one embodiment the method of the present invention can be used in musical applications. Consider the scenario in which a user is searching for a musical piece in a music library. The user intends to discover a musical piece, but the input to the search mechanism would be a poorly played (for example, by playing on a keyboard) version of only a segment of one "part" (as in soprano, alto, tenor and bass) of the score. Furthermore, neither these segments nor the individual notes need be contiguous. The method of this invention can be used to search for and present the user with the best score in the library that contains the poorly played segment as a sub-score or as a sequence of incorrectly played notes. The notes of the score could be the symbols in the alphabet, and each "part" could be treated as a separate sequence of notes which collectively describe the concerned score. In this case, the method of the invention would work with the string (i.e., the uni-dimensional left-to-right) representation since the tree representation is superfluous. However, it is important to point out that the string representation can be mapped to a tree representation by each node having only a single child.

It is clear that the methodology used in all the above application areas is analogous. Indeed, the implementation in any one application domain can easily be modified for another application domain. In order to clarify issues however, we have implemented a prototype of the invention for the case of chemical compounds represented in terms of their atoms. Each compound is represented by 10 representative spanning trees. Noisy fragments of these compounds are then chosen and each fragment is represented by 3 possible representative spanning trees. The PR is achieved by invoking the NsuT recognition solution between the former trees and the trees representing the fragments. The prototype is amazingly accurate although the accuracy cannot be explicitly quoted since it intended for use in an on-line manner.

EXAMPLES

Example I

The NsuT Recognition technique developed in the previous sections has been rigorously tested to verify its capability in the pattern recognition of NSuTs. The experiments conducted were for two different data sets which were artificially generated. To test the methods adequately, "relatively long" character sequences using benchmark results involving keyboard character errors have been resorted to. It will presently be made clear that these results are sufficient to demonstrate the power of the strategy to recognize noisy subsequence trees. It would be a rather trivial and straightforward exercise for an expert in the field to obtain equivalent results for biological molecules and for the other applications explained herein.

The results obtained for simulated trees are the first reported results that demonstrate that a tree can indeed be recognized by processing the information resident in one of its noisy random subsequence trees. The details of the experimental set-ups and the results obtained follow.

Tree Representation

In the implementation of the method the invention, the tree structures of the patterns were studied as parenthesized lists in a left-to-right post-order fashion. Thus, a tree with root 'a' and children B, C and D is represented as a parenthesized list $\mathfrak{X}$=(B C D 'a') where B, C and D can themselves be trees in which cases the embedded lists of B, C and D are inserted in $\mathfrak{X}$. A specific example of a tree (taken from the dictionary) and its parenthesized list representation is given in Figure VI.

In the first experimental set-up the dictionary, H, consisted of 25 manually constructed trees which varied in sizes from 25 to 35 nodes. An example of a tree in H is given in Figure VI. To generate a NSuT for the testing process, a tree X* (unknown to the classification process) was chosen. Nodes from X* were first randomly deleted producing a subsequence tree, U. In the experimental set-up the probability of deleting a node was set to be 60%. Thus although the average size of each tree in the dictionary was 29.88, the average size of the resulting subsequence trees was only 11.95.

The garbling effect of the noise was then simulated as follows. A given subsequence tree U, was subjected to additional substitution, insertion and deletion errors, where the various errors deformed the trees as described earlier. This was effectively achieved by passing the string representation through a channel causing substitution, insertion and deletion errors analogous to the one used to generate the noisy subsequences by Oommen in (*IEEE Trans. Pattern AnaL and Mach. Intell.*, Vol. PAMI 9, No. 5: pp. 676-685

(1987)) and which has recently been formalized by Oommen and Kashyap (see (*Pattern Recognition*, Vol. 31, pp. 1159-1177 (1998))). However, as opposed to merely mutating the string representations as in this reference, the underlying list representation of the tree was manipulated. This involves ensuring the maintenance of the parent/sibling consistency properties of a tree—which are far from trivial.

In the specific scenario, the alphabet involved was the English alphabet, and the conditional probability of inserting any character $a \in A$ given that an insertion occurred was assigned the value 1/26. Similarly, the probability of a character being deleted was set to be 1/20. The table (Table I) of probabilities for substitution (the confusion matrix) was based on the proximity of the character keys on a standard QWERTY keyboard and is given in FIG. 26. The channel essentially mutated the nodes (characters, in this case) in the list ignoring the parenthesis, and whenever an insertion or a deletion was introduced special case scenarios were considered so as to insert the additional required parenthesis or remove the superfluous parenthesis respectively. Furthermore, the maintenance of the parenthesis was done in such a way that the underlying expression of parenthesis was well-matched.

Figure 27:
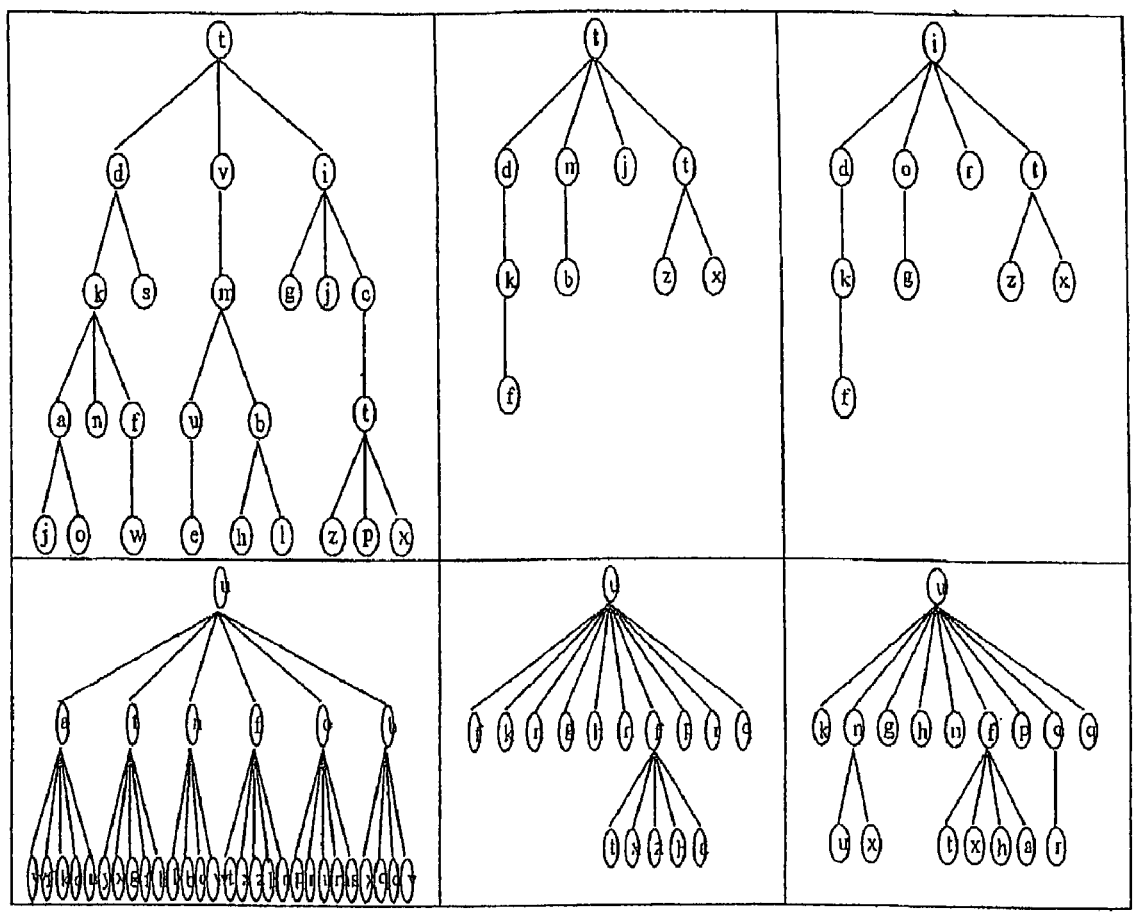
FIG. 27 presents Table II displaying examples of the original trees, the associated subsequence trees and their noisy versions.

In the experiments ten NSuTs were generated for each tree in H yielding a test set of 250 NSuTs. The average number of tree deforming operations done per tree was 3.84. Table II, presented in FIG. 27 gives a list of 5 of the NSuTs generated, their associated subsequence trees and the trees in the dictionary which they originated from. A larger subset of the trees used for these experiments and their noisy subsequence trees (both represented as parenthesized lists) are included in Table III, which is presented as FIG. 28. Table IV gives the average number of errors involved in the mutation of a subsequence tree, U. Indeed, after considering the noise effect of deleting nodes from X* to yield U, the overall average number of errors associated with each noisy subsequence tree is 21.76.

TABLE IV

The noise statistics associated with the set of noisy subsequence trees used in testing.

| Type of errors | Number of Errors | Average error per tree |
|---|---|---|
| Insertion | 493 | 1.972 |
| Deletion | 313 | 1.252 |
| Substitution | 153 | 0.612 |
| Total average error | | 3.836 |

Every element, Y, in the set of noisy subsequence trees, was compared against the trees in H using the techniques described earlier. The results that were obtained were remarkable. Out of the 250 noisy subsequence trees tested, 232 were correctly recognized, which implies an accuracy of 92.80%. This is quite overwhelming considering the fact that the items concerned are 2-dimensional objects with an unusually high (about 73%) error rate at the node and structural level.

Example II

In the second experimental set-up, the dictionary, H, consisted of 100 trees which were generated randomly. Unlike in the above set (in which the tree-structure and the node values were manually assigned), in this case the tree structure for an element in H was obtained by randomly generating a parenthesized expression using the following stochastic context-free grammar G, where, G=<N, A, G, P>, where,
N={T, S, $} is the set of non-terminals,
A is the set of terminals—the English alphabet,
G is the stochastic grammar with associated probabilities, P, given below:
T→(S$) with probability 1,
S→(SS) with probability $p_1$,
S→(S$) with probability 1−$p_1$,
S→($) with probability $p_2$,
S→λ with probability 1−$p_2$, where λ is the null symbol,
$→a with probability 1, where $a \in A$ is a letter of the underlying alphabet.

Note that whereas a smaller value of $p_1$ yields a more tree-like representation, a larger value of $p_1$ yields a more string-like representation. In the experiments the values of $p_1$ and $p_2$ were set to be 0.3 and 0.6 respectively. The sizes of the trees varied from 27 to 35 nodes.

Once the tree structure was generated, the actual substitution of '$' with the terminal symbols was achieved by using the benchmark textual data set used in recognizing noisy subsequences by Oommen (*IEEE Trans. Pattern Anal. and Mach. Intell.*, PAMI 9: pp. 676-685 (1987)). These textual strings consisted of a hundred strings taken from the classical book on pattern recognition by Duda and Hart (*Pattern Classification and Scene Analysis*, John Wiley and Sons, New York, (1973)).Each string was the first line of a section or sub-section of the book, starting from Section 1.1 and ending with Section 6.4.3. Further, to mimic a UNIX/TEX file, all the Greek symbols were typed in as English strings. Subsequently, to make the problem more difficult, the spaces between words were eliminated, thus discarding the contextual information obtainable by using the blanks as delimiters. Finally, these strings were randomly truncated so that the length of the words in the dictionary was uniformly distributed in the interval [40, 80]. Thus, the first line of Section 3.4.1 of Duda and Hart (*Pattern Classification and Scene Analysis*, John Wiley and Sons, New York, (1973)), which reads "In this section we calculate the a posteriori density p(θ/X) and the desired probability"

yielded the following string:

"inthissectionwecalculatethea-posterioridensitypthetaxandthedesiredpro".

The question of how the above strings are transformed into parenthesized list representations for trees is now considered. The trees generated using the grammar, and the strings considered were both traversed from left to right, and each '$' symbol in the parenthesized list was replaced by the next character in the string. Thus, for example, the parenthesized expression for the tree for the above string was:

((((((((((($)$)$)(($)$)$)$)$)$)(((($)$)$)$)(($)($) (($)$)$)$)$)$)$)$)

The '$''s in the string are now replaced by terminal symbols to yield the following list:

(((((((((((i)n)t)h)((i)s)s)e)c)t)(((((i)o)((n)w)e)c)a)(((l)c)((u)l)(((a)t)e)t)h)e)a)p)o)s)

The actual underlying tree for this string is given in Figure VII.

To generate a NSuT for the testing process, as in the above experimental set-up, a tree X* (unknown to the PR system) was chosen. Nodes from X* were first randomly deleted producing a subsequence tree, U. In the present case the probability of deleting a node was set to be 60%. Thus although the average size of each tree in the dictionary was 31.45, the average size of the resulting subsequence trees was only 13.42.

The garbling effect of the noise was then simulated as in the earlier set-up. Thus the subsequence tree U, was subjected to additional substitution, insertion and deletion errors by passing the string representation through a channel causing substitution, insertion and deletion errors as described earlier while simultaneously maintaining the underlying list representation of the tree. Here too the alphabet being the English alphabet, the probabilities of insertion, deletion and the various confusion substitutions were as described earlier and were based on the QWERTY keyboard.

In the experiments five NSuTs were generated for each tree in H yielding a test set of 500 NSuTs. The average number of tree deforming operations done per tree was 3.77. Table V gives the average number of errors involved in the mutation of a subsequence tree, U. Indeed, after considering the noise effect of deleting nodes from X* to yield U, the overall average number of errors associated with each noisy subsequence tree is 21.8. The list representation of a subset of the hundred patterns used in the dictionary and their NSuTs is given in Table VI, which is presented as FIG. 29.

TABLE V

The noise statistics associated with the set of noisy subsequence trees used in testing.

| Type of errors | Number of Errors | Average error per tree |
| --- | --- | --- |
| Insertion | 978 | 1.956 |
| Deletion | 601 | 1.202 |
| Substitution | 306 | 0.612 |
| Total average error | | 3.770 |

Again, each noisy subsequence tree, Y, was compared against the trees in H using the constrained tree distance with the constraint $\tau=\{L_p-1, L_p, L_p+1\}$. The results that were obtained are very impressive. Out of the 500 noisy subsequence trees tested, 432 were correctly recognized, which implies an accuracy of 86.4%. The power of the scheme is obvious considering the fact that the objects involved are 2-dimensional objects with an unusually high (about 69.32%) error rate. Also, the corresponding uni-dimensional problem (which only garbled the strings and not the structure) gave an accuracy of 95.4% (See Oommen (*IEEE Trans. Pattern Anal. and Mach. Intell.*, Vol. PAMI 9, No. 5: pp. 676-685 (1987))).

REFERENCES

[AHU74] A. V. Aho, J. E. Hopcroft and J. D. Ullman, *The Design and Analysis of Computer Algorithms*, Addison Wesley, Reading: Mass., (1974).

[CL85] Y. C. Cheng and S. Y. Lu, "Waveform correlation by tree matching", *IEEE Trans. PAMI*, Vol: PAMI 7, pp 299-305 (1985).

[DH73] R. O Duda and P. E. Hart, *Pattern Classification and Scene Analysis*, John Wiley and Sons, New York, (1973).

[DH80] P. A. V. Hall and G. R. Dowling, "Approximate string matching", *Comput. Sur.*, Vol 12: pp 381-402 (December 1980).

[HS92] R. M. Haralick and L. G. Shapiro, *Computer and Robot Vision*, Addison Wesley, Reading, Mass. (1992).

[LW75] R. Lowrance and R. A. Wagner, "An extension of the string-to-string correction problem", *J. ACM*, Vol 22: pp 177-183 (April 1975).

[Lu79] S. Y. Lu, "A tree-to-tree distance and its application to cluster analysis", *IEEE Trans. Pattern Anal. and Mach. Intell.*, Vol. PAMI 1, No. 2: pp. 219-224 (1979).

[Oo86] B. J. Oommen, "Constrained string editing", *Inform. Sci.*, Vol. 40: pp. 267-284 (1986).

[0087] B. J. Oommen, "Recognition of noisy subsequences using constrained edit distances", *IEEE Trans. Pattern Anal. and Mach. Intell.*, Vol. PAMI 9, No. 5: pp. 676-685 (1987).

[OK98] B. J. Oommen and R. L. Kashyap, "A formal theory for optimal and information theoretic syntactic pattern recognition", *Pattern Recognition*, Vol. 31, pp. 1159-1177 (1998).

[OL94] B. J. Oommen and W. Lee, "Constrained Tree Editing", *Information Sciences*, Vol. 77 No. 3,4: pp. 253-273 (1994).

[OL97] B. J. Oommen and R. K. S. Loke, "On Using Parametric String Distances and Vector Quantization in Designing Syntactic Pattern Recognition Systems", *Proceedings of the 1997 IEEE International Conference on Systems, Man and Cybernetics*, Orlando, Fla., October, pp. 511-517 (1997).

[OZL96] B. J. Oommen, K. Zhang, and W. Lee, "Numerical Similarity and Dissimilarity Measures Between Two Trees", *IEEE Transactions on Computers*, Vol. TC-45, pp.1426-1434 (1996).

[SK83] D. Sankoff and J. B. Kruskal, *Time wraps, string edits, and macromolecules: Theory and practice of sequence comparison*, Addison-Wesley, (1983).

[Se77] S. M. Selkow, "The tree-to-tree editing problem", *Inf. Proc. Letterrs*, Vol 6, No. 6, pp 184-186 (December 1977).

[Sh88] B. Shapiro, "An algorithm for comparing multiple RNA secondary structures", *Comput. Appl. Biosci.*, 387-393 (1988).

[SZ90] B. Shapiro and K. Zhang, "Comparing multiple RNA secondary structures using tree comparisons", *Comp. Appl. Biosci*. Vol. 6, No. 4, pp. 309-318, (1990).

[Ta79] K. C. Tai, "The tree-to-tree correction problem", *J. ACM*, Vol 26, pp 422-433 (1979).

[WF74] R. A. Wagner and M. J. Fischer, "The string-to-string correction problem", *J. Assoc. Comput. Mach.*, Vol. 21: pp. 168-173 (1974).

[Zh90] K. Zhang, "Constrained string and tree editing distance", Proceeding of the IASTED International Symposium, New York, pp. 92-95 (1990).

[ZJ94] K. Zhang and T. Jiang, "Some MAX SNP-hard results concerning unordered labeled trees", *Information Processing Letters*, 49, 249-254 (1994).

[ZS89] K. Zhang and D. Shasha, "Simple fast algorithms for the editing distance between trees and related problems", *SIAM J. Comput*. Vol. 18, No. 6: pp. 1245-1262 (1989).

[ZSS92] K. Zhang, R. Statman, and D. Shasha, "On the editing distance between unordered labeled trees", *Information Processing Letters*, 42, 133-139 (1992).

[ZSW92] K. Zhang, D. Shasha and J. T. L. Wang, "Fast serial and parallel approximate tree matching with VLDC's", *Proceedings of the 1992 Symposium on Combinatorial Pattern Matching*, CPM92, 148-161 (1992).

I claim:

1. A computer implemented method of comparing a closeness of a target tree to other trees located in a database of the other trees, said method comprising the steps of:
   (a) calculating a constraint with respect of each other tree in the database based on an estimated number of edit operations and a characteristic of the target tree, the target tree having at least one node which has at least two branches, each other tree having at least two nodes and two branches;
   (b) calculating a constrained tree edit distance between the target tree and each other tree in the database based on the constraint obtained in step (a); and
   (c) comparing the calculated constrained tree edit distances; and,
   (d) reporting a closeness of the target tree to an other tree located in the database based on the comparison of step (c).

2. The method as in claim 1, wherein the step of calculating a constrained tree edit distance also uses an intersymbol edit distance.

3. The method as in claim 1, wherein the target tree is a noisy subfragment of an other tree located in the database of the other trees.

4. The method as in claim 2, wherein the target tree is a noisy subfragment of an other tree located in the database of the other trees.

5. The method as in claim 1, wherein step (a) is preceded by the step of estimating a probability of an edit operation being performed on a node value to transform each other tree in the database of the other trees into an arbitrary noisy version of itself.

6. The method as in claim 2, wherein step (a) is preceded by the step of estimating a probability of an edit operation being performed on a node value to transform each other tree in the database of the other trees into an arbitrary noisy version of itself.

7. The method as in claim 3, wherein step (a) is preceded by the step of estimating a probability of an edit operation being performed on a node value to transform each other tree in the database of the other trees into an arbitrary noisy version of itself.

8. The method as in claim 4, wherein step (a) is preceded by the step of estimating a probability of an edit operation being performed on a node value to transform each other tree in the database of the other trees into an arbitrary noisy version of itself.

9. The method as in claim 5, wherein the edit operation is a substitution operation.

10. The method as in claim 6, wherein the edit operation is a substitution operation.

11. The method as in claim 7, wherein the edit operation is a substitution operation.

12. The method as in claim 8, wherein the edit operation is a substitution operation.

13. The method as in claim 5, wherein the edit operation is an insertion operation.

14. The method as in claim 6, wherein the edit operation is an insertion operation.

15. The method as in claim 7, wherein the edit operation is an insertion operation.

16. The method as in claim 8, wherein the edit operation is an insertion operation.

17. The method as in claim 5, wherein the edit operation is a deletion operation.

18. The method as in claim 6, wherein the edit operation is a deletion operation.

19. The method as in claim 7, wherein the edit operation is a deletion operation.

20. The method as in claim 8, wherein the edit operation is a deletion operation.

21. The method as in claim 1, wherein the method is preceded by the step of generating the database of the other trees.

22. The method as in claim 2, wherein the method is preceded by the step of generating the database of the other trees.

23. The method as in claim 3, wherein the method is preceded by the step of generating the database of the other trees.

24. The method as in claim 4, wherein the method is preceded by the step of generating the database of the other trees.

25. The method as in claim 5, wherein the method is preceded by the step of generating the database of the other trees.

26. The method as in claim 6, wherein the method is preceded by the step of generating the database of the other trees.

27. The method as in claim 7, wherein the method is preceded by the step of generating the database of the other trees.

28. The method as in claim 8, wherein the method is preceded by the step of generating the database of the other trees.

29. The maethod as in claim 9, wherein the method is preceded by the step of generating the database of the other trees.

30. The method as in claim 10, wherein the method is preceded by the step of generating the database of the other trees.

31. the method as in claim 11, wherein the method is preceded by the step of generating the database of the other trees.

32. The method as in claim 12, wherein the method is preceded by the step of generating the database of the other trees.

33. The method as in claim 13, wherein the method is preceded by the step of generating the database of the other trees.

34. The method as in claim 14, wherein the method is preceded by the step of generating the database of the other trees.

35. The method as in claim 15, wherein the method is preceded by the step of generating the database of the other trees.

36. The method as in claim 16, wherein the method is preceded by the step of generating the database of the other trees.

37. The method as in claim 17, wherein the method is preceded by the step of generating the database of the other trees.

38. The method as in claim 18, wherein the method is preceded by the step of generating the database of the other trees.

39. The method as in claim 19, wherein the method is preceded by the step of generating the database of the other trees.

40. The method as in claim 20, wherein the method is preceded by the step of generating the database of the other trees.

41. A computer implemented method of matching a target tree representable structure to other tree representable structure, said method comprising the steps:
- (a) generating at least one target tree for the target tree representable structure, each target tree having at least one node which has at least two branches and for the each of the other tree representable structures, generating at least one other tree, each of the other trees having at least two nodes and at least two branches;
- (b) calculating a constraint with respect of each other tree based on an estimated number of edit operations and a characteristic of the target tree;
- (c) calculating a constrained tree edit distance between the target tree and each other tree based on the constraint obtained in step (b) and an intersymbol edit distance;
- (d) comparing the calculated constrained tree edit distances; and
- (e) reporting that other tree that has a smallest constrained tree edit distance, based on the comparison of step (d).

* * * * *

UNITED STATES PATENT AND TRADEMARK OFFICE
CERTIFICATE OF CORRECTION

PATENT NO.       : 7,287,026 B2
APPLICATION NO.  : 10/116,970
DATED            : October 23, 2007
INVENTOR(S)      : Oommen It is certified that error appears in the above-identified patent and that said Letters Patent is hereby corrected as shown below:

Column 4
Line 25, delete "for $1\leq i\leq|T_1|$, $1\leq j\leq|T_2|$, and $1\leq s\leq Min$" and insert -- for $1\leq i\leq|T_1|$, $1\leq j\leq|T_2|$, and $1\leq s\leq Min$ --
Line 34, delete "$\delta_1(i)\leq i_1\leq i$, $\delta_2(j)$" and insert -- $\delta_1(i)\leq i_1\leq i$, $\delta_2(j)$ --
Line 35, delete "$\leq j_1 \leq j$, $0\leq s\leq Min\{Size(i), Size(j)\}$." and insert -- $\leq j_1 \leq j$, $0\leq s\leq Min\{Size(i), Size(j)\}$ --

Column 6
Line 7, delete "$10^{-1}$" and insert -- $10^{-3}$ --

Column 11
Line 47, delete "$Anc(i)=\{f^k(i)|0\leq k\leq Depth(i)\}$." and insert -- $Anc(i)=\{f^k(i)|0\leq k\leq Depth(i)\}$. --
Line 60, delete "some $0\leq i\leq j\leq k$," and insert -- some $0\leq i\leq j\leq k$, --

Column 12
Line 9, delete "Let $d(x,y)\geq 0$" and insert -- Let $d(x,y)\geq$ --
Line 15, delete "$d(x,y)\geq 0$;" and insert -- $d(x,y)\geq 0$; --
Line 19, delete "$d(x,z)\leq d(x,y)+d(y,z)$" and insert -- $d(x,z)\leq d(x,y)+d(y,z)$ --
Line 25, delete "for $1\leq i\leq k$. The" and insert -- for $1\leq i\leq k$. The --
Line 56, delete "(i) $1\leq i\leq|T_1|$, $1\leq j\leq|T_2|$;" and insert -- (i) $1\leq i\leq|T_1|$, $1\leq j\leq|T_2|$; --

Column 13
Line 5, delete "cos t (M)" and insert -- cost (M) --
Line 17, delete "cost (M) $\leq$ W(S)." and insert -- cost (M) $\leq$ W(S). --

Column 14
Line 29, delete "$X_+$" and insert -- $X^+$ --

Column 15
Line 8, delete "of" and insert -- if --
Line 35, delete "$1\leq i\leq|T_1|$, $1\leq j\leq|T_2|$, and" and insert -- $1\leq i\leq|T_1|$, $1\leq j\leq|T_2|$, and --
Line 36, delete "$1\leq s\leq Min\{|T_1|, |T_2|\}$." and insert -- $1\leq s\leq Min\{|T_1|, |T_2|\}$. --

Column 16
Line 5, delete "(I)" and insert -- (j) --

UNITED STATES PATENT AND TRADEMARK OFFICE
CERTIFICATE OF CORRECTION

PATENT NO.       : 7,287,026 B2
APPLICATION NO.  : 10/116970
DATED            : October 23, 2007
INVENTOR(S)      : Oommen It is certified that error appears in the above-identified patent and that said Letters Patent is hereby corrected as shown below:

Column 18
Line 60, delete "$[i_1,j_1,s], \delta_1(i) \leq i_1 \leq i, \delta_2(j) \leq j_1 \leq j,$" and insert -- $[i_1,j_1,s], \delta_1(i) \leq i_1 \leq i, \delta_2(j) \leq j_1 \leq j,$ --
Line 61, delete "$0 \leq s \leq Min\{Size(i), Size(j)\}.$" and insert -- $0 \leq s \leq Min\{Size(i), Size(j)\}.$ --

Column 20
Line 49, delete "$max\{0, M-N\} \leq i \leq q \leq M,$" and insert -- $max\{0, M-N\} \leq i \leq q \leq M,$ --
Line 51, delete "$0 \leq e \leq r \leq N,$" and insert -- $0 \leq e \leq r \leq N,$ --
Line 53, delete "$0 \leq s \leq R.$" and insert -- $0 \leq s \leq R.$ --
Line 58, delete "$H_i = \{j | max\{0, M-N\} \leq j \leq M\},$" and insert -- $H_i = \{j | max\{0, M-N\} \leq j \leq M\},$ --
Line 60, delete "$H_e = \{j | 0 \leq j \leq N\},$ and," and insert -- $H_e = \{j | 0 \leq j \leq N\},$ and, --
Line 62, delete "$H_s = \{j | 0 \leq j \leq Min\{M,N\}\}.$" and insert -- $H_e = \{j | 0 \leq j \leq Min\{M,N\}\}.$ --

Column 21
Line 4, delete "$\{(q-s, r-s, s) | 0 \leq s \leq Min\{M,N\}\}.$" and insert
-- $\{(q-s, r-s, s) | 0 \leq s \leq Min\{M,N\}\}.$ --
Line 22, delete "and $Q_e = \{j | j \epsilon H_e, j \leq k\}.$" and insert -- and $Q_3 = \{j | j \epsilon H_e, j \leq k\}.$ --

Column 23
Line 20, delete "$\_F_{13}$" and insert -- $\_F\_$ --

Column 24
Line 8, delete "since $k \leq j.$" and insert -- since $k \leq j.$ --

Column 25
Line 35, delete "$Const\_T\_Wt(i,j,s_2) \leq Const\_F\_Wt(T_1[\delta(i)]$" and insert
-- $Const\_T\_Wt(i,j,s_2) \leq Const\_F\_Wt(T_1[\delta(i)]$ --
Line 47, delete "$0 \leq s_2 \leq s,$" and insert -- $0 \leq s_2 \leq s,$ --

Column 26
Line 23, delete "$\delta(i) \leq h \leq i, \delta(j) \leq k \leq j,$ and" and insert -- $\delta(i) \leq h \leq i, \delta(j) \leq k \leq j,$ and --
Line 25, delete "$0 \leq s' \leq s = Min$" and insert -- $0 \leq s' \leq s = Min$ --
Line 36, delete "$1 \leq x_1 \leq i - \delta(i) + 1, 1 \leq y_1 \leq j - \delta(j) + 1:$" and insert
-- $1 \leq x_1 \leq i - \delta(i) + 1, 1 \leq y_1 \leq j - \delta(j) + 1:$ --

UNITED STATES PATENT AND TRADEMARK OFFICE
CERTIFICATE OF CORRECTION

PATENT NO. : 7,287,026 B2
APPLICATION NO. : 10/116970
DATED : October 23, 2007
INVENTOR(S) : Oommen It is certified that error appears in the above-identified patent and that said Letters Patent is hereby corrected as shown below:

Column 40
Line 30, delete "maethod" and insert -- method --

The certificate supersedes the Certificate of Correction issued June 3, 2008.

Signed and Sealed this

First Day of July, 2008

JON W. DUDAS
*Director of the United States Patent and Trademark Office*